(12) United States Patent
Arhin et al.

(10) Patent No.: US 10,290,062 B2
(45) Date of Patent: May 14, 2019

(54) SYSTEM AND METHOD FOR UTILIZING ANNOTATED IMAGES TO FACILITATE INTERACTIONS BETWEEN COMMERCIAL AND SOCIAL USERS

(71) Applicants: Linda Arhin, Toronto (CA); Michael Stewart Shunock, Toronto (CA)

(72) Inventors: Linda Arhin, Toronto (CA); Michael Stewart Shunock, Toronto (CA)

(73) Assignee: Michael Stewart Shunock, Toronto (CA)

( * ) Notice: Subject to any disclaimer, the term of this patent is extended or adjusted under 35 U.S.C. 154(b) by 224 days.

(21) Appl. No.: 14/559,395

(22) Filed: Dec. 3, 2014

(65) Prior Publication Data

US 2015/0154167 A1    Jun. 4, 2015

Related U.S. Application Data

(60) Provisional application No. 61/911,721, filed on Dec. 4, 2013.

(51) Int. Cl.
| | | |
|---|---|---|
| *G06F 17/30* | (2006.01) | |
| *G06Q 50/00* | (2012.01) | |
| *G06Q 30/02* | (2012.01) | |

(52) U.S. Cl.
CPC ....... *G06Q 50/01* (2013.01); *G06F 17/30091* (2013.01); *G06F 17/30386* (2013.01); *G06Q 30/0201* (2013.01)

(58) Field of Classification Search
CPC .............. G06Q 50/01; G06F 17/30091; G06F 17/30386
USPC ........................................................ 715/233
See application file for complete search history.

(56) References Cited

U.S. PATENT DOCUMENTS

| | | | | |
|---|---|---|---|---|
| 8,312,056 B1* | 11/2012 | Peng | ...................... | G06Q 50/01 |
| | | | | 705/319 |
| 2007/0214097 A1* | 9/2007 | Parsons | ............. | G06F 17/30864 |
| | | | | 706/12 |

(Continued)

OTHER PUBLICATIONS

"The Beginner's Guide to Facebook"; Stephanie Buck; Mashable; published May 16, 2012; <http://mashable.com/2012/05/16/facebook-for-beginners/>.*

(Continued)

*Primary Examiner* — Stephen S Hong
*Assistant Examiner* — Broderick C Anderson
(74) *Attorney, Agent, or Firm* — Bereskin & Parr LLP/S.E.N.C.R.L., s.r.l.

(57) ABSTRACT

A method and system matches social users and commercial users of an image annotation system, where annotated images are stored on a database. Image data records associated with the annotated images comprise judgment data corresponding to judgments made by social users regarding the images and social user identifiers for enabling a communication module to communicate with computing devices of respective social users who made the judgments. Commercial user records are also stored on the database, and contain information regarding commercial users for enabling the communication module to communicate with computing devices of respective commercial users. The commercial user records are searched based on a search criterion derived from an annotated image to determine a commercial user that satisfies the search criterion. Information regarding the commercial user may be communicated to social users associated with the annotated image, and information regarding these social users may be communicated to the commercial user.

22 Claims, 26 Drawing Sheets

(56) References Cited

U.S. PATENT DOCUMENTS

| | | | | |
|---|---|---|---|---|
| 2009/0048904 A1* | 2/2009 | Newton | ............ | G06Q 10/10 |
| | | | | 705/7.29 |
| 2009/0177588 A1* | 7/2009 | Marchese | ............ | G06Q 30/02 |
| | | | | 705/80 |
| 2013/0110641 A1* | 5/2013 | Ormont | ............ | G06Q 30/0251 |
| | | | | 705/14.66 |
| 2015/0067471 A1* | 3/2015 | Bhardwaj | ............ | G06F 17/30265 |
| | | | | 715/233 |

OTHER PUBLICATIONS

"Facebook Now Allows You to Tag Pages in Photos"; Leena Rao; TechCrunch; published May 12, 2011; <http://techcrunch.com/2011/05/11/facebook-now-allows-you-to-tag-pages-in-photos/>.*

"3 Ways to Use Facebook Insights to Your Advantage"; Nathan Hangen; SocialMediaExaminer; published prior to May 11, 2011; <http://www.socialmediaexaminer.com/3-ways-to-use-facebook-insights-to-your-advantage/>.*

"How to: Get Rid of Annoying Facebook Notifications"; Stan Schroeder; mashable.com; published Aug. 18, 2009; <http://mashable.com/2009/08/18/get-rid-facebook-notifications>.*

"Should Facebook add a dislike button?"; Pete Cashmore; CNNTech; Published prior to Jul. 25, 2010; <http://www.cnn.com/2010/TECH/social.media/07/22/facebook.dislike.cashmore>.*

"Social Media Influence Marketing: When the User Becomes the Ambassador"; Raymond Morin; Published: Feb. 26, 2013; <https://maximizesocialbusiness.com/social-media-influence-marketing-user-ambassador-8195/>.*

"How Far Does a Tweet Travel? Information Brokers in the Twitterverse"; Diederick van Liere; University of Toronto; 2010 (Year: 2010).*

* cited by examiner

SYSTEM AND METHOD FOR UTILIZING ANNOTATED IMAGES TO FACILITATE INTERACTIONS BETWEEN COMMERCIAL AND SOCIAL USERS

RELATED APPLICATIONS

This patent application claims priority from provisional U.S. patent application No. 61/911,721, filed Dec. 4, 2013, entitled "SYSTEM AND METHOD FOR UTILIZING ANNOTATED IMAGES TO FACILITATE INTERACTIONS BETWEEN COMMERCIAL AND SOCIAL USERS", the disclosure of which is incorporated herein, in its entirety, by reference.

FIELD

The present invention relates generally to utilizing annotated images to facilitate interactions between commercial and social users of an image annotation system.

BACKGROUND

It has long been the case that images viewable on the Internet could be linked to various web pages, including web pages corresponding to e-commerce sites.

More recently, several techniques have been proposed for enabling the tagging of images with information relating to products appearing in those images. For example, Pixazza™ allows the tagging of various portions of an image with links to various websites that may be related to such image. Other related technologies extend tagging to crowd-sourcing. Both of these approaches result in inaccuracies and delays. For example, inaccuracies may be caused by third parties tagging images in which they do not actually know the products and by incorrect links being provided for the tags. Delays can be attributed to the time taken between having taken an image to the time that third parties tag the products.

Additionally, many prior techniques do not maintain the "end-user experience" of viewing the images. For example, prior techniques typically overlay the image with dots or other image-obscuring graphics in order to signal to a user that the image is tagged. Such techniques reduce the visual aesthetics of the image.

It is an object of the present invention to obviate or mitigate at least some of the disadvantages of the known methods.

SUMMARY

In accordance with an aspect of an embodiment of the invention, there is provided a method for matching at least one social user of a plurality of social users with a commercial user of a plurality of commercial users of an image annotation system. The image annotation system comprises a processor, a data storage module, and a communication module for communicating with a plurality of computing devices operated by respective social users of the plurality of social users and respective commercial users of the plurality of commercial users.

The method for matching the at least one social user with the commercial user comprises storing a plurality of annotated images on the data storage module. Each annotated image of the plurality of annotated images comprises an image in linked association with an image data record, such that the image is retrievable from being stored based on the image data record, and the image data record is retrievable from being stored based on the image. Each image data record comprises judgment data and at least one social user identifier. The judgment data corresponds to at least one judgment made by at least one social user of the plurality of social users regarding the image. The at least one social user identifier comprises a distinct social user identifier for each of the at least one social user, wherein for each social user identifier the communication module is operable to communicate with a respective computing device of a corresponding social user based on the social user identifier. The method further comprises storing a plurality of commercial user records on the data storage module. Each commercial user record comprises information regarding a commercial user of the plurality of commercial users, and a commercial user identifier. The communication module is operable to communicate with a computing device of the commercial user based on the commercial user identifier. The method further comprises, for at least one annotated image of the plurality of annotated images, deriving at least one commercial user search criterion based on the at least one annotated image. The method further comprises searching the plurality of commercial user records based on the at least one commercial user search criterion to determine the commercial user having a commercial user record satisfying a search criterion of the at least one commercial user search criterion.

In accordance with a further aspect of an embodiment of the invention, the method for matching the at least one social user with the commercial user further comprises, for each social user of the at least one social user, storing a social user record on the data storage module, wherein the social user record comprises information regarding that social user. The method further comprises operating the communication module to transmit a communication, which comprises information derived based on social user records of each of one or more of the at least one social user, to the computing device of the commercial user.

In accordance with a further aspect of an embodiment of the invention, the method for matching the at least one social user with the commercial user further comprises, for each social user of the at least one social user, operating the communication module to transmit a communication to the computing device of that social user. The communication comprises information derived based on the commercial user record of the commercial user.

In accordance with a further aspect of an embodiment of the invention, the method for matching the at least one social user with the commercial user further comprises receiving at the communication module from the computing device of the commercial user a first communication and a communication request. The method further comprises operating the processor to determine the at least one social user from the communication request, which is a request for the communication module to transmit the first communication to the at least one social user. The method further comprises, for each social user of the at least one social user, operating the communication module to transmit a second communication, which is derived based on the first communication, to the computing device of that social user. The second communication is transmitted in response to receiving the first communication and the communication request from the computing device of the commercial user.

In accordance with a further aspect of an embodiment of the invention, the method for matching the at least one social user with the commercial user further comprises, for each social user of the at least one social user, storing a social user record on the data storage module. The social user record comprises information regarding that social user. The information regarding that social user comprises at least one of an age of that social user, a gender of that social user, and a geographic location at which that social user resides. The method further comprises, before receiving at the communication module from the computing device of the commercial user the first communication and the communication request, operating the communication module to transmit a precursor communication to the computing device of the commercial user. The precursor communication comprises information derived based on social user records of each of one or more of the at least one social user.

In accordance with a further aspect of an embodiment of the invention, the at least one social user comprises a first social user and the at least one annotated image comprises a first annotated image. The first annotated image comprises a first image and a first image data record. The method for matching the at least one social user with the commercial user further comprises receiving at the communication module a request from the first social user to transmit the first annotated image to respective computing devices of other social users of the plurality of social users. The method further comprises, upon receiving the request from the computing device of the first social user, operating the communication module to transmit the first annotated image to the respective computing devices of the other social users.

In accordance with a further aspect of an embodiment of the invention, the method for matching the at least one social user with the commercial user further comprises operating the processor to collect statistical data regarding the first social user and to store the statistical data on the data storage module in a metric record for the first social user. The statistical data is collected based on actions of the other social users subsequent to receiving the first annotated image.

In accordance with a further aspect of an embodiment of the invention, the method for matching the at least one social user with the commercial user further comprises, before receiving at the communication module from the computing device of the commercial user the first communication and the communication request, operating the communication module to transmit a precursor communication to the computing device of the commercial user. The precursor communication comprises information derived based on the metric record for the first social user.

In accordance with a further aspect of an embodiment of the invention, the actions of the other social users used to collect the statistical data comprise at least one of i) viewings of the first annotated image by each social user of the other social users; ii) judgments regarding the first annotated image made by each social user of the other social users; and iii) subsequent requests transmitted to the communication module from respective computing devices of the other social users to transmit the first annotated image to additional social users of the plurality of social users. The first annotated image is updated based on any subsequent judgments regarding the first annotated image made by each social user of the other social users.

In accordance with a further aspect of an embodiment of the invention, the actions of the other social users used to collect the statistical data comprise subsequent requests transmitted to the communication module from respective computing devices of the other social users to transmit the first annotated image to additional social users of the plurality of social users. The first annotated image is updated based on any subsequent judgments regarding the first annotated image made by each social user of the other social users. The method for matching the at least one social user with the commercial user further comprises operating the processor to collect additional statistical data regarding the first social user based on actions of the additional social users, and to store the additional statistical data in the metric record for the first social user. The additional statistical data is collected subsequent to the additional social users receiving the first annotated image based on the subsequent requests transmitted to the communication module from respective computing devices of the other social users to transmit the first annotated image to the additional social users.

In accordance with a further aspect of an embodiment of the invention, the actions of the other social users used to collect the statistical data comprise judgments regarding the first annotated image made by each social user of the other social users. The method for matching the at least one social user with the commercial user further comprises, for each social user of the other users, operating the processor to update the first image data record to comprise additional judgment data in response to the communication module receiving a request from the computing device of that social user to update the first image data record to comprise additional judgment data corresponding to at least one judgment made by that social user. The additional judgment data corresponds to at least one judgment made by that social user regarding the first image.

In accordance with a further aspect of an embodiment of the invention, the method for matching the at least one social user with the commercial user further comprises receiving at the communication module from the computing device of the commercial user a first communication and a communication request. The communication request is a request for the communication module to transmit the first communication to the at least one social user. The method further comprises operating the processor to determine the at least one social user from the communication request. The method further comprises, for each social user of the at least one social user, operating the communication module to transmit to the computing device of that social user a second communication in response to receiving the first communication and the communication request from the computing device of the commercial user. The second communication is derived based on the first communication. The method further comprises storing on the data storage module a communication-permission record for that social user. The communication-permission record is configured to indicate whether that social user permits the communication module to transmit content from the commercial user to the computing device of that social user. The method further comprises operating the processor to determine based on the communication-permission record for that social user whether the communication module is permitted to transmit content from the commercial user to the computing device of that social user. The method further comprises operating the communication module to transmit to the computing device of that social user the second communication if and only if it is determined based on the communication-permission record of that social user that the communication module is permitted to transmit content from the commercial user to the computing device of that social user.

In accordance with a further aspect of an embodiment of the invention, the method for matching the at least one social user with the commercial user further comprises, for each user of the at least one social user, if the communication-permission record for that social user indicates that that social user permits the communication module to transmit content from the commercial user to the computing device of that social user, then operating the communication module to receive a request from the computing device of that social user to not transmit content from the commercial user to the computing device of that social user, and in response to receiving the request from the computing device of that social user to not transmit content from the commercial user to the computing device of that social user, update the communication-permission record of that social user to indicate that that social user does not permit the communication module to transmit content from the commercial user to the computing device of that social user. The method further comprises, for each user of the at least one social user, if the communication-permission record for that social user indicates that that social user does not permit the communication module to transmit content from the commercial user to the computing device of that social user, then operating the communication module to receive a request from the computing device of that social user to transmit content from the commercial user to the computing device of that social user, and in response to receiving the request from the computing device of that social user to transmit content from the commercial user to the computing device of that social user, update the communication-permission record of that social user to indicate that that social user permits the communication module to transmit content from the commercial user to the computing device of that social user.

In accordance with a further aspect of an embodiment of the invention, the at least one social user comprises a first social user and a second social user, and the method for matching the at least one social user with the commercial user further comprises receiving at the communication module from the computing device of the commercial user a first communication, a first communication request, a second communication, and a second communication request. The first communication is different from the second communication. The first communication request is a request for the communication module to transmit the first communication to the first social user, and the second communication request is a request for the communication module to transmit the second communication to the second social user. The method further comprises operating the processor to determine the first social user from the first communication request. The method further comprises operating the processor to determine the second social user from the second communication request. The method further comprises operating the communication module to transmit a third communication to the computing device of the first social user in response to receiving from the computing device of the commercial user the first communication and the first communication request. The third communication is derived based on the first communication. The method further comprises operating the communication module to transmit a fourth communication to the computing device of the second social user in response to receiving from the computing device of the commercial user the second communication and the second communication request. The fourth communication is derived based on the second communication, and the third communication is different from the fourth communication.

In accordance with a further aspect of an embodiment of the invention, the at least one annotated image comprises an annotated image. The annotated image comprises an image data record. The image data record comprises judgment data corresponding to a first judgment made by the first social user and a second judgment made by the second social user. The first judgment is different from the second judgment. Further, the first communication request comprises a first judgment identifier for identifying the first judgment, and the second communication request comprising a second judgment identifier for identifying the second judgment. The method for matching the at least one social user with the commercial user further comprises operating the processor to determine the first social user based on the first judgment identifier and the second social user based on the second judgment identifier. The method further comprises, before receiving at the communication module from the computing device of the commercial user the first communication, the first communication request, the second communication, and the second communication request, operating the communication module to transmit a first precursor communication and a second precursor communication to the computing device of the commercial user. The first precursor communication comprises information derived based on the first judgment, and the second precursor communication comprises information derived based on the second judgment.

In accordance with a further aspect of an embodiment of the invention, the at least one annotated image comprises a first annotated image and a second annotated image. The first annotated image is different from the second annotated image. Further, the first communication request comprises a first annotated image identifier for identifying the first annotated image, and the second communication request comprising a second annotated image identifier for identifying the second annotated image. The method for matching the at least one social user with the commercial user further comprises operating the processor to determine the first social user based on the first annotated image identifier, and the second social user based on the second annotated image identifier. The method further comprises, before receiving at the communication module from the computing device of the commercial user the first communication, the first communication request, the second communication, and the second communication request, operating the communication module to transmit a first precursor communication and a second precursor communication to the computing device of the commercial user. The first precursor communication comprises information derived based on the first annotated image, and the second precursor communication comprises information derived based on the second annotated image.

In accordance with an aspect of an embodiment of the invention, there is provided a system for matching at least one social user of a plurality of social users with a commercial user of a plurality of commercial users of an image annotation system. The image annotation system comprises a processor, a data storage module, and a communication module for communicating with a plurality of computing devices operated by respective social users of the plurality of social users and respective commercial users of the plurality of commercial users. The data storage module is configured to store a plurality of annotated images. Each annotated image of the plurality of annotated images comprises an image in linked association with an image data record such that the image is retrievable from being stored based on the image data record, and the image data record is retrievable from being stored based on the image. Each image data record comprises judgment data corresponding to at least one judgment made by at least one social user of the plurality of social users regarding the image, and at least one social user identifier comprising a distinct social user identifier for each of the at least one social user. For each social user identifier the communication module is operable to communicate with a respective computing device of a corresponding social user based on the social user identifier. The data storage module is further configured to store a plurality of commercial user records. Each commercial user record comprises information regarding a commercial user of the plurality of commercial users, and a commercial user identifier. The communication module is operable to communicate with a computing device of the commercial user based on the commercial user identifier. The processor is configured to, for at least one annotated image of the plurality of annotated images, derive at least one commercial user search criterion based on the at least one annotated image. The processor is further configured to search the plurality of commercial user records based on the at least one commercial user search criterion to determine the commercial user having a commercial user record satisfying a search criterion of the at least one commercial user search criterion.

In accordance with a further aspect of an embodiment of the invention, for each social user of the at least one social user, the data storage module is further configured to store a social user record. The social user record comprises information regarding that social user. Further, the communication module is configured to transmit a communication to the computing device of the commercial user, wherein the communication comprises information derived based on social user records of each of one or more of the at least one social user.

In accordance with a further aspect of an embodiment of the invention, for each social user of the at least one social user, the communication module is configured to transmit a communication to the computing device of that social user, wherein the communication comprises information derived based on the commercial user record of the commercial user.

In accordance with a further aspect of an embodiment of the invention, the communication module is configured to receive a first communication and a communication request from the computing device of the commercial user. The processor is configured to determine the at least one social user from the communication request, the communication request being a request for the communication module to transmit the first communication to the at least one social user. Further, for each social user of the at least one social user, the communication module is further configured to transmit a second communication derived based on the first communication to the computing device of that social user in response to receiving the first communication and the communication request from the computing device of the commercial user.

In accordance with a further aspect of an embodiment of the invention, for each social user of the at least one social user, the data storage module is configured to store a social user record. The social user record comprises information regarding that social user, and the information regarding that social user comprises at least one of an age of that social user, a gender of that social user, and a geographic location at which that social user resides. Further, before receiving at the communication module from the computing device of the commercial user the first communication and the communication request, the communication module is configured to transmit a precursor communication to the computing device of the commercial user. The precursor communication comprises information derived based on social user records of each of one or more of the at least one social user.

In accordance with a further aspect of an embodiment of the invention, the at least one annotated image comprises a first annotated image having a first image and a first image data record, and the at least one social user comprises a first social user. The communication module is configured to receive a request from the first social user to transmit the first annotated image to respective computing devices of other social users of the plurality of social users. Further, upon receiving the request from the computing device of the first social user, the communication module is configured to transmit the first annotated image to the respective computing devices of the other social users.

In accordance with a further aspect of an embodiment of the invention, the processor is operable to collect statistical data regarding the first social user based on actions of the other social users subsequent to receiving the first annotated image. The processor is further operable to store the statistical data on the data storage module in a metric record for the first social user.

In accordance with a further aspect of an embodiment of the invention, before receiving at the communication module from the computing device of the commercial user the first communication and the communication request, the communication module is configured to transmit a precursor communication to the computing device of the commercial user. The precursor communication comprises information derived based on the metric record for the first social user.

In accordance with a further aspect of an embodiment of the invention, the actions of the other social users used to collect the statistical data comprise at least one of i) viewings of the first annotated image by each social user of the other social users; ii) judgments regarding the first annotated image made by each social user of the other social users; and iii) subsequent requests transmitted to the communication module from respective computing devices of the other social users to transmit the first annotated image, updated based on any subsequent judgments regarding the first annotated image made by each social user of the other social users, to additional social users of the plurality of social users.

In accordance with a further aspect of an embodiment of the invention, the actions of the other social users used to collect the statistical data comprise subsequent requests transmitted to the communication module from respective computing devices of the other social users to transmit the first annotated image, updated based on any subsequent judgments regarding the first annotated image made by each social user of the other social users, to additional social users of the plurality of social users. The processor is further operable to collect additional statistical data regarding the first social user based on actions of the additional social users, subsequent to receiving the first annotated image based on the subsequent requests transmitted to the communication module from respective computing devices of the other social users to transmit the first annotated image to the additional social users. The processor is further operable to store the additional statistical data in the metric record for the first social user.

In accordance with a further aspect of an embodiment of the invention, the actions of the other social users used to collect the statistical data comprise judgments regarding the first annotated image made by each social user of the other social users. For each social user of the other users, the processor is further operable to update the first image data record to comprise additional judgment data corresponding to at least one judgment made by that social user regarding the first image in response to the communication module receiving a request from the computing device of that social user to update the first image data record to comprise the additional judgment data corresponding to at least one judgment made by that social user.

In accordance with a further aspect of an embodiment of the invention, the communication module is configured to receive from the computing device of the commercial user a first communication and a communication request. The processor is configured to determine the at least one social user from the communication request. The communication request is a request for the communication module to transmit the first communication to the at least one social user. Further, for each social user of the at least one social user, the communication module is configured to transmit to the computing device of that social user a second communication in response to receiving the first communication and the communication request from the computing device of the commercial user, wherein the second communication is derived based on the first communication. The data storage module is configured to store a communication-permission record for that social user. The communication-permission record is configured to indicate whether that social user permits the communication module to transmit content from the commercial user to the computing device of that social user. The processor is configured to determine based on the communication-permission record for that social user whether the communication module is permitted to transmit content from the commercial user to the computing device of that social user. The communication module is further configured to transmit to the computing device of that social user the second communication if and only if it is determined based on the communication-permission record of that social user that the communication module is permitted to transmit content from the commercial user to the computing device of that social user.

In accordance with a further aspect of an embodiment of the invention, for each user of the at least one social user, if the communication-permission record for that social user indicates that that social user permits the communication module to transmit content from the commercial user to the computing device of that social user, then the communication module is configured to receive a request from the computing device of that social user to not transmit content from the commercial user to the computing device of that social user, and in response to receiving the request from the computing device of that social user to not transmit content from the commercial user to the computing device of that social user, update the communication-permission record of that social user to indicate that that social user does not permit the communication module to transmit content from the commercial user to the computing device of that social user. Further, if the communication-permission record for that social user indicates that that social user does not permit the communication module to transmit content from the commercial user to the computing device of that social user, then the communication module is configured to receive a request from the computing device of that social user to transmit content from the commercial user to the computing device of that social user, and in response to receiving the request from the computing device of that social user to transmit content from the commercial user to the computing device of that social user, update the communication-permission record of that social user to indicate that that social user permits the communication module to transmit content from the commercial user to the computing device of that social user.

In accordance with a further aspect of an embodiment of the invention, the at least one social user comprises a first social user and a second social user. The communication module is configured to receive from the computing device of the commercial user a first communication, a first communication request, a second communication, and a second communication request. The first communication is different from the second communication. The processor is configured to determine the first social user from the first communication request, the first communication request being a request for the communication module to transmit the first communication to the first social user. The processor is further configured to determine the second social user from the second communication request, the second communication request being a request for the communication module to transmit the second communication to the second social user. The communication module is configured to transmit a third communication derived based on the first communication to the computing device of the first social user in response to receiving from the computing device of the commercial user the first communication and the first communication request. The communication module is further configured to transmit a fourth communication derived based on the second communication to the computing device of the second social user in response to receiving from the computing device of the commercial user the second communication and the second communication request. In addition, the third communication is different from the fourth communication.

In accordance with a further aspect of an embodiment of the invention, the at least one annotated image comprises an annotated image having an image data record comprising judgment data corresponding to a first judgment made by the first social user and a second judgment made by the second social user. The first judgment is different from the second judgment. The first communication request comprises a first judgment identifier for identifying the first judgment and the second communication request comprises a second judgment identifier for identifying the second judgment. The processor is configured to determine the first social user based on the first judgment identifier and the second social user based on the second judgment identifier. Before receiving at the communication module from the computing device of the commercial user the first communication, the first communication request, the second communication, and the second communication request, the communication module is configured to transmit a first precursor communication and a second precursor communication to the computing device of the commercial user. The first precursor communication comprises information derived based on the first judgment and the second precursor communication comprises information derived based on the second judgment.

In accordance with a further aspect of an embodiment of the invention, the at least one annotated image comprises a first annotated image and a second annotated image. The first annotated image is different from the second annotated image. The first communication request comprises a first annotated image identifier for identifying the first annotated image and the second communication request comprises a second annotated image identifier for identifying the second annotated image. The processor is configured to determine the first social user based on the first annotated image identifier and the second social user based on the second annotated image identifier. Before receiving at the communication module from the computing device of the commercial user the first communication, the first communication request, the second communication, and the second communication request, the communication module is configured to transmit a first precursor communication and a second precursor communication to the computing device of the commercial user. The first precursor communication comprises information derived based on the first annotated image and the second precursor communication comprises information derived based on the second annotated image.

BRIEF DESCRIPTION OF THE DRAWINGS

The features of the invention will become more apparent in the following detailed description in which reference is made to the appended drawings wherein.

DETAILED DESCRIPTION

Figure 1:
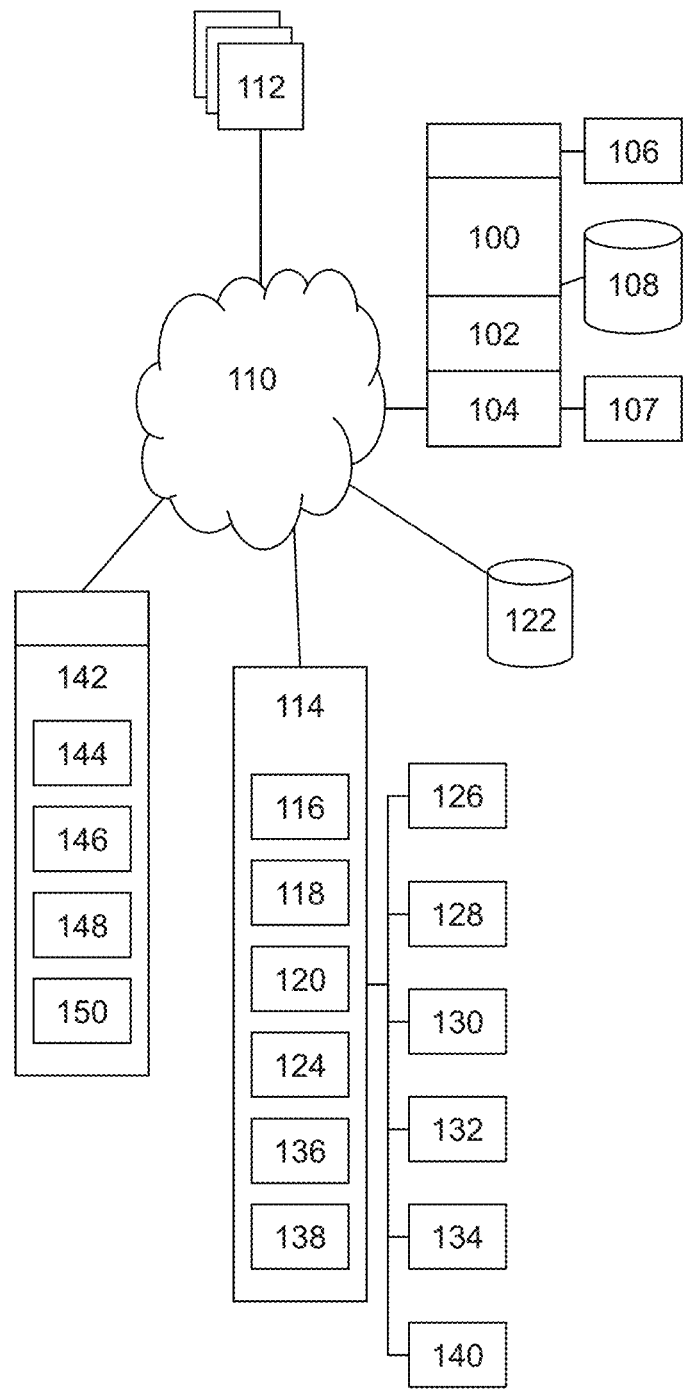
FIG. 1 is a block diagram of an image annotation system.

Embodiments will now be described with reference to the figures. It will be appreciated that for simplicity and clarity of illustration, where considered appropriate, reference numerals may be repeated among the figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, well-known methods, procedures and components have not been described in detail so as not to obscure the embodiments described herein. Also, the description is not to be considered as limiting the scope of the embodiments described herein.

It will also be appreciated that any module, component, server, computer, terminal, or device exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both. Any such computer storage media may be part of the device or accessible or connectable thereto. Any application or module herein described may be implemented using computer readable/executable instructions that may be stored or otherwise held by such computer readable media.

In general, the present invention provides, in one aspect, a method and system for electronically annotating an image, or preferably, specific portions of an image, with information. In one aspect, a user may generate an image, annotate the image, and upload or otherwise disseminate the annotated image to a web page or the like.

In one aspect, the present invention enables a user to annotate an image comprising one or more items by associating one or more labels to a respective item. Each item may correspond to a particular area of the image. The user or an image annotation utility annotates the item by supplying item information that is associated with the label. The image can be transmitted, uploaded or otherwise communicated to other users (recipients) that can view the image and access item information by selecting the respective item in the image.

Referring to FIG. 1, an image annotation system is shown. The image annotation system comprises a network accessible server 100. The server 100 comprises a processor 102 and a memory 104. The memory 104 has stored thereon computer instructions which, when executed by the processor 102, provides an item linking utility 106 and may provide a statistical tracking utility 107.

The server 100 also includes or is linked to a database 108. The server is further linked by a network 110, such as the Internet, to a plurality of third party websites 112.

Figure 2:
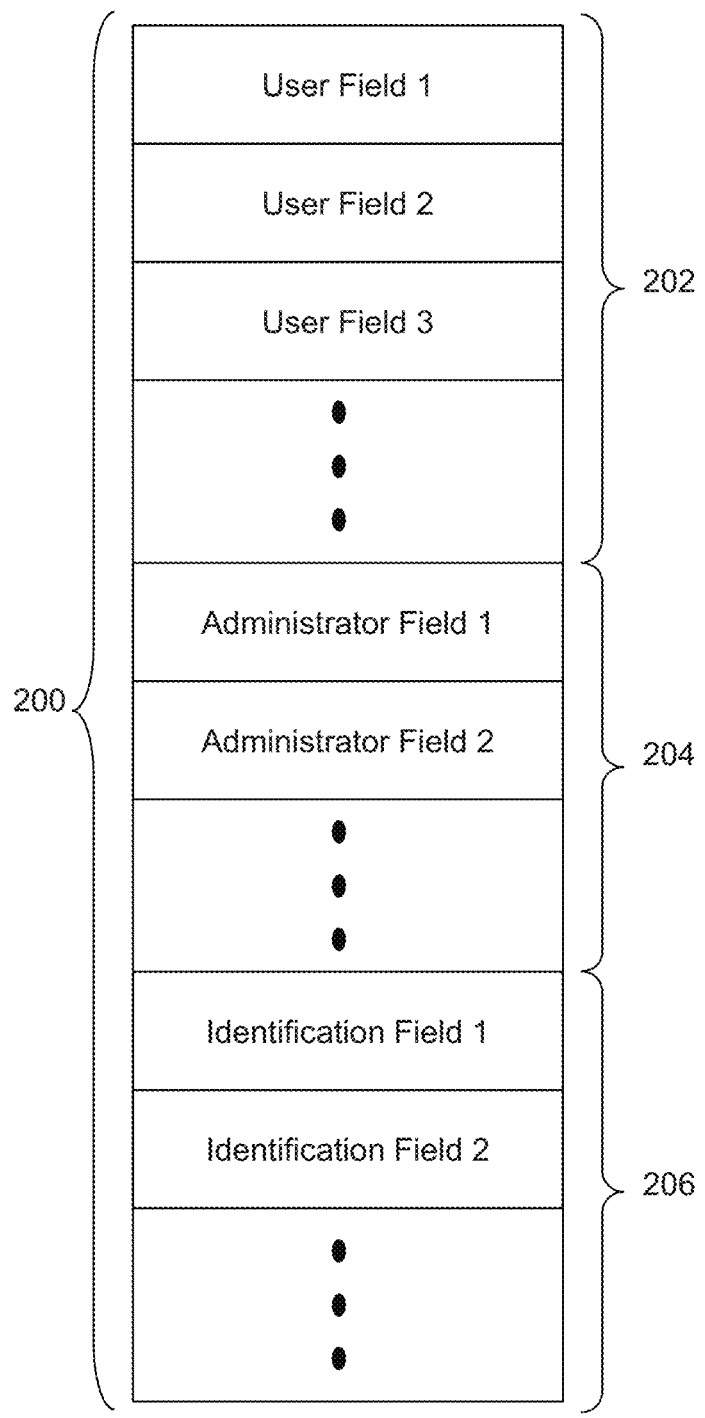
FIG. 2 is a graphical representation of an example of a record.

The database 108 includes a plurality of records, each of which comprises a plurality of fields. Referring now to FIG. 2, the fields 200 may comprise one or more user fields 202 and one or more administrator fields 204. The fields may further comprise one or more identification fields 206.

User fields are fields that may be accessed and edited by a user. User fields typically comprise fields enabling the user to describe an image and/or an item appearing therein. For example, user fields may be one or more item name fields enabling the user to input a name, such as the brand-name or other descriptive information, corresponding to an item appearing in an image. Further user fields may comprise one or more category (including one or more subcategory, which may be hierarchical) fields enabling the user to input one or more categories (or subcategories) corresponding to the item; a rating field enabling the user to input a qualitative (need vs. love vs. like vs. want vs. have, or other analogous terms, for example) or quantitative (on a scale of 1 to 5, for example) rating for an item; one or more comment fields enabling one or more users to input one or more comments regarding the item; a location field enabling the user to input a textual description of the location at which an image was captured, or the location at which an item appearing in the image is located; a cost field enabling the user to input a cost of the item, if applicable; and a user category field to enable the user to categorize themselves relative to an item (for example, an owner of a business that produces an item in an image can categorize themselves as "business owner" for that item, while a member of the public in general could identify themselves as a "user"). The rating field could alternatively be substituted or augmented by individual rating fields for various qualitative measures, such as a "love" field, "like" field, "want" field and "have" field, for example. The administrator may also be able to access and edit user fields.

Administrator fields are fields that may be accessed and edited by an administrator. Administrator fields typically comprise fields enabling an administrator to describe an image and/or an item appearing therein. For example, one administrator field may be a link field enabling the administrator to input a link to a web page corresponding to an item. For example, the link may be to a web page enabling a user to purchase the item, or a web page leading to such other web page. For example, where the items are generally products that can be purchased, the administrator fields may comprise a SKU field or one or more product image fields. The item name fields, category fields, comment fields, location fields, user category fields, and cost fields, previously described in the user fields, could alternatively or in conjunction be administrator fields. Other web pages that are contemplated by the image annotation system would display further information about the item, such as historical information.

By enabling users to enter only specific information corresponding to one or more specific fields (user fields), the administrator may control the particular information that is associated with an image or an item appearing in the image. For example, the administrator may control the particular web pages to which each item is linked. This provides increased accuracy for recipients of the image when attempting to access a web page, since an administrator can, for example, verify the accuracy of user input. This further requires less effort on the part of users to complete the fields.

It shall be appreciated that the administrator may be an individual or entity operating the server 100, or could be an automated utility executable on a server 100, a mobile device 114, a client computer 142, or another computer system.

Identification fields are used to store identifying information regarding a particular image. For example, the identification fields may comprise a user identification field to identify the user that captured an image or labelled an item; an image identification field to identify the image by an identifier; an intra-image item identification field to identify each item within the image; and a generated location field to identify the location at which the image was captured. Generally, identification fields may be generated based on automated information, such as information generated by the mobile device 114 and/or by user credentials.

The database 102 may be preloaded with a plurality of records.

Referring back to FIG. 1, in one aspect, a mobile device 114 is operable to access the server 100 by the network 110. The mobile device preferably includes a network module 116, including one or more of a cellular transceiver communicable with a cellular network that is linked to the network 110 (for example, using GPRS, WiMAX, a 3G protocol, a 4G protocol, etc.), Wi-Fi transceiver communicable with a Wi-Fi gateway linked to the network 110, Bluetooth transceiver communicable with a Bluetooth gateway linked to the network 110, or another transceiver, operable to enable the mobile device 114 to connect to the network 110.

The mobile device 114 preferably comprises a camera 118 enabling a user of the mobile device to capture images and/or video using the mobile device 114. The mobile device 114 may include a memory 120 to which an image can be uploaded. The memory 120 further enables images and/or video to be temporarily or permanently stored to the mobile device 114. The memory 120 may comprise a RAM, ROM, Flash, magnetic drive, or other memory medium. Alternatively, the mobile device 114 may transmit images to a remote location 122, via the network module, for storage.

The mobile device 114 preferably comprises a processor 124 that is operable to execute computer instructions. The memory 120 has stored thereon computer instructions which, when executed by the processor 124, provides one or more computer applications, such as an operating system, a web browser 126, one or more user applications 128 (e.g., "apps" as they may be known), an image capture utility 130, an image annotation utility 132, an image viewing utility 134, and an analytics viewing utility 135. In this regard, the term "utility" includes a "module" or other hardware component operable to perform the functionality described herein. Furthermore, more than one of the utilities may be provided in any one such hardware component or, similarly, the various utilities could be provided on a distributed basis in a plurality of hardware components.

It will be appreciated that the mobile device 114 executes the operating system and that the operating system provides a means for launching other computer applications, including but not limited to those specified above.

The mobile device 114 additionally comprises an input/output (I/O) device 136. The I/O device 136 may comprise a keyboard, mouse, trackpad, trackball, scroll wheel, remote control, touch-screen display, or other input device for obtaining input from a user of the mobile device 114. The I/O device 136 could further include a microphone (not shown) and a voice recognition module (not shown) operable to obtain input via a user's voice.

The I/O device 136 may comprise a display for providing output to the user.

In one aspect, the I/O device 136 is a touch-screen display enabling both input and output. In this regard, the use of the term "click" in the following description would include touching one or more particular points on the display. Further, the touch-screen display may be adapted for providing a virtual keyboard for obtaining input from a user.

The mobile device may further comprise a location module 138, such as a GPS module, operable to obtain location data from an external source. The location data may comprise latitude, longitude, elevation, etc.

The mobile device may further provide a search utility 140.

In another aspect, a network connected client computer 142 is operable to access the server 100. The client computer 142 has a memory 144 and a processor 146. The memory 144 has stored thereon computer instructions which, when executed by the processor 146, provides an image annotation utility 148. The image annotation utility 148 may be substantially similar in functionality to the image annotation utility 132. The client computer 142 further includes an I/O device 148, which may be any of the previously described I/O devices. The client computer 142 may, for example, be a mobile device, tablet computer, laptop computer, desktop computer, computer server, etc.

It will be appreciated that the mobile device 114 and the client computer 142 each may provide the functionality described below. For this reason, the following description describes the invention with relation to the mobile device 114; however, it will be appreciated that the client computer 142 can therefore be substituted for the mobile device 114. Furthermore, the client computer 142 may further comprise a camera 150 to provide the enhanced functionality described below.

A client computer 142 provided without a digital camera and/or an image capture utility may be particularly suited for enabling third parties, that is, parties that did not capture an image, to annotate that image as described below. Such functionality may, for example, be advantageous for use by manufacturers, vendors, other interested persons, etc. that are not capturing images.

Figure 3:
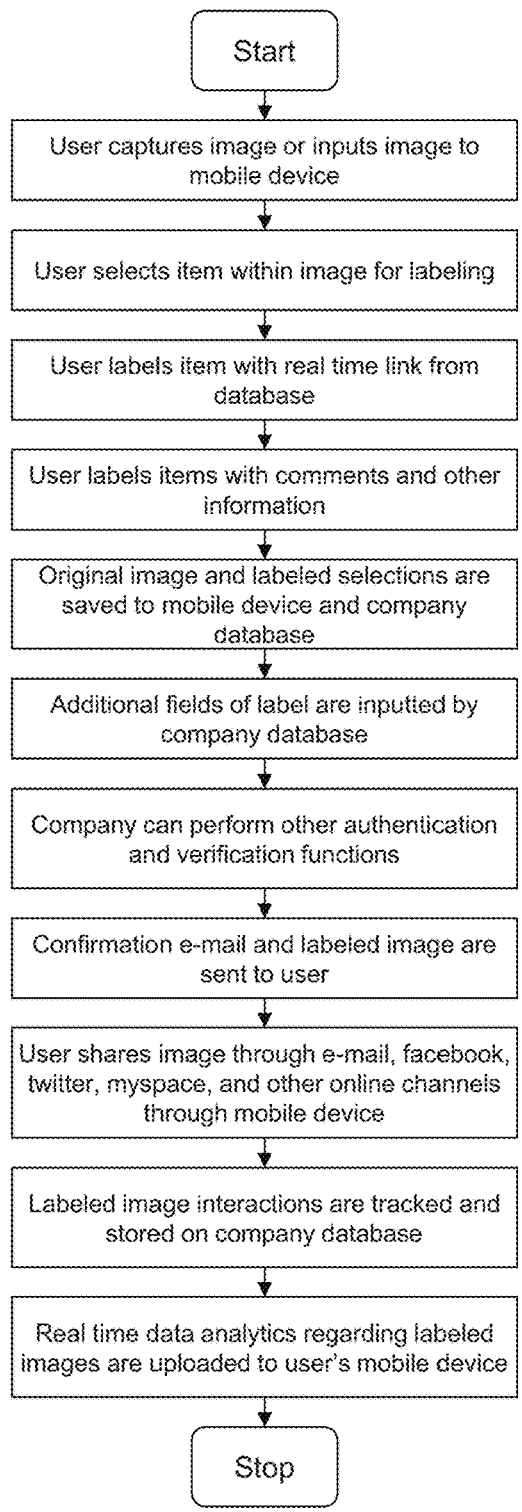
FIG. 3 is a flowchart illustrating an example use of the image annotation system.

Turning now to FIG. 3, a flowchart is shown illustrating an example embodiment of the image annotation system in use. A user operates the mobile device to launch the image capture utility. Optionally, the mobile device automatically logs in to the server to establish user credentials for the user, or requests the user to provide user credentials to the server. The user credentials may comprise a user identifier and password, and may further comprise information, including demographic information, regarding the user.

The image capture utility is operable to capture still images or video (hereinafter, collectively "images") using the digital camera of the mobile device. Alternatively, the image capture utility is operable to capture images displayed in a third party application executed on a client computer. For example, the image capture utility may be presented as a toolbar embedded within a web browser running on the client computer, wherein the toolbar accepts a user command to capture by "fetching" or "scraping" one or more images displayed on a particular web page being displayed in the web browser.

Upon capturing an image, the image capture utility may prompt the user to save, email (or otherwise share), or perform some other operation using the image. The image capture utility may also prompt the user to launch, or may automatically launch, the image annotation utility. The image annotation utility displays the captured or stored image on the display of the mobile device.

Alternatively, rather than capturing an image, the image annotation utility may enable the user to access an image previously stored on the memory of the mobile device, the memory of the server, or a remote location. For example, a user of a client computer not equipped with a digital camera may access an image on a web page displayed on the web browser. In this particular example, the image annotation utility may be a plug-in to a web browser enabling the user to annotate any image appearing on any web page on any third party website on the Internet.

The image annotation utility enables the user to select the image or items shown in the image for labelling. For example, the I/O device may enable the user to apply gestures to a touch-screen display to zoom the image, select items appearing in the image, etc.

In one aspect, a user selects an area of the image that corresponds to the item.

To select an item appearing in the image, for example, the user can tap a point in proximity of the item. The selected area of the image may be defined by a predetermined area surrounding the point. For example, the selected area may be defined by a circle of a predetermined radius surrounding the point. Similarly, the predetermined area could correspond to a square, rectangle or any other shape.

Alternatively, the user could draw an outline, or boundary points, on a screen, such as a touch-screen, to define the area. Further still, the user could tap a point in proximity of the item and an image processing algorithm could be used to more accurately determine the outline of the area corresponding to the item that underlies that point.

Alternatively, the user could manually select all points in the area. For example, the I/O device could display the image in greyscale and the user could repeatedly swipe along the area to be "colored in". Portions that are swiped could appear in color to illustrate to the user the area that has been selected.

Alternatively, a multi-touch gesture could be used to select the area. For example, a user could delineate two opposed corners of a rectangle to enclose the area by touching the two corners with two fingers.

Alternatively, an image processing algorithm could define and identify to the user one or more areas in the image. The user could click to select one of the areas.

Once the item has been selected, the image annotation utility applies, or enables the user to apply, one or more labels to the item. Each label may include a plurality of fields that correspond to the fields of each record in the database. The image annotation utility edits, or enables the user to access and edit, one or more of the user fields in the label.

In one aspect, the image annotation utility may edit of the user fields in the label for the item by, for example, applying image recognition to identify one or more items in an image and edit the one or more user fields for the one or more labels to each of the one or more items.

In another aspect, the image annotation utility enables the user to access and edit one or more of the user fields in the label.

The image annotation utility may communicate with the database, or a cached version thereof on the mobile device, to provide to the user a real-time listing of possible field entries for the particular user field being edited. For example, a user accessing and editing an item name field of the label may be presented with a real-time listing of possible item names to apply to that field. A real-time listing of possible field entries can be provided for any such user field.

Additionally, the image annotation utility may constrain the listing of possible field entries based on labels previously stored on the memory of the server. In specific examples, fields of a label can be considered to represent a particular hierarchy. For example, a first user field may be a retailer name and a second user field may be a product name. Thus, if the user has already entered the retailer name and is in the process of entering the product name, the possible field entries of the product name can be obtained from previously stored labels that include the specified retailer name. In other words, the retailer name is a node from which the retailer's various product names can be considered to branch.

For example, previously stored labels may indicate that retailer A has products 1, 2, 3, 4, and 5. Thus, the image annotation utility can assume that for a label specifying A as the retailer name, the possible product name entries are 1, 2, 3, 4, and 5. The image annotation utility can, therefore, present these possible field entries to the user.

The real-time listing of possible field entries may be limited to a preconfigured number of the most relevant possible field entries to the user. For example, the real-time listing may list five possible field entries to the user.

The user may provide input for each user field of the label using a virtual keyboard provided by the touch-screen display. As the user types each letter of a desired user field, the real-time listing of possible field entries may display ever-increasingly relevant field entry options to the user. For example, if the user types the letter "A", the real-time listing may display the preconfigured number of most likely field entries that begin with the letter "A". If the user next types the letter "B", the real-time listing may display the preconfigured number of field entries that begin with the letters "AB".

The user may then select one of the listed field entry options rather than manually typing the remaining portion of the desired user field.

Optionally, if the desired user field does not appear as one of the listed fields, the user can complete typing the desired field of the label.

Figure 4:
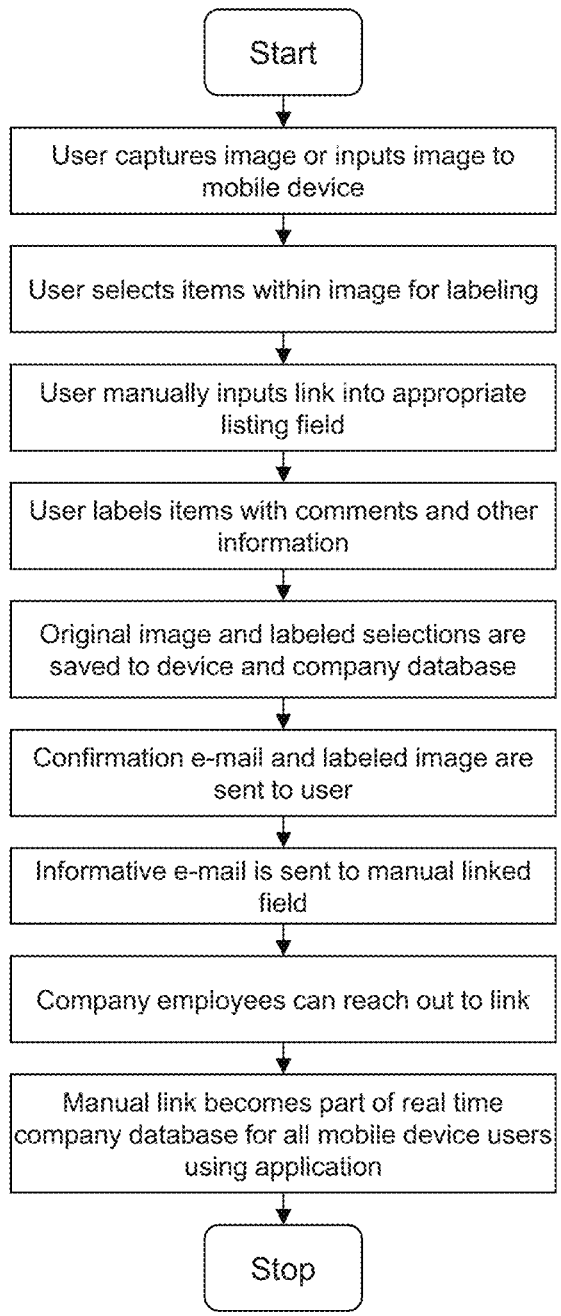
FIG. 4 is a flowchart illustrating another example use of the image annotation system.

Referring therefore to FIG. 4, a user may access an image and select from within the image an item to be labelled. The user may manually input information into one or more user fields. If the user field entry does not match to any entries for that user field previously stored on the memory of the server, the entry may be flagged for follow up on the server.

In this case, an administrator of the server can be provided with a notification that there is a flagged entry. The administrator can verify that the field entry accurately represents the item in the image. If so, the administrator may optionally establish a business relationship with a vendor or manufacturer of the item. The administrator may then complete one or more of the administrator fields to complete the label. Optionally, if a business relationship cannot be established, the administrator can delete the label, edit the label, or complete the administrator fields in such a way as to benefit some other party (such as linking the item to a competitor, for example).

Once the desired user field has been selected or inputted by the user, the user can apply the label by selecting a "save" or "apply" command in the image annotation utility.

The user may further provide input to additional user fields of the label if desired. For example, the user may input a comment for the item in a comment field. The comment may, for example, include a user-specified comment regarding the item being labelled. The user may also provide input to a user location field. The image annotation utility may be operable to determine the location, or an approximate location, at which the user is located based on location data obtained by the location module, and can correspondingly provide the user with suggested inputs based on textual representations of the location data. For example, the image annotation utility may include or be operable to access a location listing table that associates location data with textual representations of locations. In a specific example, a particular latitude and longitude may be associated with a particular retail location for an entity "XYZ", so that a user accessing the image annotation utility at that location may be provided with "XYZ" as a suggested entry to the user location field.

Optionally, the image annotation utility may provide input to one or more identification fields of the label. For example, if the particular user that is editing the user fields is associated with a user identifier, for example based on the user credentials, that user identifier may be applied to a user identification field to identify the user that captured and labelled the item.

The image annotation utility associates the label with the item in the image. For example, the image annotation utility may generate an annotation file that includes all labels in an image along with item location information for each item. The item location information may, for example, include pixel locations that define the boundaries of the item. This enables the labels to be associated with the corresponding item when the image is later accessed. In one example, a particular recipient may have received an image captured and shared by a user prior to an administrator having completed the administrator fields for one or more labelled items in that image. The image viewing utility, described more fully below, can access the annotation file from the server.

The annotation file may be a separate file linked to the image or could be integrated into the image file itself. In this regard, the image file may be encoded in a proprietary format.

The image annotation utility may further enable the user to label additional items in the image in a similar way. Optionally, the image annotation utility may be configured to limit the number of items that may be labelled by users for any particular image, for example for ease of accessing the labels when later viewing the image.

In one aspect of the invention, the image capture utility and image annotation utility provide the ability for any particular user to both capture an image and label items in that image within a short period of time, being relatively contemporaneously. This provides timeliness, efficiency, and accuracy in terms of applying the appropriate label to a corresponding item appearing in an image. As will be understood, such a time limited feature serves to reduce the likelihood of the item being labelled incorrectly, or being identified as a similar, but not exact, item. For example, while the brand of a particular item shown in an image may be ambiguous to a viewer of the image, the user capturing the image likely has increased knowledge of the name of the correct brand. In such a case, the user capturing the image is the most ideal person to apply a label to that item.

Alternatively, a plurality of different users may apply labels to various items in a single image.

Once a user has completed labelling items in the image, the user may signal to the image annotation utility that preparation of the annotated image is complete by selecting a "complete" command in the image annotation utility. The image annotation utility may store a copy of the annotated image on the memory of the mobile device and/or cause the mobile device to upload a copy of the annotated image to the server for storage on memory.

The server may generate a unique image identifier and apply the image identifier to the label. The server may also generate a unique intra-image identifier and apply the intra-image identifier to the label.

The item linking utility is operable to access each annotated image stored on the memory of the server. The item linking utility is further operable to access at least all administrator fields of each label and optionally the user fields of each label.

For example, the item linking utility may be operable to provide input to a link field for each label that links the labelled item to one or more web pages on one or more third party websites. For example, a particular labelled item in an annotated image may be a particular brand of shoe. The user may have provided the name of the brand in the item name field of the corresponding label, using the image annotation utility. The item linking utility may be operable to link the label to a web page for purchasing that particular brand of shoe.

The item linking utility may be controlled by an administrator of the server, or could be automated. For example, an administrator may manually associate each new label of each newly uploaded annotated image with a respective web page. Alternatively, the item linking utility could interface to a search engine or a learning algorithm to automatically determine a web page that corresponds to each label.

The item linking utility could further be a hybrid of these two examples, wherein an administrator links a web page to each label having particular attributes, and the item linking utility thereafter automatically links all new labels having those attributes to that web page.

Once the annotated image has been further labelled by the item linking utility, the server stores the annotated image on the memory. The server may further send a copy of the annotated image to the mobile device of the user that labelled the image, which can replace the previously stored copy on that user's mobile device.

By enabling the item linking utility to apply administrator fields, users are not required to perform cumbersome tasks. Users are only required to apply a minimal amount of information to the user fields, sufficient to identify the particular item being labelled.

As can be observed, the user interaction enabled by the image annotation utility, along with the particular label structure disclosed herein, also enables the server to collect meaningful contextual data. The contextual data may include, for example, the particular users that are labelling particular types of items, the locations that those users are capturing and annotating images, the comments that users provide to items captured in images, and the number of different users applying labels to particular images.

The image viewing utility enables the user to access and view the annotated image, including accessing the websites linked to that image by the one or more labels. The image viewing utility may further enable the user to share the annotated image by, for example, sending the annotated image to a recipient by SMS, email, a proprietary messaging application, through a social network, to a blog or photo sharing website, etc. For example, the image may appear on a social network "feed" along with a supporting comment or other accompanying information enabled by the social network. A user sharing an image may also share the image in a poll. For example, the user may configure a poll requesting from recipients feedback relating to the image (e.g., requesting recipients to rate the item in the image).

The user may further configure a subscription list of other users to "follow". For example, a user that is followed by another user may automatically share all images with the other user. Following may be one-way or two-way.

The image viewing utility may further provide recommended followers to a user based on matching information between the users. For example, if both users have assigned a "love" rating to a similar set of items or images, the users may be recommended as followers of each other. The particular attributes that may be considered for matching purposes could be any of the information available to the image viewing utility.

A recipient may receive the annotated image and/or an image for which annotations can be retrieved from the server. The user may select particular recipients to whom to send the image or could share the image generally. It will be appreciated that the user may be required to supply identifying information, such as an email address and password, social network credentials, etc. to enable sharing in accordance with the foregoing. The image viewing utility may retain a history of shared images.

Furthermore, the image viewing utility may enable a user to share a plurality of images simultaneously. For example, the image viewing utility may enable the user to select a plurality of images previously accessed, and configure sharing options for the set of selected images. In one example, the user may select a command to begin a selection process, select one or more images either one at a time or by selecting a set of images sharing an attribute, and select a command to share the one or more selected images. Such an implementation may reduce the number of steps a user must take when sharing a plurality of images.

The image viewing utility may enable the user to provide a comment to be sent to recipients of shared images. The image viewing utility may also enable the user to provide a qualitative rating to the image, for example, any one or more of "need", "love", "like", "want" or "have" or other analogous terms. Preferably, the image viewing utility provides to the user immediately accessible command buttons that correspond to each of "love", "like", "want" and "have". Preferably, the image viewing utility provides additional command buttons for combinations of the ratings. For example, a "both" button could indicate that the user wishes to assign both "love" and "want" ratings to an image. In a preferred combination, the image viewing utility provides immediately accessible commands for "love", "want", and "both".

The image viewing utility may further enable a user to view any of the user's images and any images shared with the user. For example, the image viewing utility may present the images sorted by category, subcategory, brand, rating, the user with which the image originated, demographic of user with which the image originated, location, or any other criteria. In a specific example, the image viewing utility may present images which have been rated by the user, or by any one or more other users, as matching one or more of the ratings, "love", "like", "want", and/or "have". Alternatively, the images that are presented to the user are those which have attained a certain number of other users assigning one or more of the ratings "love", "like", "want", and/or "have". For example, a particular user may be shown an image that has been "loved" by ten other users. All of these features enable ease of content discovery.

The image viewing utility may display additional information with the image, such as a list or summary of users with which the image has been shared, the ratings that users have assigned to the image, comments made upon the image, etc.

The image viewing utility may further enable a user to view a profile for any other user, where the profile may correspond to the images that other user has shared and/or viewed. After viewing a profile, a user may choose to follow the user corresponding to the viewed profile.

Correspondingly, the statistical tracking utility may track sharing of the annotated image, including the medium it was shared on, the user that shared it, all users receiving the image, how many users applied further labels to the image, how many users accessed labels, and user demographics for all of the above.

The image viewing utility may enable a recipient user to access and view the annotated image, including accessing the websites linked to that image by the one or more labels. The image viewing utility may be a standalone computer program or a plug-in to an existing image viewing program, including a web browser.

The image viewing utility may require the recipient to be a "user" prior to viewing a received image. For example, upon a recipient receiving an image and accessing the image, the image viewing utility may determine whether the recipient is a user. If the recipient is a user, the image viewing utility may display the image to the user. Otherwise, the image viewing utility may require the recipient to become a user.

The image viewing utility may be configured to preserve the user experience when viewing images, that is, by not obstructing the image with overlaid graphical representations or "pop-up" notices to show that the image includes labels.

In one aspect, an image that comprises one or more labels may be visually distinguished by a particular image border. For example, a colored image border may indicate to a user that an image comprises one or more labels.

In another aspect, an image that comprises one or more labels may be displayed without any indication that it includes labels until a user takes a predetermined action. For example, if the user performs a "mouse over" of the image, or clicks the image, the image may display the colored border, or other distinguishing feature, to indicate that it is labelled.

Alternatively, or in addition, the image viewing utility may require that a user take an action that corresponds to clicking on an item that is labelled, rather than anywhere on a labelled image, to display the distinguishing feature.

In a further aspect, an image that comprises one or more labels may be distinguished by a particular "wrapper". For example, the wrapper may be season specific. In one example, the image may be shown covered in a virtual gift wrapping during the Christmas season, covered with virtual frost during the winter season, covered in fall leaves during the fall season, etc. This approach requires the user to actively "open" the gift wrapping by untying a ribbon, for example, or to "scrape" the frost or "sweep" the leaves away, as the case may be. The wrapper may also be content-specific. For example, an image relating to a Broadway show could be covered by virtual curtains, which may need to be "opened" by the user to show the image. Other examples include break glass in case of emergency; exit doors; fog; clouds; rain on windshield and wipers; gardening and pulling back the bushes; seasonal including shoveling snow, raking leaves, washing windows; underwater and disturbed surface views; scratching tickets; pulling back tabs; unwrapping packages; power wash with hose; putting out a fire with a hose; breaking a block of ice; breaking a mirror, which may use the camera to create a mirror; sweeping dirt off the floor, pavement, desk or napkin; lifting a tablecloth; steamed mirror or glass; and sand on the beach; lifting the hood of a car. This approach may provide a sense of discovery and intrigue for a user.

The user may thereafter be shown the locations of the labelled items. In one aspect, labelled items may be displayed in a visually distinct representation. For example, labelled items could be shown in color while the remaining portions of the image are shown in greyscale. In another example, labelled items could be displayed in more vivid color while the remaining portions of the image are shown in their regular color representation. In another example, labelled items could be brightened relative to the brightness of the remaining portions of the image. Any other type of visually distinctive representation could be provided.

In another aspect, a user could be required to click on various areas of the image to determine whether there exist any labelled items in that area. Again, after clicking on a labelled item, the labelled item could be shown in color while the remaining portions of the image are shown in greyscale, or labelled items could be displayed in more vivid color while the remaining portions of the image are shown in their regular representation. Any other type of visually distinctive representation could be provided. This approach may appeal to users' curiosity.

In another aspect, the image viewing utility may provide a polygon-based representation of labelled images. A polygon may have one face displaying the image without labelled items being visually distinct, while each remaining face may display the image with a predetermined number, such as one, of the labelled items being visually distinct. For example, a cube-based representation may show one labelled item distinctly on each face, which enables the display of up to five items.

Another cube-based representation may show a front face displaying the image without labelled items being visually distinct, while a rotation of the cube may show a layered representation whereby each layer shows one labelled item being visually distinct. A user could then select one of the layers to bring that layer to the front, to further explore the particular labelled item in that layer.

Once a user has determined that an item in an image is labelled, the image viewing utility may thereafter enable the user to access that item. For example, the user could again click on the item to access that item. The image viewing utility may thereafter access the link field of the label for that item to retrieve the link corresponding to a web page for the item. The statistical tracking utility may also store to the memory various information relating to the click, including demographic information of the user, the image identifier, the item identifier, the website that was displaying the image (if applicable) and any other relevant available information.

The statistical tracking utility may further be operable to analyze the various label information for a plurality of images to determine cross-correlated labels shown in various images. For example, the statistical tracking utility may determine that a particular item X is often shown in an image that also shows a particular item Y. Therefore, the statistical tracking utility may derive that there is a correlation between items X and Y.

The image viewing utility may be operable to launch a web browser, if for example the image viewing utility is not provided as a plug-in to the web browser that is already launched, and direct the web browser to access the web page indicated by the link. Thus, the user having an interest in the item in the image can access a web page relating to that item by simply clicking the item in the image.

As previously mentioned, in one aspect, the image viewing utility may be a plug-in, or otherwise operable with, a web browser. For example, particular website operators desiring to implement the image annotation system provided herein may display on their websites, image content having labelled items. A user viewing these websites, having access to the image viewing utility, may therefore access the labelled items on these websites.

Such an implementation increases opportunities for monetization, since annotated images in accordance with the image annotation system include contextual information. For example, a web page that includes a particular image in which an item is labelled could also include contextually relevant advertising. In this example, the contextual advertising could be based, wholly or in part, on the various fields included in the image labels.

Similarly, the relationship among various labels in the image can be used to determine appropriate contextual advertisements to be displayed. For example, the statistical tracking utility may determine that a particular item X is often shown in an image that also shows a particular item Y. Therefore, if a third party web page shows an image comprising item Y, a contextual advertisement for item X may be displayed.

In this approach, a website operator may find it particularly likely that a user accessing that web page has an interest in the type of content included in the corresponding image. In a specific example, a news website may display a sports-related article that includes a picture of a particular athlete wearing a particular brand of sports gear, where the sports gear has been labelled with its brand name. It may be highly likely that a user accessing the article is interested in the particular sport described in the article, and is therefore highly likely to be interested in the sports gear. Therefore, other contextual advertisements displayed on the web page may be directed to other sports gear, or to other items that are known or suspected to be of interest to users that are also interested in sports gear.

This approach also provides increased opportunities for mutually benefiting the various parties involved. For example, the administrator of the server may charge the website operator for each click of a labelled item that directs a user to a further website, while website operators can charge advertisers and vendors for the contextual advertisements that are related to the labelling included in an image. In other examples, the administrator and the website operators could allocate a different split of income.

In another aspect, the administrator may partner with an image provider. The image provider, for example, may be a stock image provider that licenses images to news outlets and other interested parties. The administrator and/or image provider may annotate the images with labels to increase the contextual information in the images. The image provider can, therefore, market its images with increased effectiveness to the interested parties, as the images may increase the opportunities for the interested parties to effectively sell contextual advertising, as previously described. The administrator, meanwhile, may increase its monetization capabilities by charging a flat fee, fee-per-click, fee related to subsequent purchase, or other fee structure to the image provider.

In another aspect, persons appearing in an image may receive compensation when users access items appearing in the image. For example, an athlete, entertainer or celebrity may be shown in a particular image. It is well known that these persons influence purchase behavior in the general public. Therefore, when a user accesses a website based on accessing a labelled item in an image the corresponding person may be provided payment. Payment may, for example, be on a fee-per-click structure.

In the various examples of a fee-per-click structure, the administrator can track how many accesses are being made by users since the statistical tracking utility tracks this information when the user navigates to that link. The tracked information may be a further opportunity for income for the administrator, since it is able to track statistics relating to the relative success of some items over others in terms of receiving clicks from users.

Furthermore, where the image viewing utility is provided on a third party website, further user information may be obtainable. For example, if the third party collects or has access to user information, that user information could be provided to the statistical tracking utility for augmenting the collected statistical information. User information could comprise any demographic information, subscriber information (including whether the user is a subscriber or a guest), information about other websites of interest to the user (which could be collected, for example, by determining what cookies are stored by the user's web browser or querying the web browser's history), or any other information relevant to advertisers or content providers.

Figure 5:
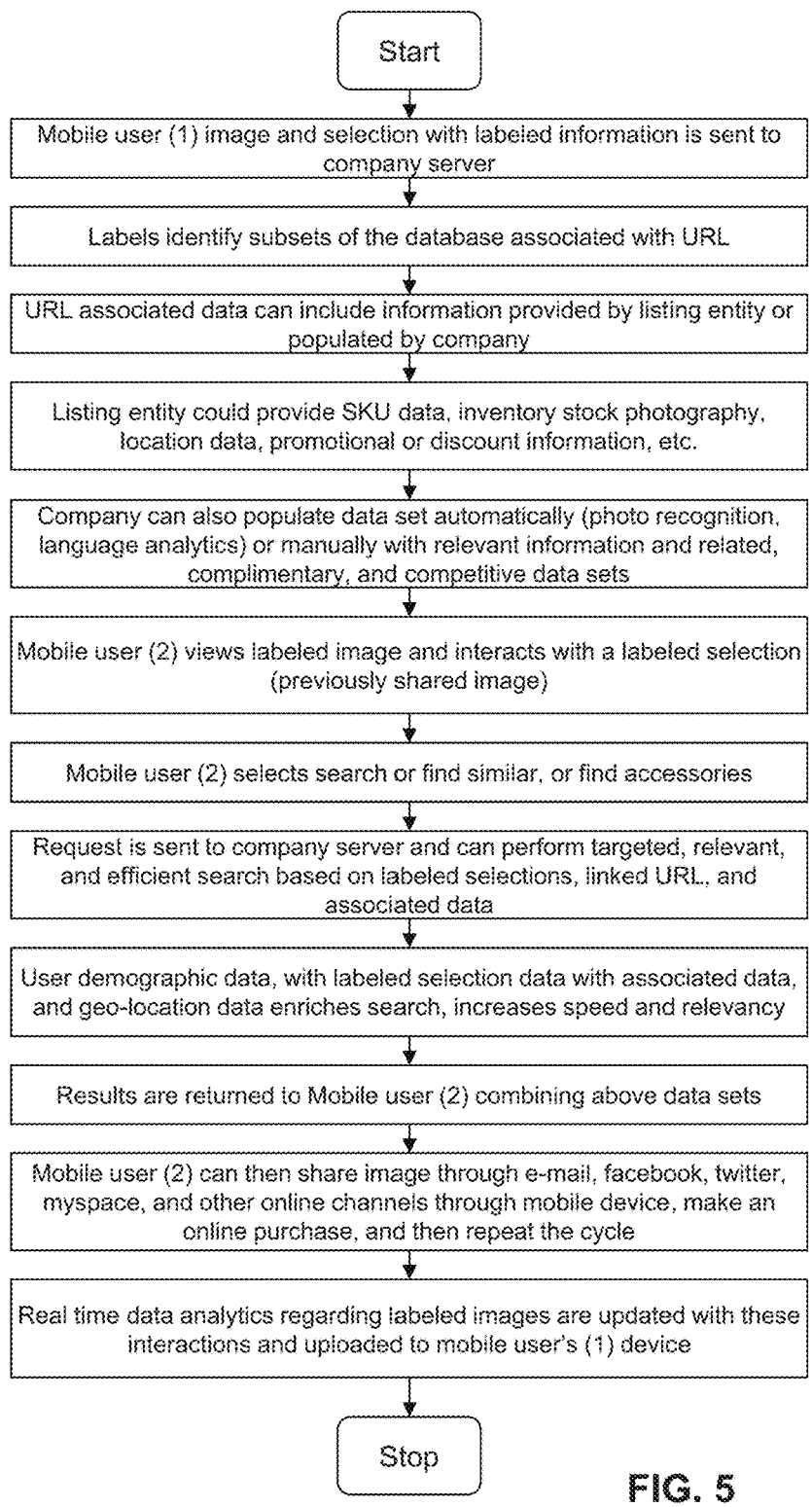
FIG. 5 is a flowchart illustrating an example use of a search utility of the image annotation system.

Referring now to FIG. 5, in another aspect, a search feature can be enabled by the search utility of the image annotation system. The search utility may be operative with a web browser or application, for example as a plug-in thereto. The search utility may enable a user to drag and drop an image into a search field of a pre-existing search engine or proprietary search engine. Alternatively, the search utility may enable a user to select a search command in connection with an image displayed by the image viewing utility. For example, a user may click on the image and/or a labelled item to display a search command.

The search utility may be configured to translate the image to one or more of the field entries in the image. The specific fields to which to translate the image can include any of the fields related to any one or more of the labelled items in the image. For example, the search utility may transform an image to an item name for one of the labelled items in that image for the purposes of performing a text-based search.

Alternatively, the search utility may be configured to search by image. For example, the search utility may return the one or more product images corresponding to the product image fields of each label in an image, or other correlated labels as determined by the statistical tracking utility.

The search utility may further enable both the image and manually entered text to be provided by a user into a search field. The relative relevance of the text and image for the search can be determined by any number of algorithms for weighting search results.

The search utility may interface with the statistical tracking utility to further consider user information of the user submitting the search and/or the one or more users that created the image or labels in the image for the purposes of returning search results.

In another aspect, the search utility may enable a user to search for items similar to those shown in a particular image. For example, one or more users may provide labels for an image as previously described. A further user, viewing the image using the image viewing utility, may select a search option provided by the image viewing utility to initiate a search of similar items to those shown in that image.

The search utility may return search results based on cross-correlations as determined by the statistical tracking utility, statistical information as determined by the statistical tracking utility, and/or using any of the field entries for any of the labels in that image.

In a further aspect, the search utility may enable a user to search for information that can be derived based on the set of annotated images saved to the memory of the database. For example, a user could search for a target and the search utility may return search results that are obtained from one or more annotated images for which a field entry matches or is related to the target.

In a specific example, each annotated image may have a user location field that includes the name of a location and a generated location field that includes location data for the location. A user may search, via the search utility, for a particular location X. The search utility may be operable to locate the annotated images that were taken at the location X, and may return to the user the location data for those images. Thus, the user can obtain location data for a location based on a textual representation of the location.

Furthermore, the search utility may enable a user of a mobile device to direct a web browser to a specific website without having to type the full web address of that website, based partly on location. In one example, the mobile device may provide the search utility with location data obtained from the location module. The user of the mobile device could begin typing the web address for a desired website. The search utility can select, from the set of annotated images on the memory of the server, a subset of those annotated images that include a generated location field having a value within a preconfigured proximity of the location data. Thus, images that are proximate to the user's present location are selected by the search utility.

The search utility can then collect the links in the link fields of each of the annotated images of the subset. The links, or a preconfigured number thereof, can be presented to the user as the user is typing (in a similar way to the real-time listing functionality described above), enabling the user to select one of the links rather than having to complete typing the web address. Thus, the presented links are likely to be relevant to the user since they correspond to items appearing in images that were captured in a location proximate to the user's present location.

Additionally, if the user does not select any of the presented links, those links may be removed from the presented links and further links may be presented. Alternatively, the preconfigured proximity could be repeatedly increased as the user does not select presented links while continuing to input the web address, so as to increase the number of annotated images that comprise the subset.

Similar functionality can be provided for any of the fields of the annotated images based on location data. Thus, the search utility can reduce the amount of input required by the user in any case that the input may be location dependent.

In another aspect, the image annotation system may provide analytics to users, website operators, the administrator, and advertisers. The analytics may be those previously described that are tracked by the statistical tracking utility.

The analytics viewing utility may provide a user interface that encourages user interaction. For example, the analytics viewing utility may provide the user with metrics representing how many times an image captured and/or labelled by the user has been viewed, had its labels accessed, or been further shared. Any of the analytics may be used to provide a sense of ownership, competition and pride among users, which may further incentivize users to increase usage of the image annotation system.

Figure 6:
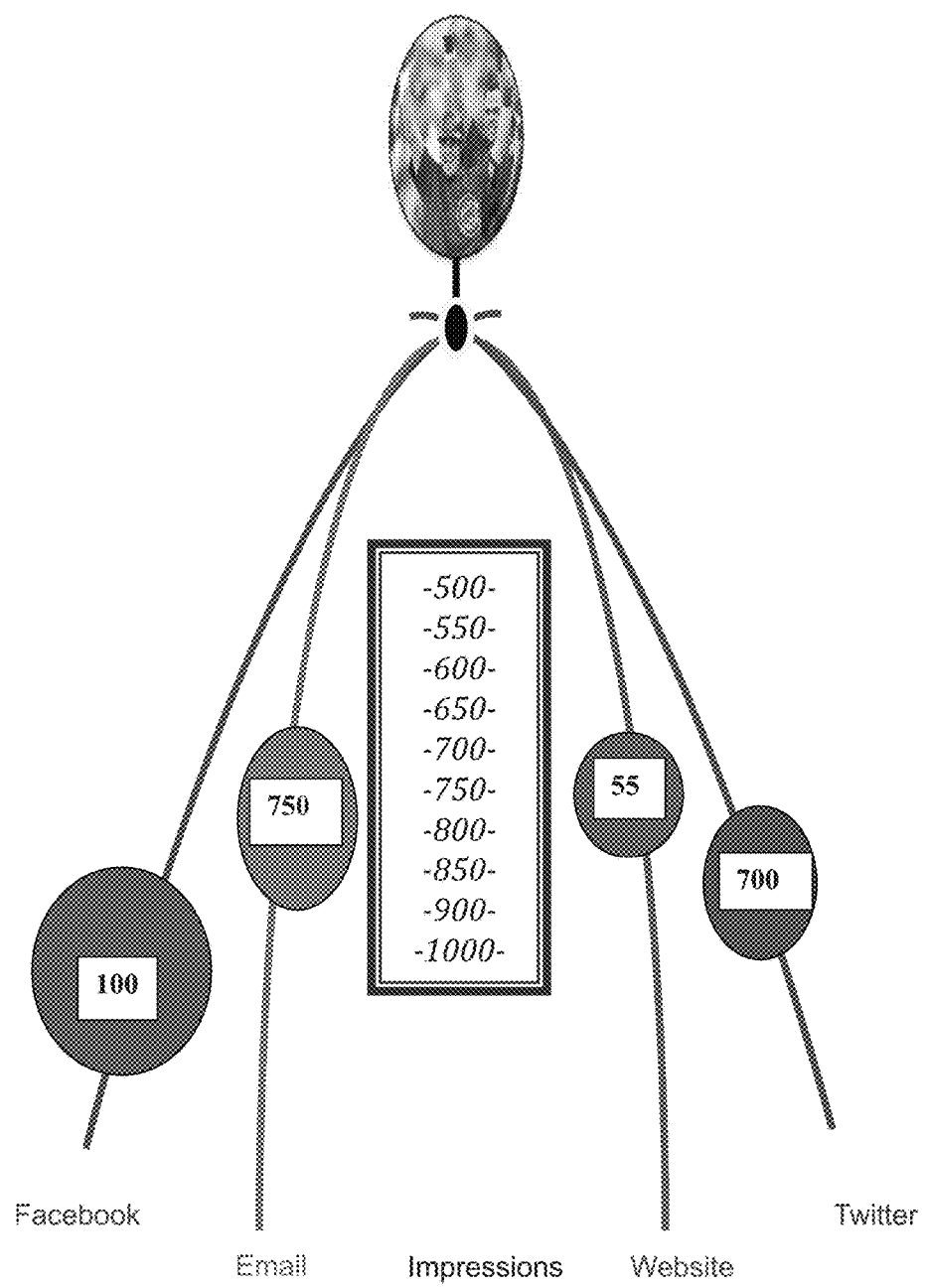
FIG. 6 is a graphical representation of a display provided by an analytics viewing utility.

Referring now to FIG. 6, the analytics viewing utility may further display to the user the number of times an image has been shared (the "number of shares") in various media, including social media, email, websites, etc. The particular display may represent the number of shares both alphanumerically and graphically. For example, each form of media may have a "bubble", the size of which is proportional to the number of shares. A user could click on a bubble to view more specific information about sharing on that medium, such as to whom the image was shared or user demographics of the users that have shared it. This may further assist the user in determining what types of items to label in the future.

Analytics may also be viewable by other parties using the statistical tracking utility. For example, a particular party may wish to view all user comments related to a specific brand that is specified in the item name field of all labels.

Parties may further be able to view user demographics of users that are interested in particular brands, based on which users have been labelling items with those brands. Parties may correspondingly offer those particular users, or users having similar user demographics, with particular offers and promotions for those brands.

The particular display may represent the number of shares both alphanumerically and graphically. For example, each form of media may have a "bubble", the size of which is proportional to the number of shares. A user could click on a bubble to view more specific information about sharing on that medium, such as to whom the image was shared or user demographics of the users that have shared it. This may further assist the user in determining what types of items to label in the future.

Figure 7:
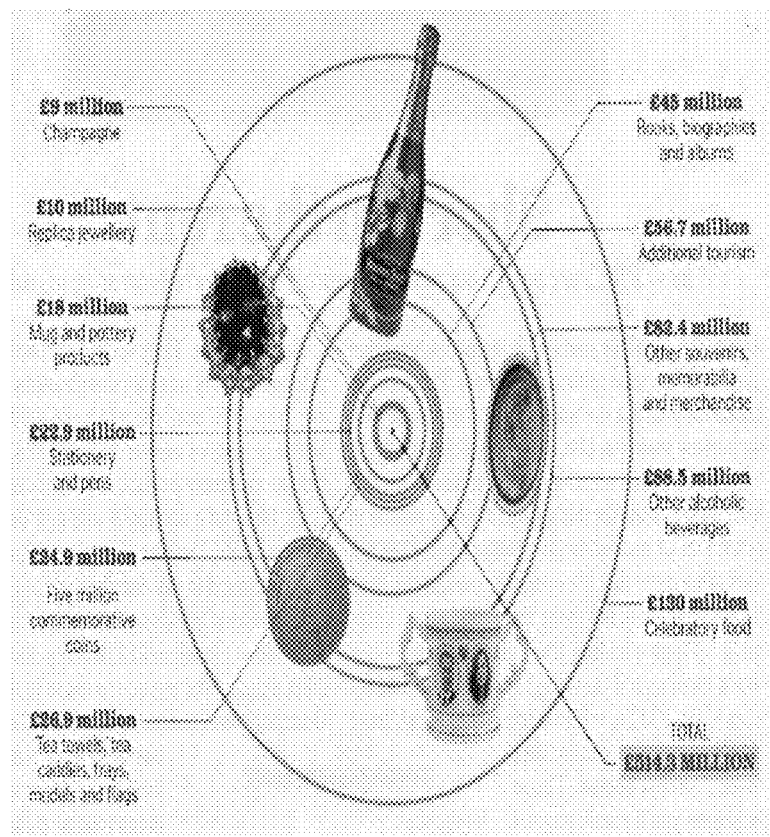
FIG. 7 is another graphical representation of a display provided by an analytics viewing utility.
Figure 8:
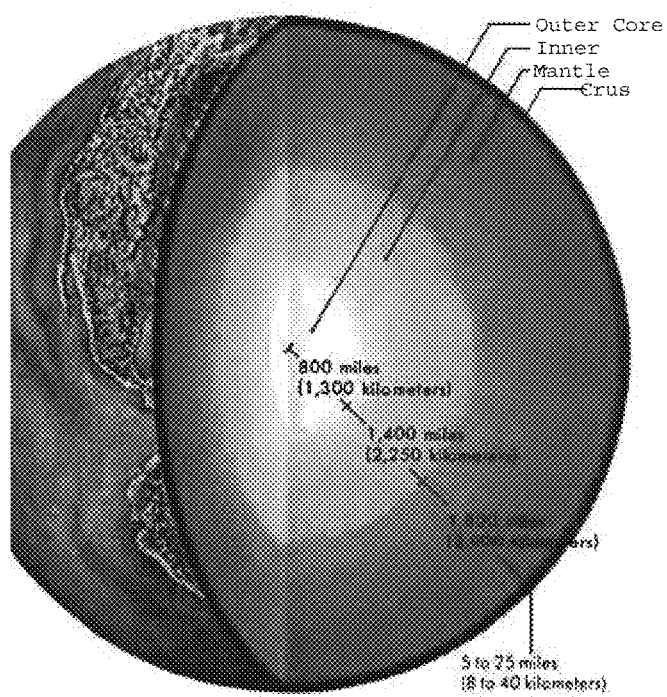
FIG. 8 is a further graphical representation of a display provided by an analytics viewing utility.

Referring now to FIGS. 7 and 8, the analytics viewing utility may also display to the user the number of times an image has been shared in various media, including social media, email, websites, etc. using an illustration showing the image as a core, and each form of media as concentring rings or layers. The distance between the image and each ring, or the thickness of the layer from the image, may represent the amount of instances the image has been shared on that medium or the percentage of total shares that can be attributed to that medium. Each ring or layer may further be depicted in a particular color to enable the user to distinguish between the various media.

Figure 9:
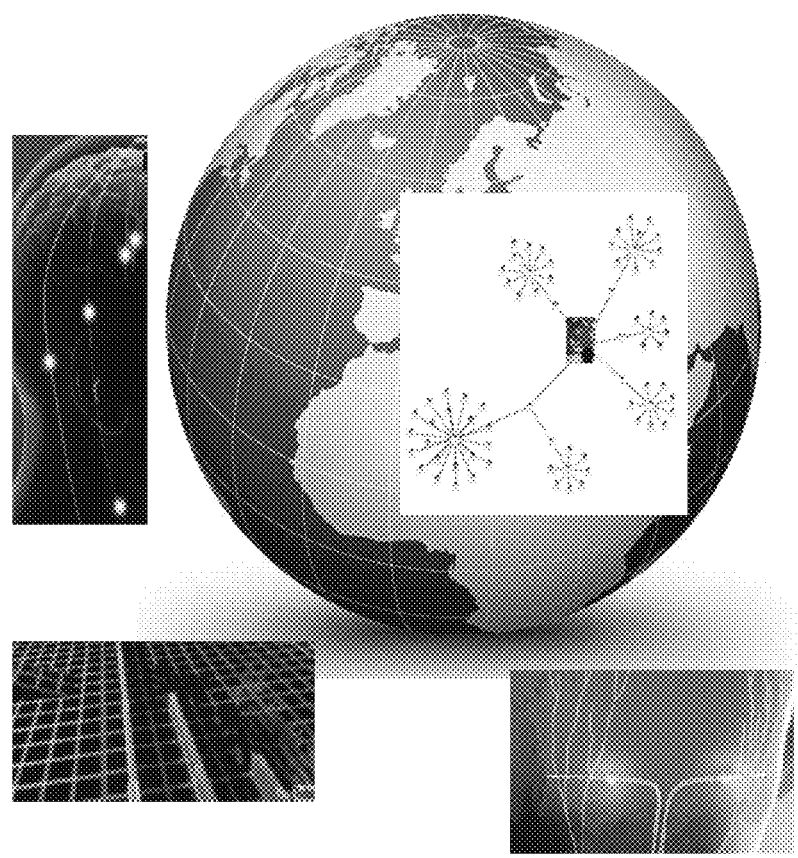
FIG. 9 is yet another graphical representation of a display provided by an analytics viewing utility.

Parties may further be interested in understanding the locations of users that are interested in particular brands. Referring to FIG. 9, a user interface for viewing location information for users related to an image is shown. The image may be shown on a globe representation, at approximately the location the image was taken. Branches can extend from the image to points around the globe that the image was shared, labelled, or accessed. Further branches can be shown pertaining to similar information. This may be useful, for example, for advertisers to understand where brands may be popular.

Figure 10A:
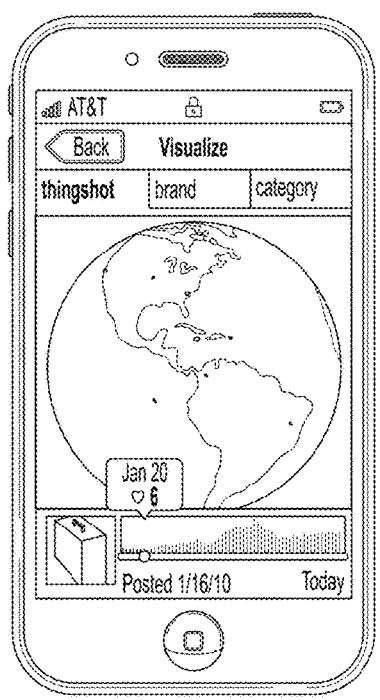
FIGS. 10A-D are graphical representations of related displays provided by an analytics viewing utility.
Figure 10B:
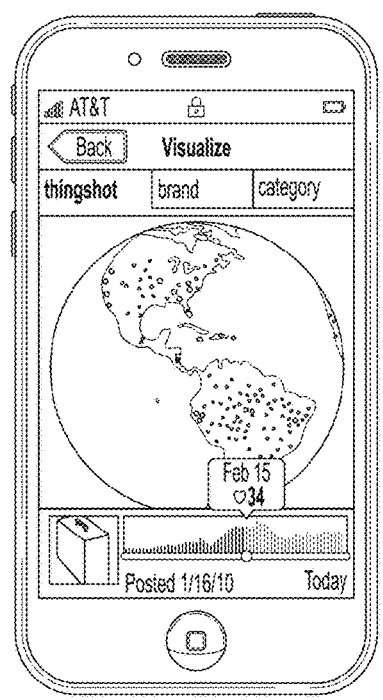

Referring now to FIGS. 10A-D, the analytics viewing utility may provide an illustration of sharing interface through an animated map interface. Sharing may be provided for images comprising any particular item, items comprising a category, items comprising a brand, and/or all items and can be broken down by shares among all users, shares among followers, shares among any category of users, etc. FIGS. 10A and 10B illustrate the sharing interface comprising a "slider" which may enable a user to visualize the sharing of the item(s) over time, beginning at the first share of the item(s) until the present time. A sharing graph may be located proximate the slider for illustrating the number of shares that occurred in a given timeframe. The graph may be a histogram depicting the number of times the image is shared in a set of predetermined intervals (such as minutes, hours, days, etc.).

Figure 10C:
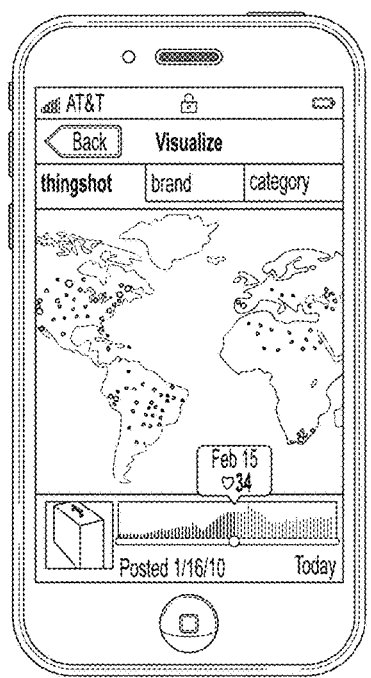
Figure 10D:
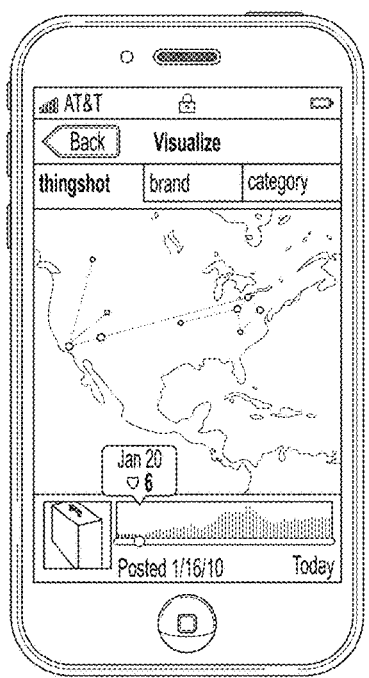
Figure 11A:
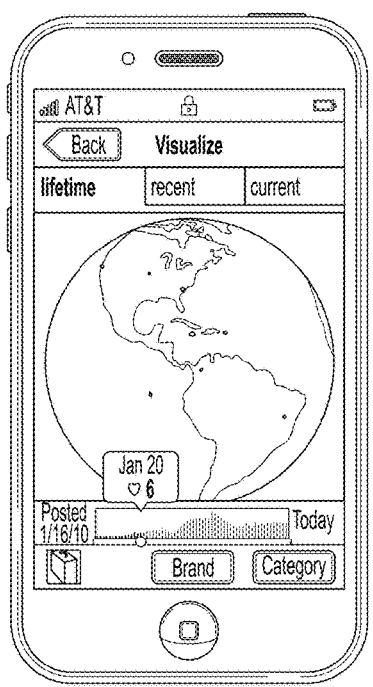
FIGS. 11A-D are graphical representations of related displays provided by an analytics viewing utility.
Figure 11B:
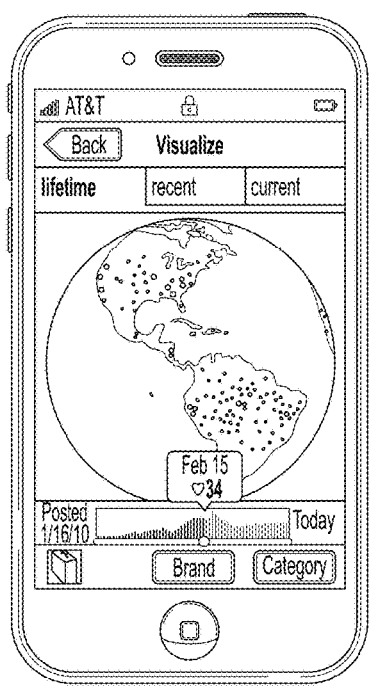
Figure 11C:
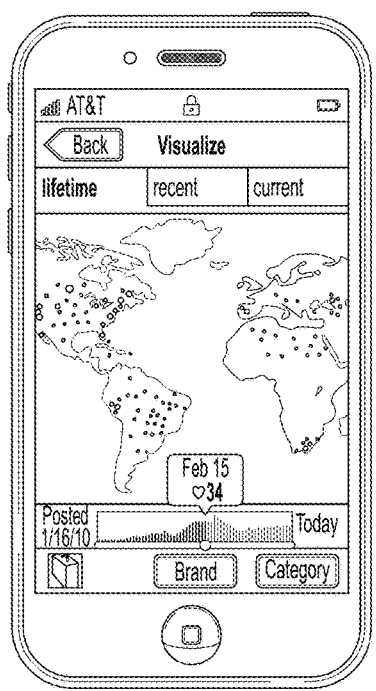
Figure 11D:
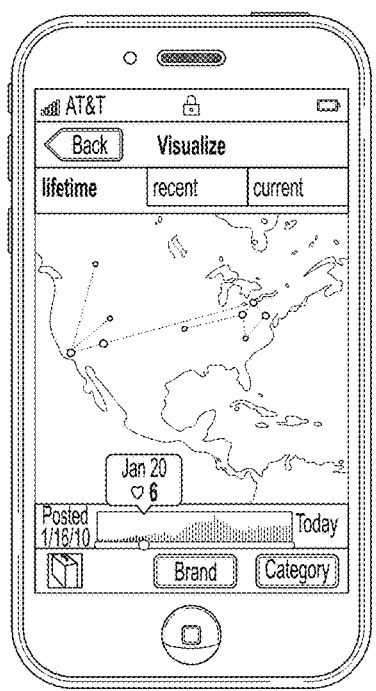

As shown in FIG. 10C, as the slider advances over time, the locations at which an image has been shared may be highlighted on the map temporarily, until the slider has advanced further. Locations from and to which the image has been shared may also be linked by lines, as shown in FIG. 10D. Users may zoom in or pan the map using gestures, such as pinch-to-zoom and flick.

Referring now to FIGS. 11A-D, the animated map interface may be provided for various timeframes rather than by category, etc. Timeframes may, for example, be lifetime (from the first share of the image to the present time), recent (which may be a preconfigured or user-defined timeframe) and current (which may also be a preconfigured or user-defined timeframe).

Additionally, the first share (or first post) and one or more of the most particular shares (e.g., a recent share) of an image may be highlighted on the map by one or more distinct colored indicator. The distinct colors may also be shown on the graph proximate the slider, to illustrate the time associated with a particular colored indicator.

The animated map interface could also change color based on the purpose of the mapping (time-based or item based, for example).

Figure 12:
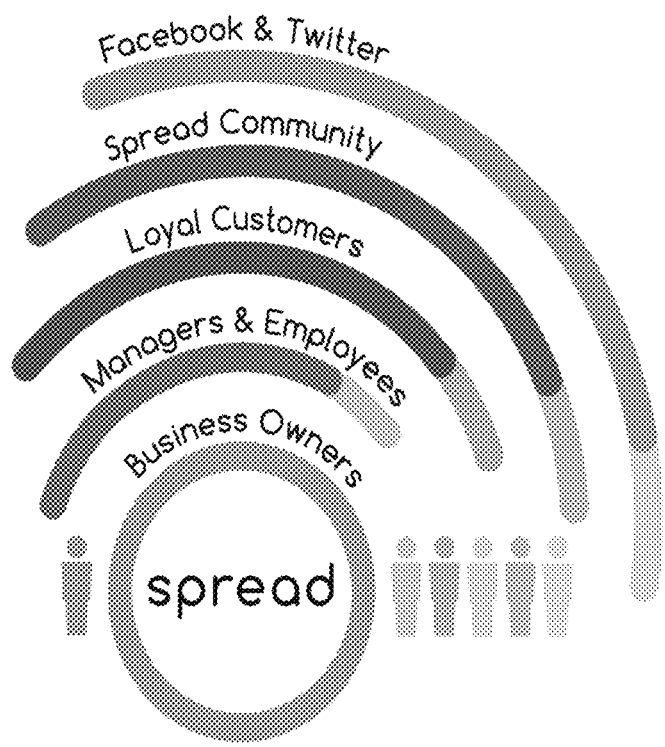
FIG. 12 is a graphical representation of a display provided by an analytics viewing utility.
Figure 13:
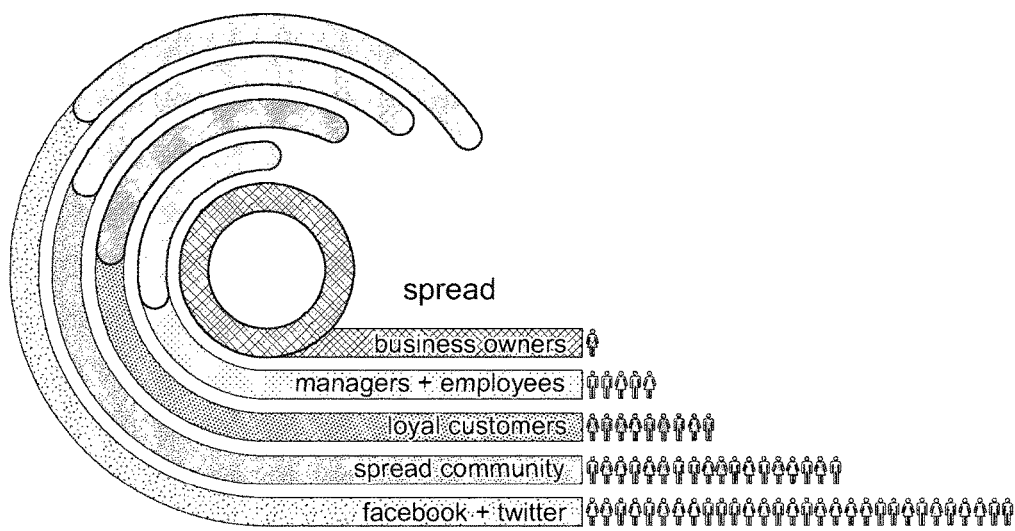
FIG. 13 is yet another graphical representation of a display provided by an analytics viewing utility.

Referring now to FIGS. 12 and 13, the analytics viewing utility may be operable to provide a graphical illustration of dissemination of a particular item or image, or set of items or images. For example, the graphical illustration may provide dissemination based on item name, or any one or more user field or administrative field.

The graphical illustration may further provide dissemination broken down by the type of user to whom the item or image has been disseminated. For example, as shown in FIGS. 12 and 13, the graphical illustration is broken down by social networking users, users of the image annotation system, users that have identified themselves as loyal customers of a particular business that is related to the item or image, managers and employees of that business, and owners of the business. It will be appreciated that any number or name of category can be provided.

It will further be appreciated that the graphical illustrations of FIGS. 12 and 13 may provide information related to ratings, such as any of the various qualitative measures that can be associated with images in items. For example, the graphical illustration can illustrate the number and types of users that "love" an item or image, or that "want" an item or image.

Additionally, as shown in the graphical illustrations depicted in FIGS. 12 and 13, the graphical depiction of dissemination may comprise a plurality of concentric arcs, which may comprise circles or ovals, each representing a type of user. In the depiction shown, the central arc is a circle representing a business owner, while each subsequent larger concentric arc represents a plurality of users that are an additional degree removed from a particular item. In other words, business owners would be assumed to be the most passionate about an item though there are relatively few users in this category, while managers and employees are next most passionate, and so on, up to social networking users in general, which are generally the least passionate but having the most users in the category. Therefore, the particular graphical illustrations shown in FIGS. 12 and 13 are particularly effective in providing an illustration of how passionate each category is about an item or image, in such a way as to "radiate" from the core of the illustration where the passion is highest.

Other depictions of dissemination may be provided in a pyramid, inverted pyramid, or other stacked shape that may represent hierarchy and/or order.

Figure 14:
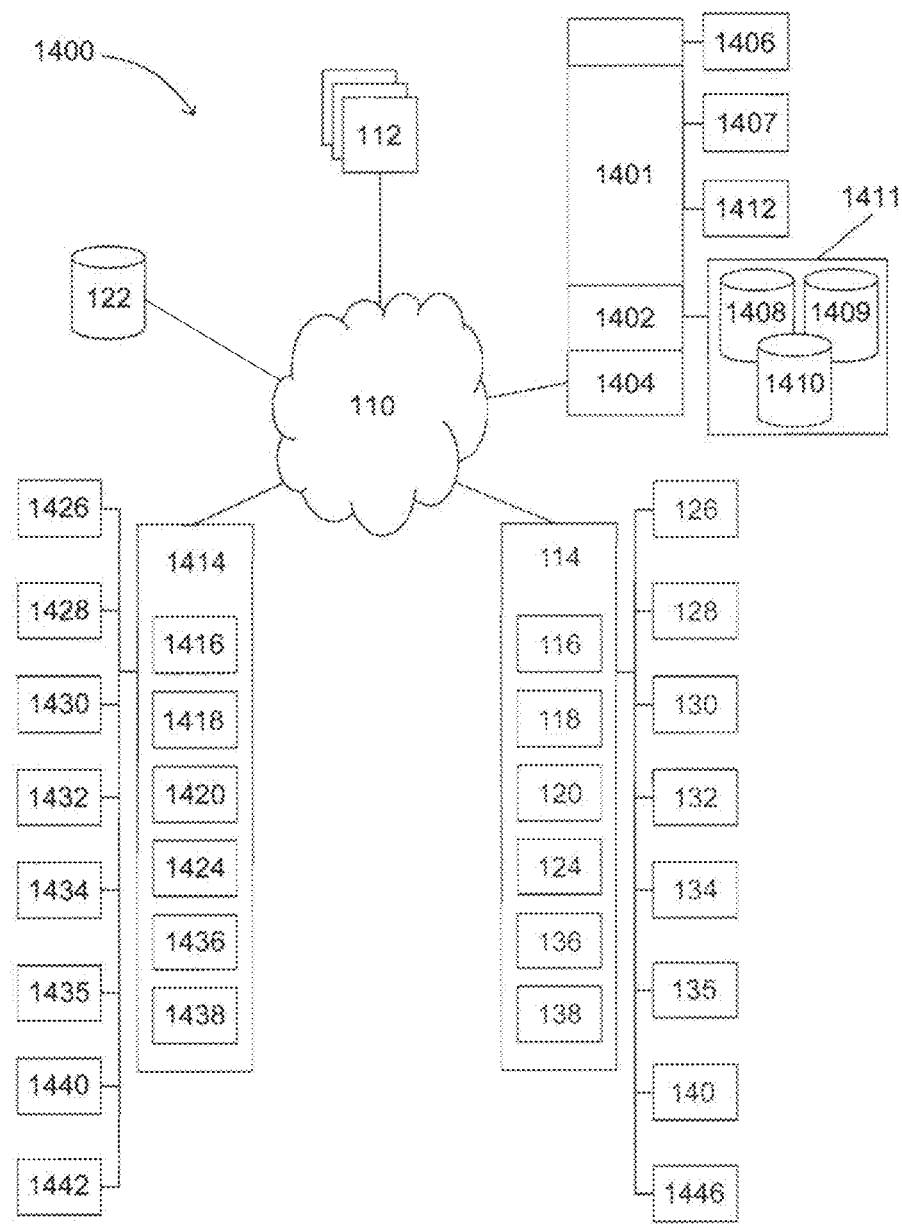
FIG. 14 is a block diagram of an image annotation system configured for utilizing annotated images to match and facilitate interactions between commercial users and social users.

Referring to FIG. 14, an image annotation system 1400 configured for annotating images and utilizing the annotated images to match and facilitate interactions between users is shown. System 1400 may provide substantially similar functionalities as those provided by the image annotation system described with reference to FIGS. 1 to 13.

System 1400 comprises network accessible server 1401. Server 1401 may be substantially similar in functionality to server 100 as described previously with reference to FIG. 1.

Server 1401 comprises processor 1402 and memory 1404. Memory 1404 has stored thereon computer instructions which, when executed by processor 1402, may provide item linking utility 1406, statistical tracking utility 1407, and commercial communication module 1412. Item linking utility 1406 and statistical tracking utility 1407 may be substantially similar in functionality to item linking utility 106 and statistical tracking utility 107, respectively, as described previously. Commercial communication module 1412 may be operable to configure processor 1402 of server 1401 to transmit communications from server 1401 to computing device 1414 and/or mobile device 114, and to receive communications at server 1401 from computing device 1414 and/or mobile device 114. Communications may comprise computer executable instructions, images, annotated images, videos, messages, sounds, or any other information that can be communicated over network 110.

Server 1401 also comprises or is linked to a plurality of databases 1411. Server 1401 may be further linked by network 110 to a plurality of third party websites 112.

The plurality of databases 1411 may comprise record database 1408, commercial-user database 1409, social-user database 1410, and/or other databases or data storage modules. In one aspect, a plurality of annotated images may be stored on a data storage module or a database of plurality of databases 1411. In one aspect, the annotated images may each comprise an image in linked association with an image data record. Server 1401 may be operable to retrieve an image of an annotated image based on the linked image data record, and may be operable to retrieve an image data record based on the image. It will be appreciated that plurality of databases 1411 may comprise any data structure that provides the functionality described herein. It will also be appreciated that any one or more databases or other data storage modules providing the functionality described herein may be used in place of plurality of databases 1411. It will further be appreciated that plurality of databases 1411 may be one or more remote databases, which server 1401 can access through network 110. In one aspect, commercial communication module 1412 may be operable to configure processor 1402 of server 1401 to communicate with plurality of databases 1411 to, for example, store on or retrieve data from plurality of databases 1411. It will be appreciated that server 1401 may be provided with a search criterion, or derive one or more search criterions based on the fields contained in a record associated with a commercial user, social user, or annotated image, and search plurality of databases 1411 based on the search criterion to locate social users, commercial users, or annotated images having records with field entries corresponding to or satisfying the search criterion.

Record database 1408 may be substantially similar in functionality to database 108 as described previously with reference to FIG. 1. Similar to database 108, in one aspect, record database 1408 may include a plurality of records, such as image data records, each of which may comprise a plurality of fields. The plurality of fields of each record in record database 1408 may be substantially similar to the plurality of fields described with reference to database 108 and FIG. 2, and thus the descriptions will not be repeated for the sake of brevity.

In addition, record database 1408 may be preloaded with a plurality of records.

Commercial-user database 1409 may be configured to store information about commercial users. In one aspect, commercial-user database 1409 may comprise a plurality of commercial-user records, one or more of which may comprise a plurality of commercial-user fields for storing information associated with a particular commercial user.

A commercial user may be any user of system 1400 with an interest in marketing or promoting an item appearing in an image. For example, a commercial user may be a brand, vendor, manufacturer, advertiser, publisher, website operator, celebrity, athlete, business owner, manager, employee, or any other entity interested in marketing or promoting the item. It will be appreciated that in referring to a commercial user as a "brand", the description is referring to the owner of the brand, or companies associated with the brand.

Commercial-user fields may comprise any field that may provide useful information about a commercial user, annotated images associated with the commercial user, or social users who are associated with the commercial user or with whom the commercial user has interacted. For example, the commercial-user fields may comprise a commercial-user identifier for identifying the commercial user. The server may be operable to identify the commercial user based on the commercial-user identifier, and communicate with a computing device of the commercial user based on the commercial-user identifier. The commercial-user fields may further comprise, for example, one or more commercial-user category fields for storing categories of items associated with the commercial user; one or more commercial-user name fields for storing names, including brands, of items associated with the commercial user; one or more commercial-user web page fields for storing web page links associated with the commercial user; one or more commercial-user location fields for storing geographical locations corresponding to the commercial user, such as, for example, a geographical location at which the commercial user is located, the commercial user's business is located, or computing device 1414 operated by the commercial user is located; one or more labelled-image fields for identifying annotated images that have been labelled by the commercial user, and/or for identifying which annotated images have been associated with the commercial user; one or more social-user fields for identifying which social users are, wish to be, or do not wish to be associated with the commercial user, and/or for identifying which social users have expressed an interest in the commercial user or wish to receive communications from the commercial user; etc.

A commercial user may provide some or all of the associated information to be entered into the commercial-user fields of its record. Alternatively, a commercial user may be required to provide only a limited amount of associated information, and server 1401 may be operable to input additional associated information into the commercial user's record based on analyzing labels associated with annotated images and/or records stored in plurality of databases 1411.

For example, a commercial user may provide only the brand-name of an item that the commercial user manufactures. Server 1401 may be operable to generate a record for the commercial user containing an identification field having a generated commercial-user identifier and a name field having the provided brand-name. Server 1401 may be further operable to search the labels of annotated images for fields containing that particular brand-name. If the server locates an annotated image having a label with a field containing the brand-name, server 1401 may update the commercial user's record to include entries contained in other fields of the located label.

For example, server 1401 may locate a label having a name field containing the brand-name corresponding to the commercial user. The label may correspond to a particular item appearing in an annotated image with which the label is associated, and may include other field entries, such as, for example, a category of the item, a name of a retail store at which the item was purchased, an image identifier, and/or any other field entry discussed previously. In one aspect, server 1401 may be operable to update the commercial user's record to include such associated information. Server 1401 may automatically update the commercial user's record with the additional associated information, or may prompt the commercial user to verify that the information being entered into the commercial user's record is in fact associated with the commercial user.

If the commercial user verifies that the information is associated with the commercial user, server 1401 may update the record accordingly. If the commercial user notifies server 1401 that the information is not associated with the commercial user, server 1401 may not update the commercial user's record to include that information, and instead, may store in, for example, memory 1404 or in the commercial user's record, a notification not to associate that type of information with the commercial user in the future. Server 1401 may also be operable to update the label associated with the annotated image to associate the label with the commercial user by, for example, associating an identification field containing the commercial user's identifier with the label.

Social-user database 1410 may be configured to store information associated with social users. In one aspect, social user database 1410 may comprise a plurality of social-user records, each of which may comprise a plurality of social-user fields for storing information associated with a particular social user.

A social user can be any user—including another commercial user—of system 1400 that annotates an image or interacts with an annotated image as described previously.

The social-user fields may comprise any field that may provide useful information about the social user, annotated images associated with the social user, or other commercial or social users associated with the social user or with which the social user has interacted. For example, the social-user fields may comprise a social-user identifier field for identifying the social user. Server 1401 may be operable to identify the social user based on the social-user identifier, and communicate with a computing device of the social user based on the social-user identifier. In one aspect, to maintain anonymity, the social-user identifier may be configured such that only server 1401 may be operable to identify the social user based on the social-user identifier, and communicate with the computing device of the social user based on the social-user identifier. The social-user identifier may be configured such that no other social user or commercial user may identify or communicate with the social user based on the social-user identifier.

The social-user fields may further comprise, for example, one or more social-user demographic fields for identifying demographic information associated with the social user, such as, for example, the gender, age, ethnicity, income, or geographic locations corresponding to the social user, such as, for example, a geographic location at which the social user resides, or at which the social user operates mobile device 114; one or more social-user image-viewing fields for identifying which annotated images have been viewed by the social user, and/or for identifying how many times each annotated image has been viewed by the social user; one or more social-user labelled-image fields for identifying which annotated images have been labelled by the social user, and/or for identifying which annotated images have had their labels accessed by the social user; one or more social-user image-sharing fields for identifying which annotated images the social user has shared, with whom, and/or on which types of media, and/or for identifying which annotated images have been shared with the social user, by whom, and/or on which types of media; one or more social-user follower fields for identifying other social users who are followers of the social user, and/or for identifying which other social users the social user is following; one or more social-user associated-item fields for identifying which items or categories of items the social user is interested in, and/or the level of interest the user may have in each of the items or categories of items; one or more commercial-user fields for identifying which commercial users the social user is, wishes to be, or does not wish to be associated with, and/or for identifying commercial users in which the social user has expressed an interest or from which the social user wishes to receive communications; etc.

A social user may provide some or all of the associated information to be entered into the social-user fields of its record. Alternatively, a social user may be required to provide only a limited amount of associated information, and server 1401 may be operable to input additional associated information into the social user's record based on analyzing labels associated with annotated images and/or other records stored in plurality of databases 1411.

For example, a social user may provide only demographic information about himself or herself. Server 1401 may be operable to generate a record for the social user containing a social-user identification field having a generated identifier and one or more demographic fields containing the provided demographic information. Server 1401 may be further operable to search the labels of annotated images for fields containing the identifier associated with the social user. If the server locates an annotated image having a label with a field containing the social-user identifier, server 1401 may update the social user's record to include entries contained in other fields of the located label.

For example, server 1401 may locate an annotated image having a label with an identification field containing the social user's identifier. The label may be associated with a particular item appearing in the image, and may include other field entries, such as, for example, a brand-name of the item, a category of the item, a qualitative rating of the item, an image identifier, and/or any other field entry discussed previously with respect to the image annotation system. For example, the labelled item may be a shoe, the brand-name of the shoe may be that of a trendy shoe manufacturer, the category of the item may be "high heels", and the qualitative rating of the item may correspond to "love it". Server 1401 may then update the social user's record to include such associated information.

Server 1401 may automatically update the data record with the additional associated information, or may require the social user to verify that the information being entered into the social user's record is accurate.

If the social user verifies that the information is accurate, server 1401 may update the data record accordingly. If the social user notifies server 1401 that the information is inaccurate, or no longer applies, server 1401 may not update the social user's record to include that information, and instead, may store in, for example, memory 1404 or in the social user's record, a notification that such information is not applicable.

It will be appreciated that server 1401 may be operable to associate a social user with an annotated image if one or more field entries of a label of the annotated image correspond to one or more field entries of the social user's record. For example, server 1401 may associate a social user with an annotated image if the social user's record and the label of an annotated image both contain a field entry corresponding to one or more of a specific name field entry, category field entry, subcategory field entry, qualitative rating field entry pertaining to a particular brand, etc. For example, a social user and an annotated image may become associated if the social user's record contains a name field entry corresponding to, say, "ASC II Runners", and the label of the annotated image contains the same name field entry. It will be appreciated that in this specific example, each annotated image with a label containing a name field entry corresponding to "ASC II Runners" can become associated with the social user whose record contains the same name field entry, despite that the social user may not have interacted or labeled one or more of the annotated images having the name field entry corresponding to "ASC II Runners".

Likewise, server 1401 may associate a commercial user with an annotated image if one or more field entries of a label of the annotated image correspond to one or more field entries of the commercial user's record. Further, server 1401 may associate a social user with a commercial user, or another social user, if one or more field entries of the social user's record corresponds to one or more field entries of the commercial user's, or the other social user's, record, and vice versa. In a further aspect, server 1401 may require that a certain minimum number of field entries correspond before associating a user with another user or with an annotated image.

In another aspect, server 1401 may require that one or more specific field entries correspond before associating a user with another user or with an annotated image. For example, server 1401 may be operable to associate a social user and an annotated image only if the social user's record and the label associated with the annotated image both comprise at least a field entry corresponding to the name of a particular brand.

Server 1401 may associate an annotated image with another annotated image in a similar manner.

In another aspect, server 1401 may be operable to associate a social user with an annotated image if the social user applies a label containing a judgment made with respect to an item appearing in the annotated image. For example, the social user may be associated with an annotated image showing a brand-name item to which the social user applied a label having a positive judgment, such as a qualitative rating corresponding to any one of "love it", "want it", and "have it". In one aspect, server 1401 may be operable to store in the image data record of the annotated image the judgment made with respect to the annotated image and the social-user identifier of the social user who made the judgment.

System 1400 further comprises mobile device 114 operated by a social user and computing device 1414 operated by a commercial user. It will be appreciated that system 1400 may comprise a plurality of mobile devices 114, each of which may be operated by a respective social user of a plurality of social users. Likewise, it will be appreciated that system 1400 may comprise a plurality of computing devices 1414, each of which may be operated by a respective commercial user of a plurality of commercial users. It will further be appreciated that commercial communication module 1412 may be operable to configure processor 1402 of server 1401 to transmit communications from server 1401 to a plurality of computing devices 1414 or mobile devices 114, and to receive communications at server 1401 from a plurality of computing devices 1414 or mobile devices 114.

In one aspect, mobile device 114 is operable to access and communicate with server 1401 through network 110. Mobile device 114, network module 116, camera 118, memory 120, processor 124, I/O device 136, location module 138, web browser 126, one or more user applications 128, image capture utility 130, image annotation utility 132, image viewing utility 134, analytics viewing utility 135, and search utility 140 have been described with reference to FIGS. 1 to 13, and thus the description of these elements will not be repeated for the sake of brevity. Memory 120 of mobile device 114 of system 1400, however, has stored thereon computer instructions which, when executed by the processor 124, provides—in addition to the utilities, browsers, and applications already described—commercial interaction utility 1446.

It will be appreciated that search utility 140 may be operable to enable a social user to search for information that can be derived from, for example, labels associated with annotated images, records stored on plurality of databases 1411, information stored on memory 120, and/or information stored on memory 1404. For example, a social user may search for a search term or target and search utility 140 may return search results that are obtained from one or more annotated images, social-user records, or commercial-user records for which a field entry matches or is related to the search term or target. It will further be appreciated that search utility 140 may return search results based on cross-correlations as determined by statistical tracking utility 1407, statistical information as determined by statistical tracking utility 1407, and/or using any of the field entries of records stored in plurality of databases 1411 and/or corresponding to labels associated with annotated images.

For example, a social user may request search utility 140 to provide search results based on the search criterion "shoes". Search utility 140 may interface with statistical tracking utility 1407 to consider the social user's previous interactions with annotated images and the social user's record for the purpose of returning relevant search results. Statistical tracking utility 1407 may determine that the social user has previously provided a high number of positive judgments with respect to annotated images showing shoes of a particular brand-name, and of a particular subcategory, such as "running shoes". Server 1401 may then be operable to transmit to mobile device 114 all or a subset of annotated images that are associated with that particular brand-name, and/or that particular category. Search utility 140 may then display to the social user search results comprising the annotated images provided by server 1401, with these annotated images likely being of interest to the social user.

As mentioned previously, in one aspect search utility 140 may enable the social user to define the search criterion by dragging and dropping an annotated image into a search field of a pre-existing search engine or proprietary search engine. In a further aspect, search utility 140 may enable the social user to define the search criterion by selecting a search command—such as "find similar"—provided in connection with an annotated image displayed by image viewing utility 134. Search utility 140 may be configured to translate the annotated image of interest to one or more of the field entries associated with the annotated image or a labelled item appearing therein. For example, the social user may drag and drop an annotated image of a running shoe of a particular brand-name, or select the search command "find similar", and search utility 140 may be operable to define a search criterion comprising that particular brand-name and the category "running shoe" for the purpose of performing a text-based search, and returning search results that are likely of interest to the social user based on a search of plurality of databases 1411 and relevant data provided by statistical tracking utility 1407.

As mentioned previously, image viewing utility 134 may enable the social user to view any of the social user's annotated images and any annotated images shared with the user. For example, image viewing utility 134 may present images sorted by category, subcategory, brand, rating, the social user with which the image originated, demographic of the social user with which the image originated, location, or any other criteria. In a specific example, the image viewing utility may present images which have been rated by the social user, or by any one or more other social users, as matching one or more of the ratings, "love", "want", and/or "have". Alternatively, the images that are presented to the social user may be those which have attained a certain number of other social users assigning one or more of the ratings, "love", "want", and/or "have". For example, a particular social user may be shown an image that has been "loved" by ten other users, or the social user can see the most loved images and brands within a category, or merely the most loved images by people of interest (for example, other social users whom the social user is following). This list can be further restricted, if desired, to be only of the most loved images by people the social user is following, which images also relate to particular brands of interest It will further be appreciated that image viewing utility 134 may further enable the social user to view a profile for any other social user, where the profile may correspond to images that the other social user has labelled, shared, and/or viewed. Image viewing utility 134 may enable the social user to sort the images of the other social user by category, subcategory, brand, rating, the social user with which the image originated, demographics of the social user with which the image originated, location, or any other criteria. In a specific example, image viewing utility 134 may present images which have been rated by the other social user as matching one or more of the ratings, "love", "want", and/or "have". Image viewing utility 134 may further be operable to display to the social user all the categories, subcategories, brands, ratings, followers, location information, etc. that the social user and the other social user have and/or do not have in common. For example, if a first social user consistently respects judgments made by a second social user (called Fashionista, say), then the first social user may well conduct a search for brands that Fashionista has favorably judged, but which the first social user has not yet viewed or judged much or at all. In this way, if Fashionista discovers a new brand, the first social user can quickly learn about it. In a further aspect, after viewing another social user's profile, such as Fashionista's, the social user may choose to follow the other social user corresponding to the viewed profile, and may then be automatically provided with regular notifications and updates regarding annotated images with which the other social user has interacted. In these ways, the ease with which the social user may discover new content that may be of interest to the social user is increased.

It will be appreciated that image viewing utility 1434 may provide similar functionality to commercial users.

In one aspect, computing device 1414 is also operable to access and communicate with server 1401 through network 110. Computing device 1414 may include network module 1416 to enable computing device 1414 to connect to network 110. Network module 1416 may be substantially similar in functionality to network module 116.

Computing device 1414 may comprise camera 1418 enabling a user of computing device 1414 to capture images and/or video using computing device 1414. Camera 1418 may be substantially similar in functionality to camera 118.

Computing device 1414 may also include memory 1420 to which an image can be uploaded. Memory 1420 can enable images and/or video to be temporarily or permanently stored to computing device 1414. Memory 1414 may comprise a RAM, ROM, Flash, magnetic drive or other memory medium. Alternatively, computing device 1414 may transmit images to remote location 122, via the network module, for storage.

Computing device 1414 comprises processor 1424 that is operable to execute computer instructions. Memory 1420 can have stored thereon computer instructions which, when executed by processor 1424, provides one or more computer applications, such as an operating system, as well as web browser 1426, one or more user applications 1428, image capture utility 1430, image annotation utility 1432, image viewing utility 1434, analytics viewing utility 1435, and search utility 1440, each of which may be substantially similar in functionality to web browser 126, one or more user applications 128, image capture utility 130, image annotation utility 132, image viewing utility 134, analytics viewing utility 135, and search utility 140, respectively. Memory 1420 may also have stored thereon computer instructions which, when executed by processor 1424, provide commercial communication utility 1442.

A commercial user may utilize search utility 1440 to search in a manner similar to that outlined with respect to search utility 140. It will be appreciated that search utility 1440 may be operable to enable a commercial user to search for information that can be derived based on, for example, labels associated with annotated images, records stored on plurality of databases 1411, information stored on memory 1420, and/or information stored on memory 1404. For example, a commercial user may search for a target and search utility 1440 may return search results that are obtained from one or more annotated images, social-user records, or commercial-user records for which a field entry matches or is related to the target. It will further be appreciated that search utility 1440 may return search results based on cross-correlations as determined by statistical tracking utility 1407, statistical information as determined by statistical tracking utility 1407, and/or using any of the field entries of records stored in plurality of databases 1411 or corresponding to labels associated with annotated images.

In one aspect, the commercial user may utilize search utility 1440 to search for annotated images having a label with field entries corresponding to the commercial user's brand-name, items associated with the commercial user, categories of items associated with the commercial user, etc. Search utility 1440 may provide the commercial user with search results corresponding to annotated images associated with the commercial user. The commercial user may view and access the labels of the provided annotated images using, for example, image viewing utility 1434. The user may also utilize image annotation utility 1432 to apply further labels to any annotated image or items appearing therein.

In one aspect, analytics viewing utility 1435 may provide the commercial user with metrics representing, for example, how many times an annotated image associated with the commercial user has been viewed, had its labels accessed, been further shared, and by which social users. Analytics viewing utility 1435 may further provide the commercial user with metrics representing, for example, how many times a type of rating label has been applied to an annotated image, and general or specific information relating to the social users who applied each type of rating label. For example, analytics viewing utility 1435 may display how many social users applied a rating label corresponding to "love it" to an annotated image associated with the commercial user, and may also display specific demographic information for each social user who applied this type of rating label, and/or aggregated demographic information relating to the group of social users who applied this type of rating label. It will be appreciated that analytics viewing utility 1435 may provide the commercial user with any metrics and/or analytics that can be derived based on labels of annotated images, records stored on plurality of databases 1411, information stored on memory 1420, and/or information stored on memory 1404.

It will be further appreciated that analytics viewing utility 1435 may be operable to communicate with server 1401 to receive real-time updates with respect to labels of annotated images, records stored in plurality of databases 1411, and information stored on memory 1404 of server 1401. In this way, analytics viewing utility 1435 may provide a real-time display of metrics and analytics to the commercial user. It will be appreciated that the provided display of metrics and/or analytics may be updated in real-time in response to, for example, new labels being applied to annotated images or existing labels being modified, new records being stored in plurality of databases 1411 or existing records being modified, and/or new information being saved to memory 1404 of server 1401 or existing information being modified.

Image annotation utility 132, image viewing utility 134, analytics viewing utility 135, and search utility 140 may provide corresponding functionalities to social users operating mobile device 114.

It will further be appreciated that computing device 1414 can execute the operating system and that the operating system provides a means for launching other computer applications, including but not limited to those specified above.

Computing device 1414 may additionally comprise an input/output (I/O) device 1436, which may be substantially similar in functionality to I/O device 136. I/O device 1436 may comprise a keyboard, mouse, trackpad, trackball, scroll wheel, remote control, touch-screen display or other input device for obtaining input from a user of computing device 1414. I/O device 1436 could further include a microphone (not shown) and a voice recognition module (not shown) operable to obtain input via a user's voice.

I/O device 1436 may comprise a display for providing output to the user of computing device 1414.

In one aspect, I/O device 1436 is a touch-screen display enabling both input and output. In this regard, the use of the term "click" would include touching one or more particular points on the display. Further, the touch-screen display may be adapted for providing a virtual keyboard for obtaining input from a user.

Computing device 1414 may further comprise location module 1438, which may be substantially similar in functionality to location module 138.

It will be appreciated that mobile device 114 and computing device 1414 may provide the functionality described herein. For this reason, the following description describes the invention with relation to the mobile device 114 and computing device 1414; however, it will be appreciated that computing device 1414 may be a mobile device, and either of the computing device 1414 and mobile device 114 may be substituted with, for example, a tablet computer, laptop computer, desktop computer, computer server, or any other computing device capable of providing the functionality described herein.

Figure 15:
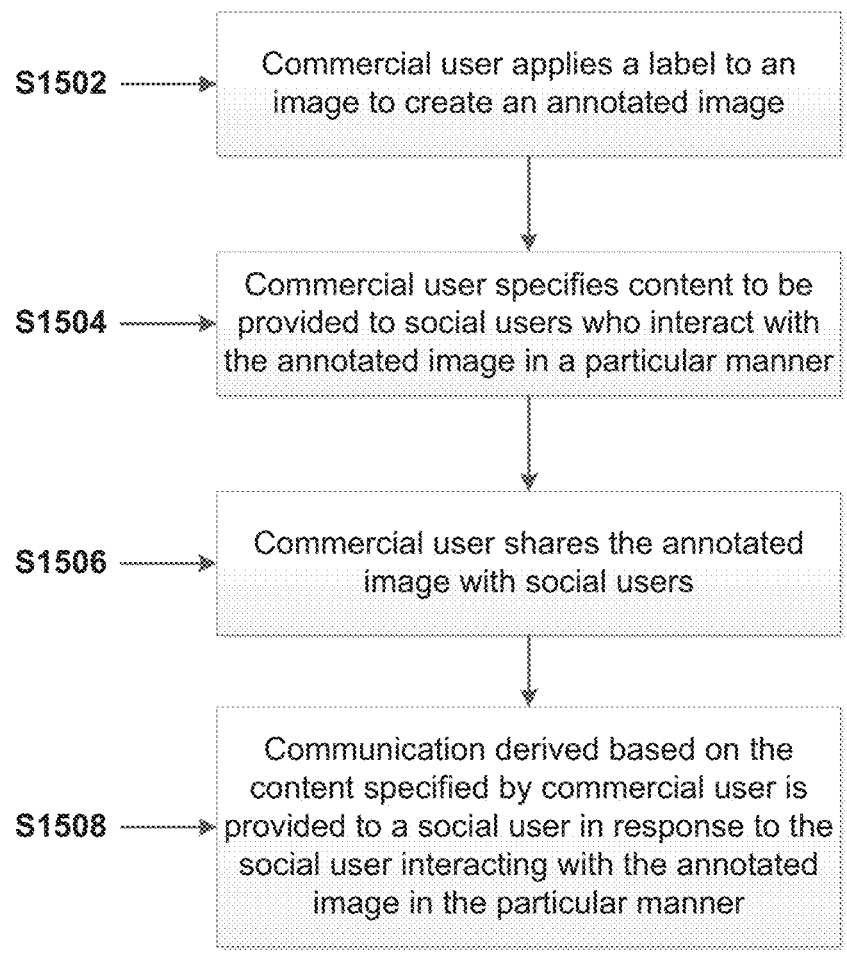
FIG. 15 is a flowchart showing an example embodiment of the image annotation system of FIG. 14 in use.

Referring now to FIG. 15, a flowchart is shown illustrating an example embodiment of system 1400 in use.

Figure 16:
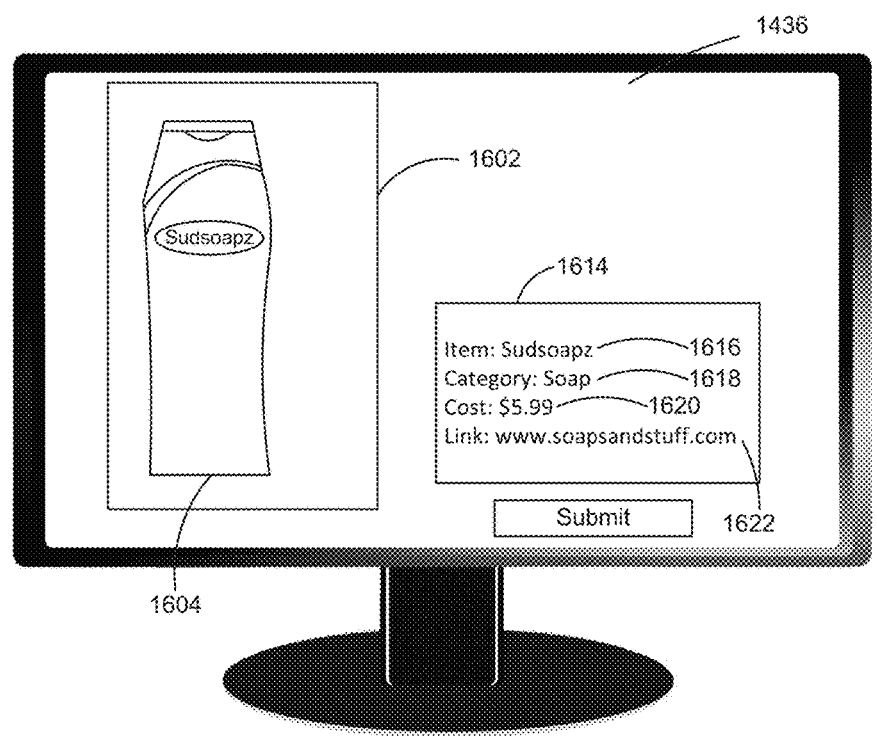
FIG. 16 is an illustration of a display provided by an image viewing utility.

At S1502, a commercial user annotates an image by applying a label to an item appearing in the image. Referring to FIG. 16, the commercial user may view image 1602 containing item 1604 on I/O device 1436 of computing device 1414. The commercial user may select the area of image 1602 that corresponds to item 1604. Image annotation utility 1432 may provide to the commercial user plurality of fields 1614 into which the commercial user can enter information associated with item 1604. For example, the commercial user may enter "sudsoapz" in item-name field 1616, "soap" in item-category field 1618, "$5.99" in item-cost field 1620, and "www.soapsandstuff.com" in item-link field 1622. Once the commercial user has completed entering information, the commercial user may select "Submit". Image annotation utility 1432 may then create labelled item 1604' and annotated image 1602' by associating a label having the field entries provided by the commercial user with item 1604.

Computing device 1414 may store a copy of annotated image 1602' on memory 1420 and/or upload a copy of annotated image 1602' to server 1401. Server 1401 may generate a unique image identifier for annotated image 1602' and apply the image identifier to the label. Server 1401 may also access commercial-user database 1409 to retrieve a commercial-user identifier from the commercial user's record and associate the commercial-user identifier with the label. Server 1401 may then update records stored in plurality of databases 1411 based on the fields of the label associated with item 1604. For example, server 1401 may update the commercial user's record to include a labelled-image field having an image identifier for annotated image 1602'.

Once annotated image 1602' has been further labelled by server 1401, server 1401 may store annotated image 1602' on memory 1404, or any data storage module or database of plurality of databases 1411. Server 1401 may further send a copy of updated annotated image 1602' to computing device 1414 to replace the previously stored copy of annotated image 1602'.

Referring to FIG. 15, at S1504 the commercial user may specify content to be provided to social users who interact with labelled item 1604' or annotated image 1602' in a particular manner. Commercial communication utility 1442 may be operable to enable the commercial user to specify the type of content to be provided, and may be further operable to associate the content with a particular interaction required for the content to be provided. For example, the type of content may be an advertisement, promotion, video, text, one or more images, a sound, or any other media content that the commercial user may wish to provide to social users who interact with labelled item 1604' of annotated image 1602'. The type of interaction with which the content may be associated may comprise, for example, a social user viewing labelled item 1604', selecting labelled item 1604', selecting a portion of annotated image 1602', rating labelled item 1604', accessing the label of labelled item 1604', applying a further label to labelled item 1604', etc. In one aspect, commercial communication utility 1442 may enable a commercial user to associate one type of content with a specific interaction, and associate a different type of content with a different interaction.

The commercial user may utilize computing device 1414 to transmit a communication to server 1401 comprising the specified content. The specified content may be uploaded to and stored on memory 1404 of server 1401, or any data storage module or database of plurality of databases 1411. Computing device 1414 may further transmit to server 1401 a communication request comprising instructions for determining to which social users to communicate the content. The communication request may comprise, for example, a particular interaction identifier for identifying the particular interaction in response to which to provide the content. A record corresponding to the specified content and the communication request may be associated with the label of item 1604, and/or may be stored on memory 1404 of server 1401, or any data storage module or database of plurality of databases 1411.

At S1506 the commercial user may share annotated image 1602' with a plurality of social users through various media, including social media, email, websites, etc. For example, the commercial user may share annotated image 1602' by sending it directly to specific social users, or by displaying it on a website operated by the commercial user. In one aspect, the commercial user may request server 1401 to transmit annotated image 1602' to a specified plurality of social users.

Figure 17:
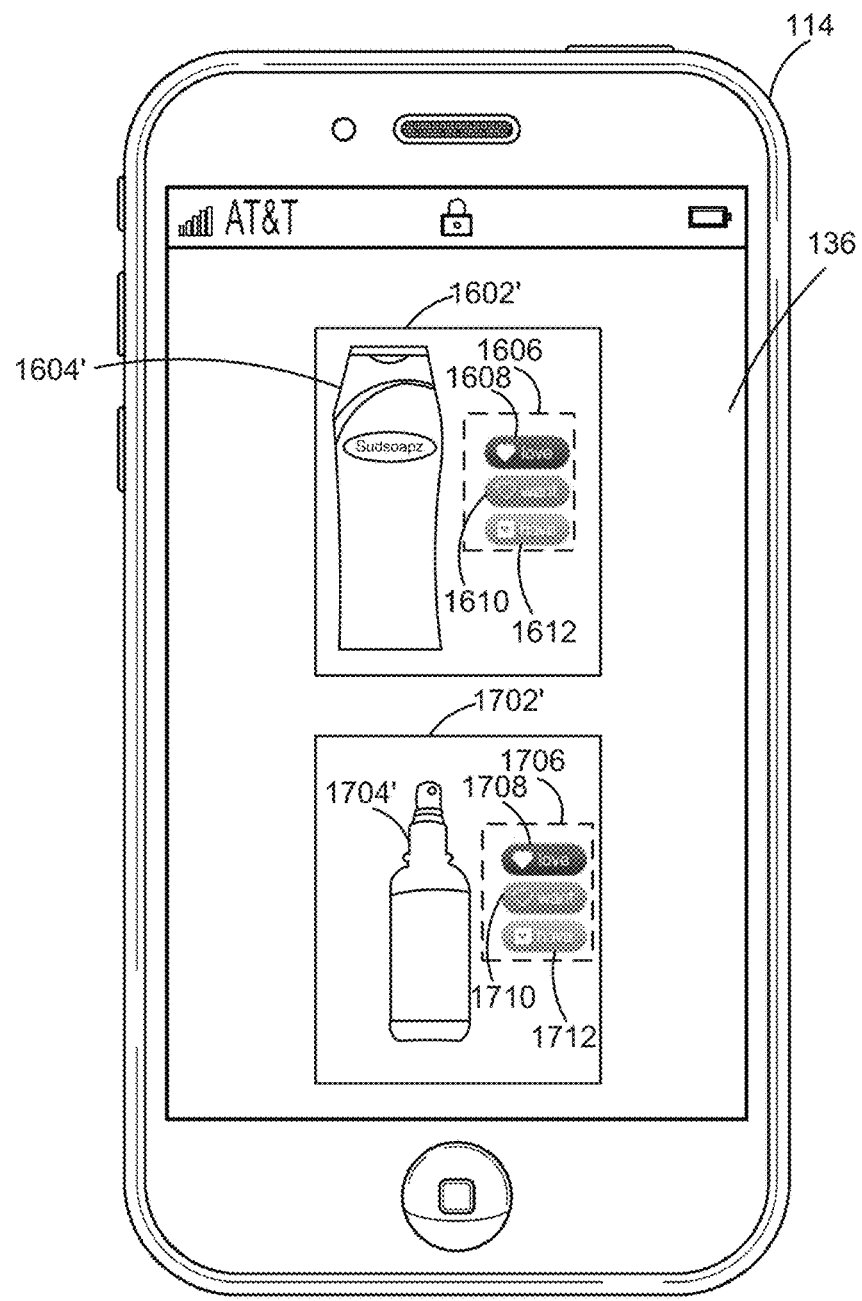
FIG. 17 is another illustration of a display provided by an image viewing utility.

Social users with whom annotated image 1602' is shared may view annotated image 1602' using mobile device 114. Referring to FIG. 17, annotated image 1602' is shown being displayed on I/O device 136 of mobile device 114. Annotated image 1602' may be displayed alone, or, as shown in FIG. 17, alongside other annotated images, such as annotated image 1702', as part of a plurality of annotated images. In one aspect, server 1401 may retrieve annotated image 1602' and/or annotated image 1702' from plurality of databases 1411 and transmit annotated image 1602' and/or annotated image 1702' to mobile device 114.

An annotated image and/or each of one or more labelled items appearing in the annotated image may be associated with a set of rating options. The set of rating options may correspond to qualitative or quantitative judgments a social user can make with respect to an annotated image or items appearing therein. In one aspect, image viewing utility 134 may display alongside a displayed annotated image the set of rating options associated with that annotated image or a labelled item appearing therein. In another aspect, image viewing utility 134 may display alongside a labelled item appearing in an annotated image the set of rating options associated with the item. In yet a further aspect, the set of rating options may be displayed as an overlay on top of an associated annotated image or item appearing therein.

It will be appreciated that the rating options may also be associated with and displayed alongside, or as an overlay on top of, images that have not been annotated, and/or items that are not labelled.

With reference to FIG. 17, the set of rating options 1606 comprising selectable rating options 1608, 1610, and 1612 can be associated with and displayed alongside labelled item 1604', and the set of rating options 1706 comprising selectable rating options 1708, 1710, and 1712 can be associated with and displayed alongside labelled item 1704'. In one aspect, the rating options of each set of rating options may be the same. For example, rating options 1608 and 1708 may correspond to a "love" rating, rating options 1610 and 1710 may correspond to a "want" rating, and rating options 1612 and 1712 may correspond to a "have" rating.

In another aspect, a displayed annotated image may be associated with rating options that are different from those associated with a different displayed annotated image.

In another aspect, plurality of rating options 1606 or 1706 may not be initially visible to the social user. Image viewing utility 134 may be operable to display plurality of rating options 1606 or 1706 only when the social user interacts with annotated image 1602' or 1702', respectively. For example, image viewing utility 134 may display plurality of rating options 1606 when the social user operating mobile device 144 selects, or hovers a cursor over, annotated image 1602' or labelled item 1604' using I/O device 136.

At S1508 a communication derived based on the content specified by the commercial user at S1504 is provided to the social user. Server 1401 may transmit to mobile device 114 the communication derived based on the specified content. In one aspect, the communication may comprise the specified content. In a further aspect, the communication may comprise the specified content as well as additional content. In another aspect, the communication may comprise only a portion of the specified content. In yet a further aspect, server 1401 may be operable to modify the specified content to create modified content, and the communication may comprise the modified content. It will be appreciated that server 1401 may transmit the communication based on the communication request provided by computing device 1414.

Figure 18:
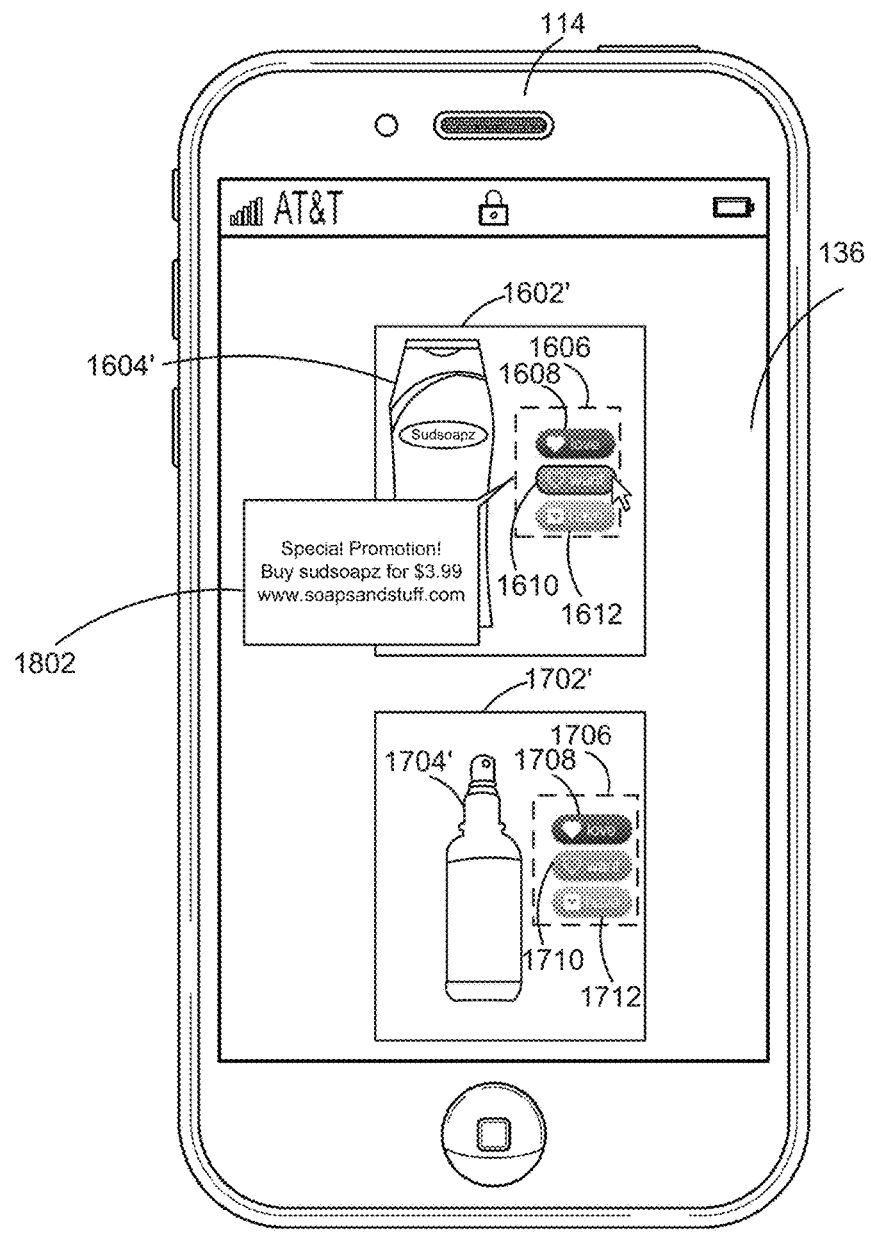
FIG. 18 is yet another illustration of a display provided by an image viewing utility.

Referring to FIG. 18, one aspect is shown in which the content specified by the commercial user at S1504 comprises promotional message 1802, and the associated interaction required to display promotional message 1802 comprises the social user selecting rating option 1610. In response to the social user selecting rating option 1610, commercial interaction utility 1446 may be operable to instruct mobile device 114 to request server 1401 to provide promotional message 1802, and to display promotional message 1802 to the social user. In another aspect, server 1401 receives a notification from mobile device 114 that the associated interaction has taken place, and communicates promotional message 1802 to mobile device 114 based on the communication request. It will be appreciated that promotional message 1802 may comprise information derived based on the commercial user record of the commercial user, such as, for example, the brand name associated with the commercial user.

In a further aspect, different content may be associated with different communication requests. For example, the commercial user may provide server 1401 with two types of content, and provide respective communication requests specifying that the first type of content is to be provided based on a first type of interaction, and the second type of content is to be provided based on a second type of interaction. For example, different content may be associated with the selection of each of rating options 1608, 1610, and 1612. In one aspect, the content provided in response to the social user selecting a rating option corresponding to "want", such as rating option 1610, may comprise promotional message 1802, while the content provided in response to the social user selecting a rating option corresponding to "love", such as rating option 1608, may comprise images of items similar to labelled item 1604', or a message prompting the social user to share annotated image 1602' with other social users.

It will be appreciated that the content provided to a social user may be augmented or customized by server 1401 based on an analysis of the records contained in plurality of databases 1411. For example, the commercial user may specify at S1504 that in response to a social user interacting with labelled item 1604', a set of thumbnail images of other products associated with the same category and brand-name as labelled item 1604' is to be provided to the social user. In a further aspect, the set of thumbnail images provided to the social user may include only products that the social user has previously rated with a rating of "want it" or "love it".

It will further be appreciated that image annotation utility 132 may be configured to apply a label to labelled item 1604' in response to the social user selecting one or more of rating options 1608, 1610, and 1612. Likewise, image annotation utility 132 may be configured to apply a label to labelled item 1704' in response to the social user selecting one or more of rating options 1708, 1710, and 1712. For example, if the social user selects rating option 1610, image annotation utility 132 may apply to labelled item 1604' a label having a rating field corresponding to rating option 1610. In one aspect, image annotation utility 132 may also apply the social user's identifier to the label. In a different aspect, server 1401 may apply the social user's identifier to the label after receiving the label from mobile device 114, and may also be operable to update the records stored in plurality of databases 1411 based on the fields associated with the label. It will be appreciated that in this way, an annotated image may comprise an image data record comprising judgment data corresponding to judgments made with respect to the annotated image, and respective associated social-user identifiers of each of one or more social users who made the judgments.

Figure 19:
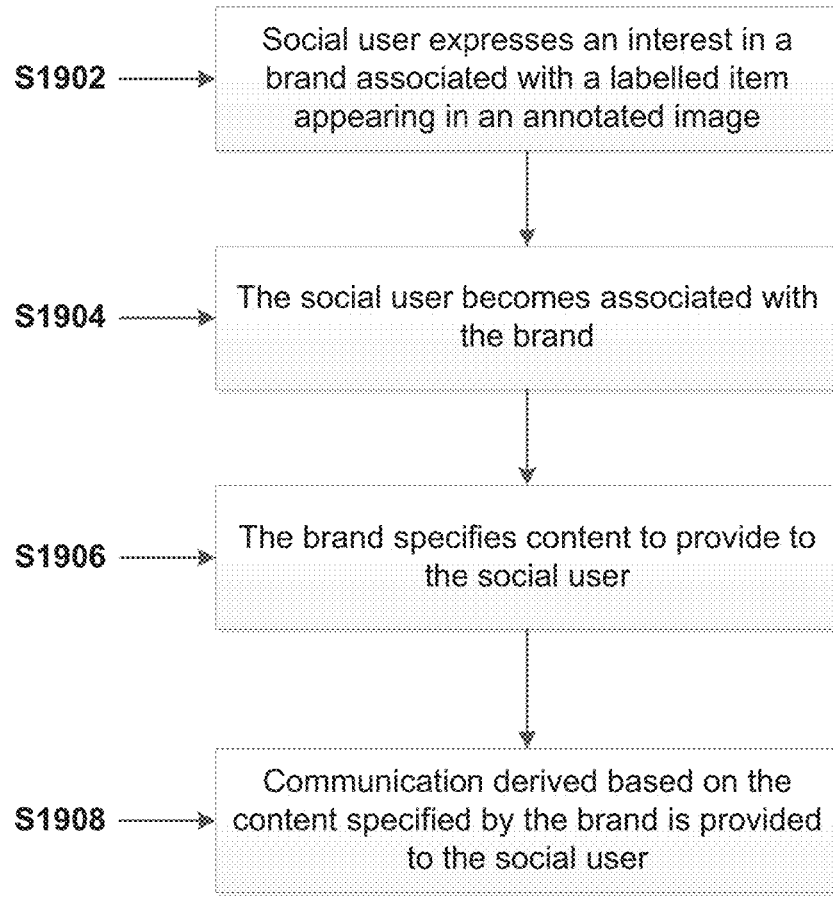
FIG. 19 is a flowchart showing another example embodiment of the image annotation system of FIG. 14 in use.

Referring now to FIG. 19, a flowchart is shown illustrating another example embodiment of system 1400 in use, wherein a social user may operate device 114 and a commercial user, in this case a brand, may operate computing device 1414.

At S1902, the social user expresses an interest in a brand associated with a labelled item appearing in an annotated image. In one aspect, the social user may express interest in the brand associated with the labelled item by interacting with the annotated image in which the labelled item appears.

Figure 20:
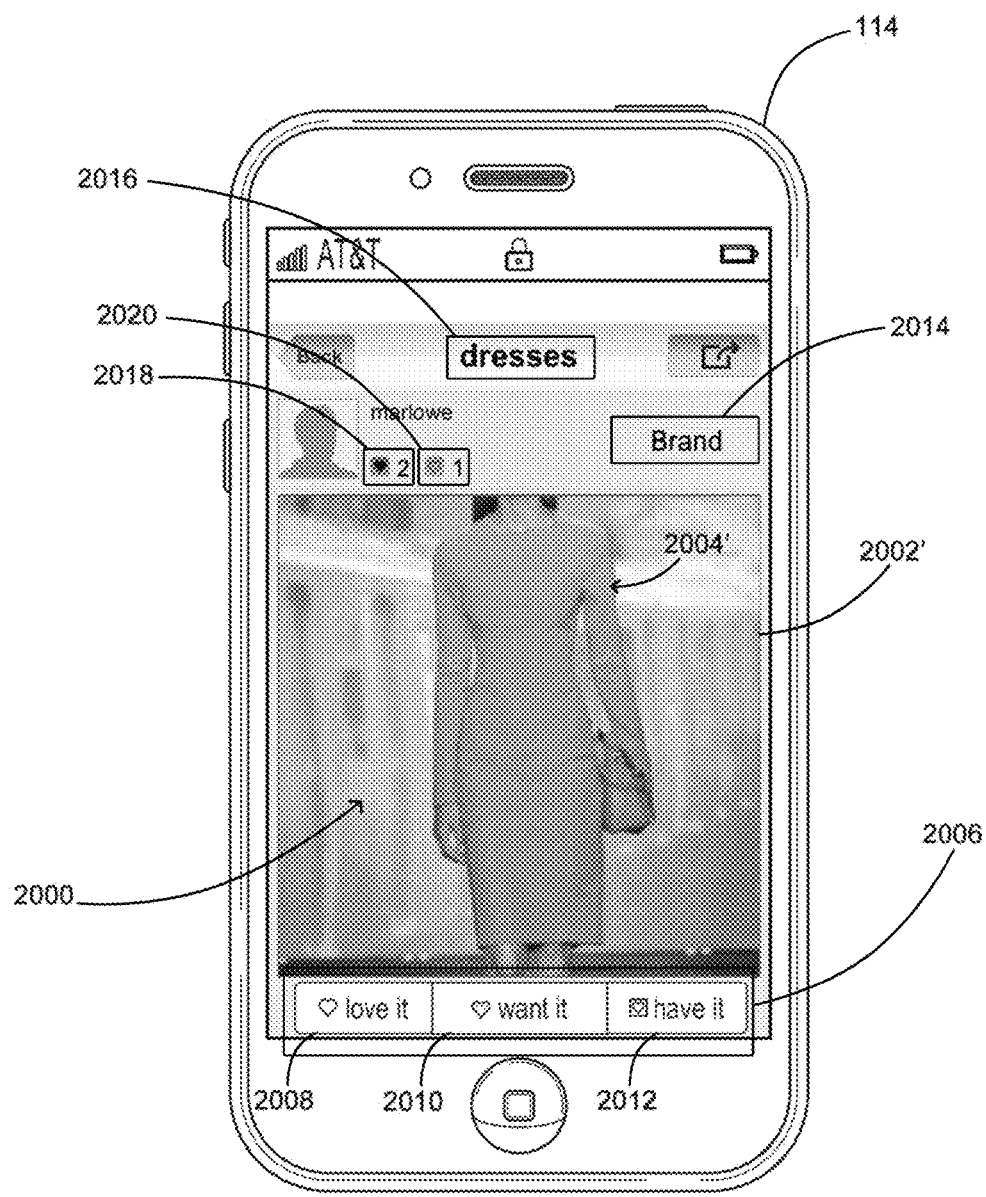
FIG. 20 is a graphical representation of a display provided by an image viewing utility.

Referring to FIG. 20, an interface for interacting with an annotated image is shown. Interface 2000 can be displayed on mobile device 114. Annotated image 2002' containing labelled item 2004' is shown displayed on interface 2000. In one aspect, server 1401 may retrieve annotated image 2002' from plurality of databases 1411 and transmit it to mobile device 114 to be displayed on mobile device 114.

Interface 2000 may provide one or more display fields. For example, interface 2000 may provide display field 2014 for displaying the brand associated with the label of labelled item 2004', and display field 2016 for displaying the category associated with the label of labelled item 2004'. Interface 2000 may also provide display fields 2018 and 2020 for displaying the number of social users who have applied a rating of, for example, "love it" and "want it", respectively, to labelled item 2004'.

It will be appreciated that the brand, category, number of "love it" ratings, and number of "want it" ratings displayed in display field 2014, 2016, 2018, and 2020, respectively, may vary based on the entries in corresponding fields associated with labelled item 2004'. It will also be appreciated that interface 2000 may provide other display fields for displaying field entries associated with labelled item 2004', or any other labelled item being displayed by interface 2000.

Other display fields may be provided in addition to, or in place of, display fields 2014, 2016, 2018, and 2020. It will further be appreciated that one or more of the display fields may be derived based on commercial user records of commercial users associated with the annotated image.

Interface 2000 may also provide a set of selectable rating options 2006 associated with labelled item 2004'. Each rating option of the set of rating options 2006 may correspond to a qualitative or quantitative judgment a social user can make with respect to labelled item 2004'. In one aspect, the social user may express interest in the brand associated with labelled item 2004' by, for example, selecting a rating option of the set of rating options 2006. The set of rating options 2006 may comprise rating option 2008 corresponding to "love it", rating option 2010 corresponding to "want it", and rating option 2012 corresponding to "have it".

In one aspect, image annotation utility 132 may apply a rating field to labelled item 2004' in response to the social user selecting one of rating option 2008, 2010, or 2012. For example, if the social user selects rating option 2008 corresponding to "love it", image annotation utility 132 may apply a rating field corresponding to "love it" to labelled item 2004'. In a further aspect, the social user may further select rating option 2010 and/or 2012, and image annotation utility 132 may apply additional rating fields corresponding to "want it" and "have it", respectively, to labelled item 2004'. In response to the social user selecting a rating option, image annotation utility 132 may further apply the social user's identifier to labelled item 2004'. Alternatively, server 1401 may be operable to apply the social user's identifier to labelled item 2004' after receiving the label from mobile device 114, and may further be operable to update the plurality of databases 1411 accordingly. Updating plurality of databases 1411 may comprise, for example, updating the social user's record to include annotated image 2002's identifier, and updating the image data record of the annotated image to comprise the social user's identifier, and any corresponding judgments made by the social user with respect to the annotated image.

It will be appreciated that in response to image annotation utility 132 applying a rating field to labelled item 2004', display fields 2018 and/or 2020 may be updated accordingly. For example, if a single rating field corresponding to "love it" is applied to labelled item 2004', the number displayed in display field 2018 may increase by one.

Figure 21:
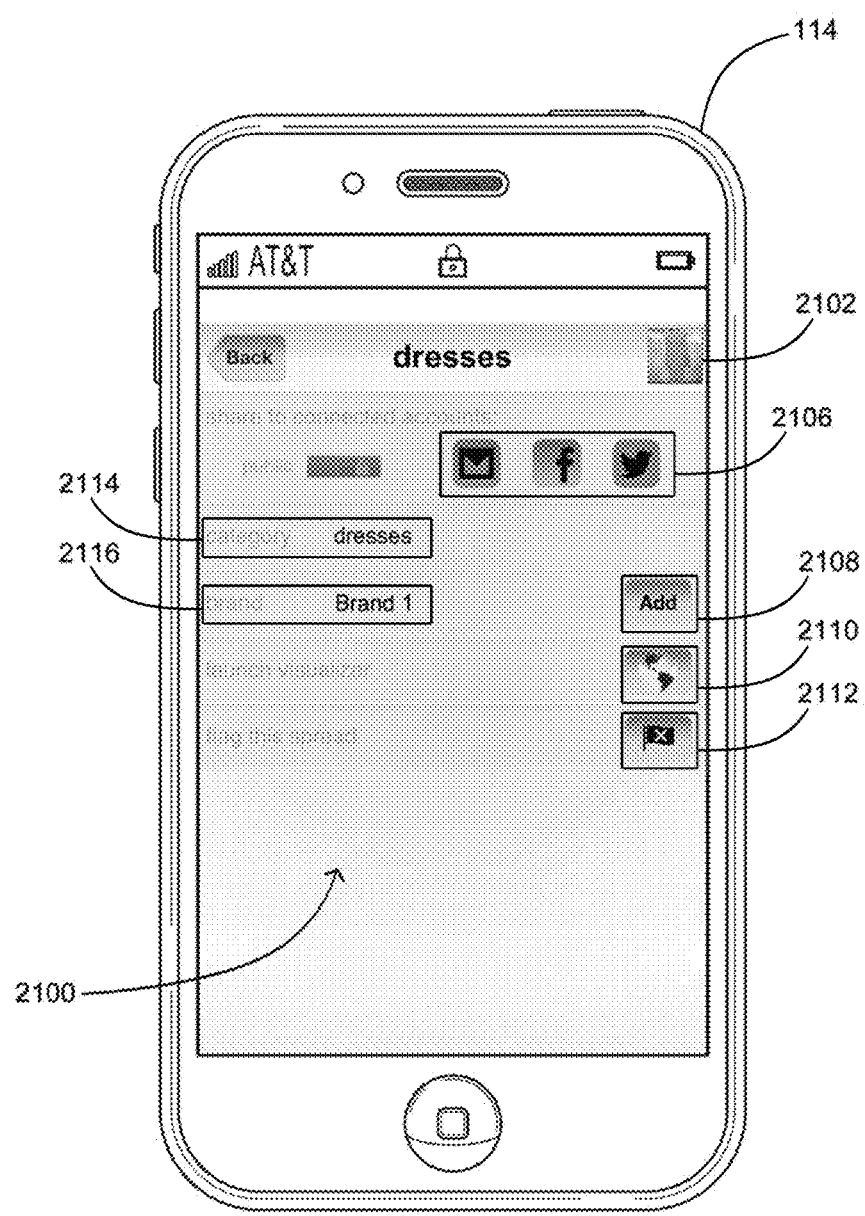
FIG. 21 is another graphical representation of a display provided by an image viewing utility.

Referring to FIG. 21, another interface for interacting with an annotated image is shown. Similar to interface 2000, interface 2100 may provide one or more display fields. For example, interface 2100 may provide display field 2102 for displaying a thumbnail of annotated image 2002', display field 2114 for displaying the brand-name associated with labelled item 2004', and display field 2116 for displaying the category associated with labelled item 2004'.

Interface 2100 may also provide several ways in which a social user may interact with annotated image 2002'. For example, the social user may share annotated image 2002' by selecting a sharing option from a plurality of sharing options 2106, may launch the analytics viewing utility 135 to view various metrics associated with annotated image 2002' by selecting analytics button 2110, or may flag annotated image 2002' for later viewing or consideration by selecting flag button 2112.

It will be appreciated that mobile device 114 may be operable to communicate each interaction with annotated image 2002' to server 1401. In response, server 1401 may be operable to update plurality of databases 1411 accordingly. For example, the social user may select a sharing option from plurality of sharing options 2106 and share annotated image 2002' with a second social user. In response, server 1401 may receive a request from mobile device 114 to transmit annotated image 2002' to the second social user, and may proceed to transmit annotated image 2002' to the second social user. In one aspect, server 1401 may update the social user's record to include information with respect to the annotated image shared, the users with whom it was shared, the media on which it was shared, the location from which it was shared, etc. Server 1401 may also update the second social user's record to include information with respect to the annotated image shared, the user that shared the annotated image, the media on which the annotated image was shared, etc.

Interface 2100 may also provide add-brand button 2108 for enabling the user to express interest in the brand associated with labelled item 2104' and displayed in display field 2116. In one aspect, the social user may express interest in the brand associated with labelled item 2104' by selecting add-brand button 2108.

Referring now to FIG. 19, at S1904, in response to the social user expressing interest in the brand associated with the labelled item appearing in the annotated image, the social user becomes associated with the brand. In one aspect, mobile device 114 may communicate to server 1401 that the social user has expressed an interest in being associated with the brand. In response, server 1401 may update plurality of databases 1411 accordingly. For example, server 1401 may update the social user's record to include a field for indicating that the social user is interested in that particular brand.

In a further aspect, server 1401 may also search the label associated with the labelled item or commercial-user database 1409 for one or more commercial-user identifiers associated with the brand. For example, server 1401 may search commercial-user database 1409 for a record having a brand-name field entry corresponding to the brand in which the social user has expressed an interest. If server 1401 locates a record of a commercial user that is associated with the brand, server 1401 may update the record of the commercial user—in this case, the brand—to include a field for indicating which social user is interested in the brand. In one aspect, the field for indicating which social user is interested in the brand may comprise the social user's identifier.

In a further aspect, server 1401 may further update the social user's record to include the brand's commercial-user identifier, and may also apply relevant fields to the labelled item associated with the brand in which the social user expressed an interest.

Figure 22:
FIG. 22 is graphical representation of a display provided by a commercial interaction utility.

The commercial interaction utility 1446 may provide the social user with a user interface for viewing brands in which the social user has expressed an interest and/or with which the social user is associated. For example, with reference to FIG. 22, commercial interaction utility 1446 may provide interface 2200 on the display of mobile device 114. Interface 2200 is shown displaying a list of brands in which the social user has expressed an interest and with which the social user is associated. In one aspect, the social user may select a brand from the list, and in response, annotated images or labelled items which are associated with the brand and with which the social user has interacted may be displayed. For example, commercial interaction utility 1446 may display labelled items which are associated with the selected brand, and to which the social user has applied a label.

Referring to FIG. 19, at S1906 the brand in which the social user expressed interest may specify content to be provided to the social user. Commercial communication utility 1442 may be operable to enable the brand to specify the content to be provided to the social user. The content may be, for example, an advertisement, a promotion, a video, text, one or more images, a sound, or any other media content that the brand may wish to provide to the social user. In one aspect, the content can be related to items associated with the brand in which the social user expressed interest. For example, the content may comprise a promotion for the specific brand-name item in which the social user has expressed interest, or a promotion for related items of the same brand-name and in the same category as the specific brand-name item of interest to the social user.

Prior to specifying the content, the brand may request commercial communication utility 1442 to provide one or more precursor communications. In one aspect, commercial communication utility 1442 may be operable to request server 1401 to transmit one or more precursor communications to computing device 1414. Precursor communications may comprise any information that may enable the brand to make an informed decision as to the type of content to provide to, for example, the social user, to each of a plurality of social users, to a category of social users, etc. In one aspect, server 1401 may transmit information derived based on, for example, data stored in plurality of databases 1411 and/or data collected by statistical tracking utility 1407. For example, server 1401 may transmit a precursor communication comprising information derived based on social user records, annotated images, commercial user records, collected statistical data, metrics, etc. In one aspect the precursor communication may comprise demographic information regarding the social user and/or judgments the social user made with respect to an annotated image. Analytics viewing utility 1435 may be utilized to analyze the information provided in the precursor communication and to display analytics to the brand based on this information.

In one aspect, commercial communication utility 1442 may also enable the brand to specify a trigger event in response to which the specified content is to be provided. The trigger event may be a specific date or time, or may correspond to an action taken by the social user. For example, the brand may specify that the content is to be provided in response to the social user expressing interest in the brand, in response to the social user sharing one or more annotated images associated with the brand a specific number of times, every Monday at 11:00 am, etc.

In a further aspect, commercial communication utility 1442 may enable the brand to specify content to be provided to a plurality of social users who have expressed interest in the brand. The commercial user may further specify a particular category of social users to be provided with specific content. The particular category may correspond to, for example, fields associated with annotated images and/or records stored in social-user database 1410.

In one aspect, the brand may specify one type of content to be provided to a social user based on the content of a first annotated image, and a different type of content to be provided to a different social user based on the content of a second annotated image. In another aspect, the brand may specify one type of content to be provided to a specific category of social users, and a different type of content to be provided to a different category of social users. For example, the brand may specify a first type of content to be provided to the category of social users who have applied a rating label corresponding to "love it" or "want it" to a specific item associated with the brand, and may specify a different type of content to provide to the category of social users who have applied a rating label corresponding to "have it". The content to be provided to social users who applied a rating label corresponding to "love it" or "want it" may be promotional content enticing the user to purchase the specific brand-name item in which the social users expressed an interest. The content to be provided to social users who applied a rating label corresponding to "have it" may be promotional content enticing the social users to purchase products other than, but related to, the specific brand-name item.

It will be appreciated that the brand may specify the type of content and the category of social users to be provided with the content based on analytics provided to the brand.

As can be observed, the user interaction enabled by system 1400, along with the particular label and database structures disclosed herein, can enable server 1401 to collect meaningful contextual data. The contextual data may include, for example, the particular social users who are labelling particular types of items, the locations that those social users are capturing and annotating images, the ratings and comments that social users provide to items captured in images, and the number of different social users applying labels to particular images.

Further, statistical tracking utility 1407 may be operable to track sharing of annotated images, including the medium annotated images are shared on, the social users who share the annotated images, all social users receiving shared annotated images, how many and which social users apply further labels to annotated images, the type of labels applied by social users and the corresponding field entries provided by the social users, how many and which social users accessed labels of annotated images, and user demographics for all of the above. Statistical tracking utility 1407 may also track additional metrics and provide additional functionalities, such as those described above with respect to statistical tracking utility 107.

In one aspect, statistical tracking utility 1407 may be operable to track additional types of metrics that may be useful to commercial users in determining to which specific social users or categories of social users it may be worthwhile to send particular marketing or promotional content. For example, a brand may be interested in receiving information about, and sending marketing content to, social users who have a specific level of influence on the behaviour of other social users.

In one aspect, statistical tracking utility 1407 may be operable to track one or more social users' market influence on other social users. For example, statistical tracking utility 1407 may be operable to track the sharing and labelling of annotated images, and/or to analyze plurality of databases 1411 to collect statistical data regarding a social users' market influence. The social user's market influence may be based on, for example, how many followers the specific social user has, and/or the actions of these followers or other social users with whom the social user has shared an annotated image. For example, the social user's market influence may be based on how many of these followers or other social users viewed, accessed, labelled, further shared, or provided a judgment, such as a positive rating, to an annotated image, or items appearing therein, shared by the specific social user. The statistical data may be stored in a metric record for the social user. In one aspect, the social user's record may comprise the metric record for the social user.

It will be appreciated that statistical tracking utility 1407 can collect statistical data about a social user based not only on the actions of followers and other social users with whom the social user shares an image, but also based on the actions of additional social users with whom these followers and other social users subsequently share the annotated image. In this way, the actions of each social user who interacts with the annotated image initially shared by the social user may be attributed back to the social user, and a rich data set can be collected with respect to the market influence of the social user, by tracking the dissemination of the annotated image among a plurality of social users.

Statistical tracking utility 1407 may be operable to communicate statistical data and metrics to analytics viewing utility 1435. In one aspect, analytics viewing utility 1435 may be operable to analyze the statistical data and metrics provided by statistical tracking utility 1407, and provide the brand with information about specific users who have expressed interest in the brand, and who have a certain level of market influence. For example, analytics viewing utility 1435 may display to the brand analytics corresponding to specific social users' market influence. In one aspect, analytics viewing utility 1435 may be operable to derive—based on the metrics provided by statistical tracking utility 1407—and provide to the brand a market influence index associated with each of the specific social users.

The market influence index may, for example, assist the brand in determining an appropriate incentive to provide to a specific social user, or a specific category of social users, having a particular level of influence. For example, commercial users may specify a type of promotional content to provide to one or more high-influence social users to, for example, encourage these users to continue disseminating to followers and other social users annotated images containing products associated with the commercial user.

Referring FIG. 19, at S1908 a communication derived based on the content specified by the brand is provided to the social user. The brand may utilize computing device 1414 to transmit a communication comprising the specified content to server 1401. In one aspect, commercial communication utility 1442 may be operable to upload the specified content to memory 1404 of server 1401. The specified content may be stored on memory 1404, or any data storage module or database of plurality of databases 1411.

Computing device 1414 may further transmit to server 1401 a communication request containing instructions for determining to which social users to communicate the content. In one aspect, the communication request may comprise one or more identifiers for identifying trigger events and/or a category of social users to be provided with the specified content. For example, the communication request may comprise one or more annotated image identifiers for identifying social users who may be interested in a specific annotated image or item appearing therein. Alternatively or in addition, the communication request may comprise one or more judgment identifiers for identifying social users who made a specific type of judgment regarding an annotated image.

A content record corresponding to the specified content and the communication request may be generated. In one aspect, the content record may be stored on memory 1404 of computing device 1414, and commercial communication module 1412 of server 1401 may be operable to retrieve the record from memory 1404. In another aspect, the content record may be uploaded to memory 1404 or plurality of databases 1411 of server 1401, and commercial communication module 1412 may be operable to retrieve the content record from memory 1404 or plurality of databases 1411.

In one aspect, server 1401 may transmit to mobile device 114 a communication derived based on the specified content. In a further aspect, the communication may comprise the specified content. In yet a further aspect, the communication may comprise the specified content as well as additional content. In another aspect, the communication may comprise only a portion of the specified content. In yet another aspect, server 1401 may be operable to modify the specified content to create modified content, and the communication may comprise the modified content. It will be appreciated that server 1401 may transmit the communication based on a communication request provided by computing device 1414.

Figure 23:
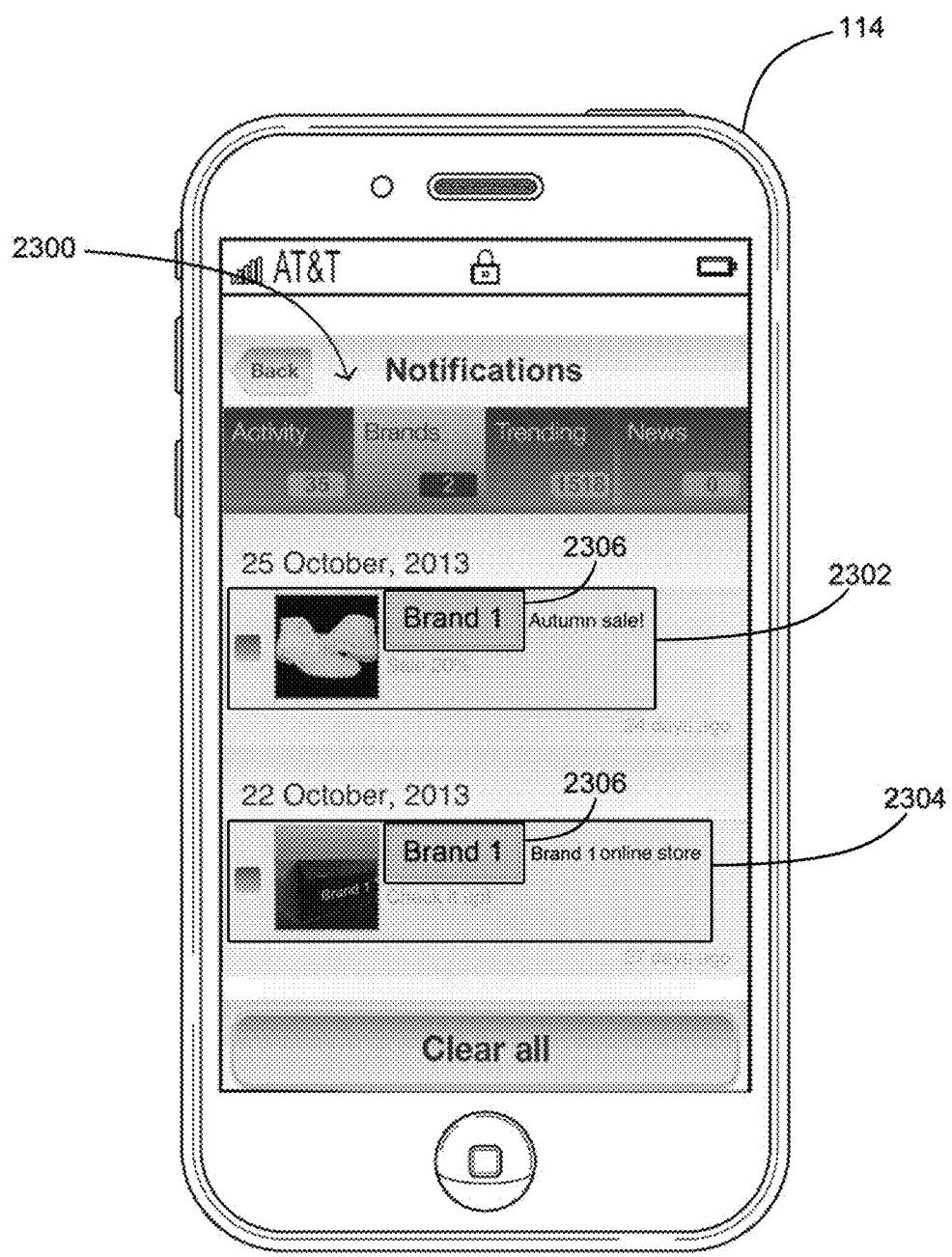
FIG. 23 is another graphical representation of a display provided by a commercial interaction utility.

Referring to FIG. 23, a notification interface 2300 provided by commercial interaction utility 1446 is shown. Notification interface 2300 may be operable to display the content specified by the brand, and may also display content specified by other brands in which the social user expressed an interest. Notification interface 2300 is shown displaying promotional content 2302 and 2304 provided by brand 2306.

In one aspect, commercial communication module 1412 may require authorization from the social user operating mobile device 114 before providing to the social user the content specified by the brand. This permission may be required despite the social user being associated with the brand, or indicating an interest in the brand. In one aspect, commercial communication module 1412 may request authorization to provide content related to the brand at S1904, before associating the social user with the brand. For example, in response to the social user expressing an interest in the brand, commercial interaction utility 1446 may be operable to display a prompt to the social user asking whether the social user wishes to be associated with the brand, and/or a prompt asking whether the social user would like to receive content from the brand. It will be appreciated that the prompt may comprise information derived based on the annotated image or the commercial user record for the brand, such as the name of the brand. The social user may grant or deny permission for commercial communication module 1412 to provide the content specified by the brand.

It will be appreciated that commercial interaction utility 1446 may be operable to communicate the social user's decision to commercial communication module 1412, which may instruct server 1401 to update the social user's record stored in social-user database 1410 to specify the social user's interaction preference with respect to the brand.

In a further aspect, commercial interaction utility 1446 may enable the social user to modify his or her preferences for interacting with particular brands. In one aspect, commercial interaction utility may enable the social user to grant or deny permission for commercial communication module 1412 to provide content related to a brand associated with the social user.

Figure 24:
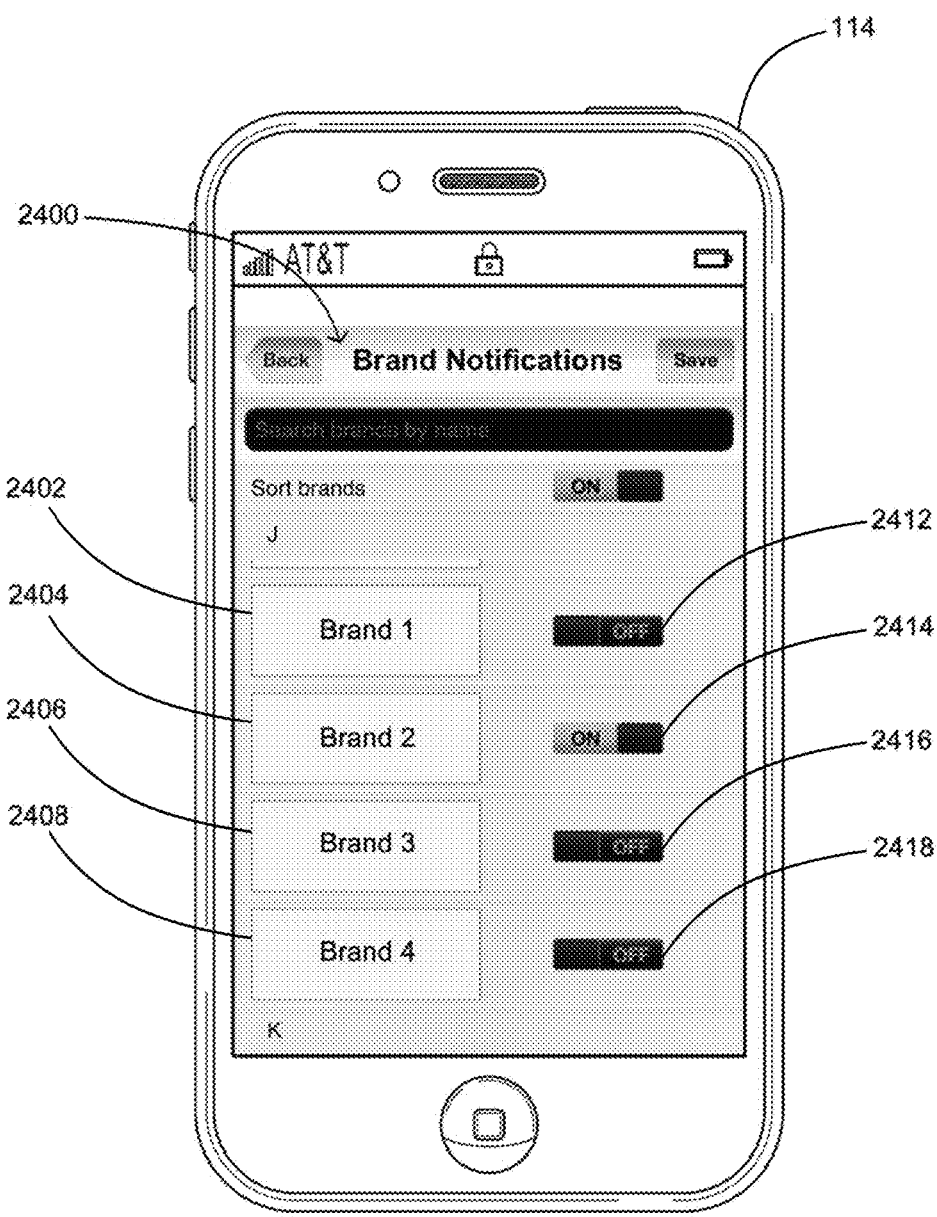
FIG. 24 is yet another graphical representation of a display provided by a commercial interaction utility.

Referring to FIG. 24, notification preference interface 2400 is shown. Notification preference interface 2400 is shown displaying a plurality of brands 2402, 2404, 2406, and 2408 with which the social user is associated. Notification preference interface may also provide preference toggles 2412, 2414, 2416, and 2418 operable to modify interaction preferences for brands 2402, 2404, 2406, and 2408, respectively.

In one aspect, the social user may toggle a preference toggle associated with a brand to "OFF", thereby denying permission for content associated with that brand to be provided to the social user. Conversely, the social user may toggle a preference toggle associated with a brand to "ON", thereby granting permission for content associated with that brand to be provided to the social user.

In another aspect, commercial interaction utility 1446 may provide the social user with a plurality of brand interaction options. The social user may manipulate the plurality of interaction options to refine interaction preferences for a particular brand. For example, in one aspect the social user may configure his or her interaction preferences to permit a brand to provide only a certain type of content. The social user may specify that, for example, only content pertaining to promotions for a specific type of product or category of products may be provided to the social user.

It will be appreciated that commercial interaction utility 1446 may be operable to communicate the social user's interaction preferences to server 1401, in response to which the social user's record may be updated according to the social user's interaction preferences. In one aspect, server 1401 may generate for the social user a communication-permission record to store the social user's interaction preferences. It will be appreciated that the social user's record may comprise the communication-permission record. It will be further appreciated that server 1401 may be operable to determine based on the communication-permission record whether server 1401 is permitted to transmit content specified by the brand to mobile device 114, and may be operable to transmit a communication derived based on content specified by the brand to mobile device 114 if and only if server 1401 determines that the social user permits server 1401 to transmit content specified by the brand to mobile device 114.

In another aspect, commercial interaction utility 1446 may request a social user to authorize content specified by a brand to be provided to the social user, without the social user having to be associated with or having expressed an interest in the brand.

In one aspect, commercial interaction utility 1446 may interface with statistical tracking utility 1407 to identify one or more unassociated brands from which the social user may be interested in receiving content. For example, commercial interaction utility 1446 may determine based on metrics provided by statistical tracking utility 1407 that a brand, items associated with the brand, and/or categories associated with the brand that the user has not expressed an interest in are correlated with brands, items, categories, or other social users associated with the social user. For example, commercial interaction utility 1446 may determine that many social users that the social user follows are associated with and have expressed interest in a particular brand. Commercial interaction utility 1446 may then request authorization from the social user to provide content specified by that particular brand, despite the social user not being associated with or having expressed an interest in that particular brand.

In a further aspect, a particular brand may be interested in providing content to a particular user, such as a social user with a market influence over other social users—for example, a celebrity, athlete, fashion guru, popular personality, etc. In one aspect, the brand may request analytics viewing utility 1435 to provide a listing of all social users with a high market influence index corresponding to a specific geographic location and with respect to a specific category of item. The brand may view analytics provided by analytics viewing utility 1435 and determine that the particular user has a high market influence over other social users in the particular geographic area in which the brand wishes to market a product of the specific category. Commercial communication utility 1442 may enable the commercial user to provide to server 1401 a request to interact with the particular social user. Server 1401 may be operable to communicate the interaction request to commercial interaction utility 1446, which may then inform the particular social user that the brand has expressed an interest in providing content to the social user, and may request authorization to provide content specified by the brand.

For example, the brand may be a popular retail Boutique based in Toronto and known for its brand-name designer handbags. To promote its handbags, the Boutique may be interested in interacting with social users who are based in Toronto and who have a high market influence with respect to the category "fashion". In one aspect, the Boutique may utilize analytics viewing utility 1435, requesting that it display social users based in Toronto having a high market influence with respect to the category "fashion".

To determine the market influence of social users with respect to the category "fashion", analytics viewing utility 1435 may request metrics from statistical tracking utility 1407 with respect to, for example, which social users located in Toronto have shared the highest number of annotated images associated with the category "fashion" or any associated subcategories; with how many other users have these social users shared the annotated images; how many followers these social users have; the locations of followers and the other users with whom these social users have shared images; how many followers or other users rated images shared with them by these social users with a "love it" or "want it" rating; how many followers or other users accessed a link field of the annotated image that linked them to a web page for purchasing a fashion item appearing in the annotated image; how many followers or other users subsequently applied a rating label of "have it" with respect to the annotated image, etc. Analytics viewing utility 1435 may derive and display a market influence index for each social user or a further subcategory of social users based on these or similar metrics.

The Boutique may note that one social user associated with the user name "Fashionista" has a disproportionality high market influence index. As a result, the Boutique may wish to interact with Fashionista in an attempt to encourage Fashionista to promote the Boutique's brand of handbag by, for example, sharing annotated images of the handbag and applying labels of "want it", "love it", or "have it" to the annotated image. The Boutique may request analytics viewing utility 1435 to provide demographic or other information about Fashionista, in response to which analytics viewing utility 1435 may provide a display to the Boutique showing that Fashionista is a female who is between 25 and 30 years old.

The Boutique may utilize commercial interaction utility 1442 to send an interaction request to server 1401 with respect to Fashionista. Server 1401 can communicate the interaction request to the commercial interaction utility of Fashionista's mobile device 114. Fashionista may have configured her interaction settings to only receive interaction requests from brands associated with a specific category—in this case, "fashion". Fashionista may be provided with a prompt informing her that the Boutique is associated with brand-name designer handbags and is interested in interacting with Fashionista to provide her with promotions, such as discounts on the Boutique's merchandise.

Fashionista may authorize commercial interaction utility 1442 to add the Boutique to Fashionista's list of associated brands. The Boutique may interact with Fashionista to, for example, provide promotions that may entice Fashionista to promote the Boutique's brand of handbags. For example, the Boutique may provide a promotion to Fashionista discounting one of the Boutique's designer handbags by 20% for every 200 social users with whom Fashionista shares an annotated image of the handbag after applying a label of "love it" to the image. The Boutique may further specify that for every 100 social users who are based in Toronto and who apply a label of "love it" to the annotated image shared with them by Fashionista, the Boutique will provide a further discount of 20% for the handbag. The Boutique may interact with Fashionista or her social user profile to determine an appropriate incentive to provide her, in order to encourage her to disseminate annotated images containing products associated with the Boutique to followers and other social users over which she has influence.

In a further example, the Toronto-based Boutique may plan to open a new retail store in Hong Kong, and may wish to build excitement and interest among potential customers located in Hong Kong. To do so, the Boutique may be interested in interacting with social users based in Toronto who have expressed an interest in the Boutique's merchandise, and who have a high market influence over social users located in Hong Kong with respect to, for example, the category "fashion". The boutique may be interested in interacting with such high-influence social users to, for example, provide these social users with promotions or incentives to encourage them to interact positively with annotated images of the Boutique's merchandise and share such images with social users based in Hong-Kong over which the Toronto-based users may have an influence. If the high-influence Toronto-based users can be induced to make favorable judgments regarding products that will be sold in the new store in Hong Kong at an opportune time, such as in the weeks or days leading up to the new store's opening, then this may help build excitement and interest among potential customers located in Hong Kong over which the Toronto-based users have an influence.

In one aspect, the Boutique may utilize analytics viewing utility 1435, requesting that it display Toronto-based users having a high market influence over social users in Hong Kong with respect to the category "fashion", or any associated subcategories. To determine which Toronto-based users are associated with these particular traits, analytics viewing utility 1435 may request metrics from statistical tracking utility 1407 with respect to, for example, which Toronto-based users have shared the highest number of annotated images associated with the category "fashion" with social users located in Hong Kong; with how many social users located in Hong Kong have the Toronto-based users shared the annotated images; how many followers located in Hong Kong the Toronto-based users have; how many followers or other social users located in Hong Kong rated annotated images shared with them by the Toronto-based users with a "love it" or "want it" rating; how many followers or other social users located in Hong Kong accessed a link field of the shared annotated images that linked them to a web page for purchasing a fashion item appearing in the annotated images; how many followers or other social users located in Hong Kong subsequently applied a rating label of "have it" to the annotated images, etc. Analytics viewing utility 1435 may derive and display a market influence index for each Toronto-based user or a further subcategory of these users based on these or similar metrics.

It will be appreciated that the market influence index of Toronto-based users may be determined based on both the quantity and quality of social users located in Hong Kong over which the Toronto-based users have influence. For example, analytics viewing utility 1435 may be operable to determine the market influence with respect to the category "fashion" of social users located in Hong Kong. Once a certain number of highly influential social users based in Hong Kong—such as celebrities or fashion leaders—have been identified, a filter may be applied to identify those highly influential social users based in Hong Kong who are most influenced by particular social users located in Toronto. The Boutique may wish to interact with the particular social users located in Toronto, even if such social users do not have a direct influence over a high number of social users located in Hong Kong, as the particular social users may be able to directly influence social users located in Hong Kong who themselves have a high influence over a large number of other social users located in Hong Kong. For this reason, analytics viewing utility 1435 may, for example, ascribe a similar market influence index to two Toronto-based users, despite that the first Toronto-based user may have a direct influence over a lower number of social users located in Hong Kong than the second Toronto-based user, if the social users over which the first Toronto-based social user has a direct influence themselves have an aggregated market influence index that is similar to that of the social users over which the second Toronto-based user has influence.

It will be appreciated that the above examples illustrate specific embodiments of system 1400 in use, and are not intended to limit the scope of the invention in any manner.

In a further aspect, commercial interaction utility 1446 may enable the social user to authorize any brand to provide content to the social user. For example, search utility 140 may be operable to enable the social user to search for brands based on information associated with the brand, such as the brand's name, items associated with the brand, categories associated with the brand, etc. Search utility 140 may return relevant search results to the social user, and commercial interaction utility 1446 may enable the social user to authorize any brand listed in the search results to provide content to the social user.

It will be further appreciated that statistical tracking utility 1407 may be operable to track how many and which social users permit a brand to interact with them, and/or how many and which social users have modified their interaction settings to no longer interact with a brand. Statistical tracking utility 1407 may further be operable to provide such metrics to analytics viewing utility 1435, which may provide commercial users corresponding analytics.

In a further aspect, commercial interaction utility 1446 may be operable to instruct server 1401 to communicate only a limited amount of information about the social user to one or more brands. For example, a social user may configure commercial interaction utility 1446 to authorize server 1401 to send to specific brands particular metrics regarding the social user to help the brand determine what kind of content may be of interest to the social user. In another aspect, the social user may configure commercial interaction utility 1446 to prohibit server 1401 from communicating to one or more particular brands any metrics related to the social user.

It will be appreciated that brands and social users may interact indirectly through server 1401, and therefore, server 1401 may be configured to provide commercial users analytics with respect to specific social users while preserving the anonymity of the users.

As mentioned previously, the user interaction enabled by system 1400, along with the particular label and database structures disclosed herein, can enable server 1401 to collect meaningful contextual data. The contextual data collected by server 1401 may allow publishers of online publications to analyze how social users viewing the publications interact with annotated images appearing therein. Such an implementation may provide publishers with a unique opportunity for monetization, since statistical tracking utility 1407 may track how social users viewing the online publication interact with, for example, advertisements, by tracking how social users interact with annotated images appearing in the advertisements.

For example, a publisher of an online magazine may publish advertisements consisting of annotated images having labelled products. The publisher may utilize analytics viewing utility 1435 to determine, for example, that social users interact most often and/or most favourably with advertisements showing products of a particular category, or of a particular brand-name. The publisher may also determine that, for example, social users most frequently view, share, rate, or access labels or links of annotated images appearing in advertisements displayed alongside or in particular types of images, particular types of articles, or a particular section of the publisher's online magazine. For example, the publisher may determine that users more frequently rate and access the links of labelled products that appear alongside or in images showing particular celebrities or athletes. The publisher may also determine that its online magazine and/or particular advertisements appearing therein appeal to a particular demographic of social users, such as, for example, social users of a particular age or gender, social users residing in particular geographic locations, or social users in a particular income bracket.

In this way, the publisher may collect a rich data set for determining the type of advertisements, categories of products, or brands that are most likely to appeal to social users viewing the online magazine, specific images in the magazine, specific types of articles in the magazine, or specific types of sections of the magazine. The publisher may then include more of the type of content that is likely to appeal to its readers.

In one aspect, the publisher may also determine which commercial users, such as brands, may be most interested in advertising in the publisher's magazine, or in specific sections of the magazine. For example, the publisher may publish a popular fashion magazine, and by utilizing analytics viewing utility 1434 may determine that a particular section of its magazine, "Sophisticated Shoes for the Season", is popular among women located in downtown Toronto who are in a high-income bracket. The publisher may further determine that the social users of this particular demographic often share and positively rate annotated images showing a particular brand-name of shoe.

The publisher may then contact the brand in which the social users express interest, and may attempt to persuade the brand to purchase advertising space in the online magazine. The magazine may provide the brand with a rich data set comprising relevant metrics and statistics showing the number of social users reading the online magazine, the demographics of these social users, the category of products the social users are interested in, the number of social users who may be interested specifically in the brand's products or products similar to the brand's products, etc. In this way, the publisher can market its magazine to the brand—or other potential advertisers—more effectively, as the publisher can provide the brand with detailed information on social user interaction with the publisher's magazine. The publisher may then establish a business relationship with the brand, or if a business relationship cannot be established with that particular brand, the publisher may attempt to establish a business relationship with one or more different brands that are associated with similar products.

In one aspect, the publisher may enter into an advertising agreement with a brand on a variable fee basis, wherein the price charged by the publisher for advertising space may vary based on the number of interactions the advertisement receives. The publisher may charge a flat fee, fee-per-click, fee related to subsequent linking to a web page, fee related to subsequent purchase, etc. For example, in one aspect, the publisher may charge the brand for each time a social user clicks on the brand's advertisement, accesses a website by clicking a labelled item appearing in the advertisement, or provides a positive judgment regarding an annotated image, or items appearing therein, shown in the advertisement.

It will be appreciated that the publisher may also be provided with a data set that allows the publisher to more accurately determine the value of advertising space in its magazine, and to set differential pricing for advertising space. For example, the publisher may determine that social users of a particular sought after demographic view and interact most often with annotated images shown in a particular section of the online magazine. The publisher may then set a first, higher price for advertising space in this particular section of the online magazine, and set a second, lower price for advertising space in a different section of the online magazine with which social users of a less appealing demographic interact, or with which social users overall interact less frequently.

It will further be appreciated that brands may also utilize system 1400, say to determine whether their marketing resources are allocated effectively. For example, a brand may utilize analytics viewing utility 1435 to determine the market influence index of a publisher, or the market influence index of social users who are subscribers or readers of the publisher's online magazine. In this way, the brand can determine in which of multiple publications the brand should purchase advertising space, the types of advertisements to provide, and where the advertisements should be located within a particular publication, to ensure its advertisements reach and appeal to the largest number of potential customers. The market influence of the publisher and social users may be determined in a manner similar to that outlined previously.

Further, in one aspect, statistical tracking utility 1407 may collect in real-time statistical data regarding how social users are interacting with the brand's advertisements appearing in a publication, and the brand may utilize analytics viewing utility 1435 to view in real-time the number and type of social users who are interacting with its advertisements, and the types of interactions that are occurring. In a further aspect, a brand may purchase advertising space in two or more publications, and may utilize analytics viewing utility 1435 to compare the amount and type of interaction its advertisements are receiving in each publication. If the brand determines that a particular publication is no longer providing the brand with the exposure it was promised or which it desires, it may reallocate its marketing resources or renegotiate its advertising contract accordingly.

Competitors of a brand may also be interested in the frequency with which the advertisement images of the brand are viewed or judged. Assuming, for example, that the competitor's brand is somewhat comparable to, and competes with the brand, a competitor may also want to bid for the space in which the brand is currently advertising. This may enable market forces to operate more efficiently to define the value of particular advertising space within an online publication, as both the brand and its competitors can be more informed—given social user interaction with advertisement images—than they would otherwise be, and an online auction-like bidding process can then be created to sell this particular space for advertising purposes going forward. The space can then be allocated to its highest value user, which can be beneficial i) to advertisers, to make sure that their advertising dollars are being spent effectively; ii) to social users who are reading the periodical, to increase the chances that they will be reading or viewing advertisements that are of interest to them; and iii) to publications themselves, because they can both increase their advertising revenue for high-value advertising space, and provide a more interesting reading/viewing experience to their customers, the social users, because the advertising content provided to social users can be made more relevant to those social users.

It will further be appreciated that an administrator operating server 1401 may utilize the contextual data collected by server 1401 to identify and communicate with commercial users or social users of interest. For example, the administrator may instruct server 1401 to determine which social users have a high market influence with respect to a particular brand, a particular category of product, a particular demographic of social users, etc. It will be appreciated that server 1401 may be configured to automatically identify such social users by, for example, being configured to identify social users having a market influence index exceeding a specified threshold. It will further be appreciated that server 1401 may identify users of interest based on, for example, data collected by statistical tracking utility 1407 and/or any data stored on memory 1404 or plurality of databases 1411.

In one aspect, upon identifying a particular social user having a high market influence, server 1401 may be operable to communicate such information to commercial users that may be interested in interacting with such social users. For example, if server 1401 identifies a social user who has a particularly high market influence with respect to the category "fashion" and the category "shoes", server 1401 may search plurality of commercial records for a commercial user who is highly associated with these categories. A commercial user may be highly associated with a category if, for example, the commercial user is associated with a relatively high number of annotated images of that category. Server 1401 may then transmit a communication to computing device 1414 of the commercial user, to notify the commercial user that it may be interested in interacting with the identified social user.

Alternatively, or in addition, upon identifying a particular social user having a high market influence, server 1401 may be operable to transmit a communication to mobile device 114 of that social user, to notify that social user of their level of influence with respect to, for example, a particular brand, a particular category of product, a specific demographic of social users, etc. The social user may receive such a notification through commercial interaction utility 1446. In one aspect, the social user may be provided with an interface to track the social user's market influence with respect to various categories. In a further aspect, the social user may utilize commercial interaction utility 1446 to communicate with commercial users that may be interested in the social user's high market influence over a category such as a type of brand, a category of product, a demographic of social users, etc.

For example, server 1401 may transmit a communication to a particular social user, notifying the particular user that he or she has a relatively high influence over the behavior of other social users with respect to annotated images showing products of the category "high heels", as well as annotated images showing products of a particular brand. In one aspect, if the social user wishes to monetize his or her influence, the social user may utilize commercial interaction utility 1446 to request server 1401 to transmit an interaction request to commercial users who are highly associated with the category high heels, and an interaction request specifically to the particular brand. In this way, the social user may be able to reach out to commercial users who may be interested in providing the social user with, for example, promotions or compensation to incentivize the social user to disseminate annotated images of the commercial user's products.

Although the invention has been described with reference to certain specific embodiments, various modifications thereof will be apparent to those skilled in the art without departing from the spirit and scope of the invention as outlined in the claims appended hereto. The entire disclosures of all references recited above are incorporated herein by reference.

The invention claimed is:

1. A method for matching at least one social user of a plurality of social users of an image annotation system with a searcher of the image annotation system, the image annotation system comprising a computer storage media and a processor for communicating with a plurality of computing devices operated by respective social users of the plurality of social users, the method comprising:

storing a plurality of annotated images on the computer storage media, the plurality of annotated images comprising a plurality of image data records, wherein i) each annotated image of the plurality of annotated images comprises an image in linked association with an image data record in the plurality of image data records such that the image is retrievable from being stored based on the image data record and is viewable on the plurality of computing devices, and the image data record is retrievable from being stored based on the image, ii) a plurality of designations are stored in the plurality of image data records, and iii) for each image data record in the plurality of image data records, the plurality of designations comprises an associated designation, the associated designation being one of a brand of an item displayed in the image of that image data record, and a category of the item displayed in the image of that image data record;

each image data record comprising
judgment data comprising at least two judgments provided by at least two social users in the plurality of social users, the at least two judgments comprising, for each social user of the at least two social users in the plurality of social users, at least one judgment regarding the image,
at least two social user identifiers comprising a distinct social user identifier for each of the at least two social users, wherein for each social user identifier the processor is operable to communicate with a respective computing device of a corresponding social user based on the social user identifier; and
at least one designation regarding the image;

defining a search criterion based on at least one designation of the plurality of the designations;

searching the plurality of annotated images using the search criterion to determine at least one social user identifier based at least partly on the at least one designation, wherein the at least one social user identifier identifies a social user that has recorded, in each image data record of at least two image data records, at least one judgment about the image for that image data record, such that each image data record of the at least two image data records comprises the at least one social user identifier;

storing on the computer storage medium at least two social user metric records comprising at least a first social user metric record for a first social user in the plurality of social users and a second social user metric record for a second social user in the plurality of social users by, receiving at the processor from the first social user, a first annotated image, the first annotated image comprising a first image data record recording i) at least one judgment made by the first social user regarding an image of the first annotated image, ii) a first social user identifier for identifying the first social user such that, based on the first social user identifier, the processor is operable to communicate with the respective computing device of the first social user, and iii) at least one designation regarding the image of the first annotated image;

receiving at the processor a request from the first social user to transmit the first annotated image such that the first annotated image is viewable on the respective computing devices of other social users of the plurality of social users, the other social users comprising the second social user;

upon receiving the request from the computing device of the first social user, operating the processor to transmit the first annotated image such that the first annotated image is viewable on the respective computing devices of the other social users;

operating the processor to collect, at least in part from the first annotated image, statistical data regarding the first social user based on actions of the other social users relative to the first annotated image and recorded in the first image data record subsequent to the other social users receiving the first annotated image, and to store the statistical data on the computer storage media in the first social user metric record for the first social user;

receiving at the processor from the second social user, an updated first annotated image, the updated first annotated image comprising an updated first image data record recording i) at least one judgment made by the second social user regarding the image of the updated first annotated image in addition to the at least one judgment made by the first social user regarding the image, ii) a second social user identifier for identifying the second social user such that, based on the second social user identifier, the processor is operable to communicate with the respective computing device of the second social user, and iii) at least one designation regarding the image of the updated first annotated image;

receiving at the processor a request from the second social user to transmit the updated first annotated image such that the updated first annotated image is viewable on the respective computing devices of additional social users of the plurality of social users;

upon receiving the request from the computing device of the second social user, operating the processor to transmit the updated first annotated image such that the updated first annotated image is viewable on the respective computing devices of the additional social users; and operating the processor to collect statistical data regarding the first social user and the second social user based on actions of the additional social users relative to the updated first annotated image and recorded in the updated first image data record subsequent to receiving the updated first annotated image, and updating the first social user metric record and the second social user metric record based on the statistical data.

2. The method as defined in claim 1 wherein determining the at least one social user identifier based, at least in part, on the at least two image data records, further comprises also determining the at least one social user identifier based, in part, on, for each image data record of the at least two image data records, a metric record for each social user of the at least two social users for that image data record.

3. The method as defined in claim 1 further comprising operating the processor to send a communication to a user device of the social user identified by the at least one social user identifier.

4. The method as defined in claim 1 wherein storing the plurality of image data records further comprises storing a plurality of image contexts, by, for each image data record in the plurality of image data records, storing an image context for that image, wherein the image context categorizes additional content viewable when viewing that image on a computing device in the plurality of computing devices, the method further comprising:
    defining a context search criterion based on the image context; and
    searching the plurality of annotated images using the context search criterion and the judgment data to determine if the judgment data is correlated with the context search criterion.

5. The method as defined in claim 4, wherein for each image data record in the plurality of image data records,
    the additional content viewable when viewing that image is an additional image, the additional image being of a person; and
    the image context categorizes the additional content viewable when viewing that image by identifying that person.

6. The method as defined in claim 4, wherein, for each image data record in the plurality of image data records,
    the additional content viewable when viewing that image is written content; and
    the image context categorizes the written content viewable when viewing that image.

7. The method as defined in claim 3 further comprising, prior to operating the processor to send the communication to the user device of the social user identified by the at least one social user identifier recorded in the at least two image data records, operating the processor to generate the communication based on, for at least one image data record of the at least two image data records, the at least one judgment recorded by that social user about the image for that image data record and the associated designation recorded in that image data record.

8. The method as defined in claim 1, wherein
    the statistical data comprises a transmission count of a number of the additional social users; and
    updating the first social user metric record and the second social user metric record based on the statistical data comprises updating the first social user metric record based on the transmission count.

9. The method as defined in claim 1, wherein
    the statistical data comprises a judgment count of a number judgments made by the additional social users regarding the updated first annotated image; and
    updating the first social user metric record and the second social user metric record based on the statistical data comprises updating the first social user metric record based on the judgment count.

10. The method as defined in claim 1 further comprising:
determining a positive judgment count indicating a number of positive judgments made by the additional social users; and
updating the first social user metric record based on the positive judgment count.

11. The method as defined in claim 1, wherein
the statistical data comprises a sharing count of a number of requests from the respective computing devices of the additional social users received at the processor to transmit the updated first annotated image to make the updated first annotated image viewable on the respective computing devices of other additional social users; and
updating the first social user metric record and the second social user metric record based on the statistical data comprises updating the first social user metric record based on the sharing count.

12. A system for matching at least one social user of a plurality of social users with a searcher, the system comprising a computer storage media and a processor for communicating with a plurality of computing devices operated by respective social users of the plurality of social users,
the computer storage media being configured to store a plurality of annotated images on the computer storage media, the plurality of annotated images comprising a plurality of image data records, wherein i) each annotated image of the plurality of annotated images comprises an image in linked association with an image data record in the plurality of image data records such that the image is retrievable from being stored based on the image data record and is viewable on the plurality of computing devices, and the image data record is retrievable from being stored based on the image, ii) a plurality of designations are stored in the plurality of image data records, and iii) for each image data record in the plurality of image data records, the plurality of designations comprises an associated designation, the associated designation being one of a brand of an item displayed in the image of that image data record, and a category of the item displayed in the image of that image data record;
each image data record comprising
judgment data comprising at least two judgments provided by at least two social users in the plurality of social users, the at least two judgments comprising, for each social user of the at least two social users in the plurality of social users, at least one judgment regarding the image,
at least two social user identifiers comprising a distinct social user identifier for each of the at least two social users, wherein for each social user identifier the processor is operable to communicate with a respective computing device of a corresponding social user based on the social user identifier; and
at least one designation regarding the image;
the processor being configured to
receive a search criterion based on at least one designation of the plurality of the designations, and
search the plurality of annotated images using the search criterion to determine at least one social user identifier based at least partly on the at least one designation, wherein the at least one social user identifier identifies a social user that has recorded, in each image data record of at least two image data records, at least one judgment about the image for that image data record, such that each image data record of the at least two image data records comprises the at least one social user identifier;
the computer storage media being further configured to store at least two social user metric records comprising at least a first social user metric record for a first social user in the plurality of social users and a second social user metric record for a second social user in the plurality of social users; and
the processor being further operable to
receive from the first social user, a first annotated image, the first annotated image comprising a first image data record recording i) at least one judgment made by the first social user regarding an image of the first annotated image, ii) a first social user identifier for identifying the first social user such that, based on the first social user identifier, the processor is operable to communicate with the respective computing device of the first social user, and iii) at least one designation regarding the image of the first annotated image;
receive a request from the first social user to transmit the first annotated image such that the first annotated image is viewable on the respective computing devices of other social users of the plurality of social users, the other social users comprising the second social user;
after receiving the request from the computing device of the first social user, transmit the first annotated image such that the first annotated image is viewable on the respective computing devices of the other social users;
collect, at least in part from the first annotated image, statistical data regarding the first social user based on actions of the other social users relative to the first annotated image and recorded in the first image data record subsequent to the other social users receiving the first annotated image, and store the statistical data on the computer storage media in the first social user metric record for the first social user;
receive from the second social user, an updated first annotated image, the updated first annotated image comprising an updated first image data record recording i) at least one judgment made by the second social user regarding the image of the updated first annotated image in addition to the at least one judgment made by the first social user regarding the image, ii) a second social user identifier for identifying the second social user such that, based on the second social user identifier, the processor is operable to communicate with the respective computing device of the second social user, and iii) at least one designation regarding the image of the updated first annotated image;
receive a request from the second social user to transmit the updated first annotated image such that the updated first annotated image is viewable on the respective computing devices of additional social users of the plurality of social users;
after receiving the request from the computing device of the second social user, transmit the updated first annotated image such that the updated first annotated image is viewable on the respective computing devices of the additional social users; and collect statistical data regarding the first social user and the second social user based on actions of the additional social users relative to the updated first annotated image and recorded in the updated first image data record subsequent to receiving the updated first annotated image, and updating the first social user metric record and the second social user metric record based on the statistical data.

13. The system as defined in claim 12 wherein when determining the at least one social user identifier based, at least in part, on the at least two image data records, the processor also determines the at least one social user identifier based, in part, on, for each image data record of the at least two image data records, a metric record for each social user of the at least two social users for that image data record.

14. The system as defined in claim 12 wherein after determining the social user identified by the at least one social user identifier, the processor sends a communication to a user device of the social user identified by the at least one social user identifier.

15. The system as defined in claim 12 wherein
the plurality of image data records further comprises a plurality of image contexts, such that, for each image data record in the plurality of image data records, an image context for that image is stored, wherein the image context categorizes additional content viewable when viewing that image on a computing device in the plurality of computing devices, and
the processor is further configured to receive a context search criterion and to search the plurality of annotated images using the context search criterion and the judgment data to determine if the judgment data is correlated with the context search criterion.

16. The system as defined in claim 15, wherein for each image data record in the plurality of image data records,
the additional content viewable when viewing that image is an additional image, the additional image being of a person; and
the image context categorizes the additional content viewable when viewing that image by identifying that person.

17. The system as defined in claim 15, wherein, for each image data record in the plurality of image data records,
the additional content viewable when viewing that image is written content; and
the image context categorizes the written content viewable when viewing that image.

18. The system as defined in claim 14 wherein, prior to sending the communication to the user device of the social user identified by the at least one social user identifier recorded in the at least two image data records, the processor generates the communication based on, for at least one image data record of the at least two image data records, the at least one judgment recorded by that social user about the image for that image data record and the associated designation recorded in that image data record.

19. The system as defined in claim 12, wherein the statistical data stored in the first social user metric record comprises a transmission count of a number of the additional social users.

20. The system as defined in claim 12, wherein the statistical data comprises a judgment count of a number judgments made by the additional social users regarding the updated first annotated image.

21. The system as defined in claim 12, wherein the statistical data comprises a positive judgment count of a number of positive judgments made by the additional social users regarding the updated first annotated image.

22. The system as defined in claim 12, wherein the statistical data comprises a sharing count of a number of requests from the respective computing devices of the additional social users received at the processor to transmit the updated first annotated image to make the updated first annotated image viewable on the respective computing devices of other additional social users.

* * * * *